US010179315B2

(12) United States Patent
Brandl et al.

(10) Patent No.: US 10,179,315 B2
(45) Date of Patent: Jan. 15, 2019

(54) EXHAUST TREATMENT DEVICE

(71) Applicant: Donaldson Company, Inc., Minneapolis, MN (US)

(72) Inventors: Mark Thomas Brandl, Ham Lake, MN (US); Korneel DeRudder, Herent (BE); Bruce Hoppenstedt, Lakeville, MN (US); Matthew S. Whitten, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 172 days.

(21) Appl. No.: 15/180,871

(22) Filed: Jun. 13, 2016

(65) Prior Publication Data

US 2016/0361694 A1 Dec. 15, 2016

Related U.S. Application Data

(60) Provisional application No. 62/174,824, filed on Jun. 12, 2015, provisional application No. 62/219,342, (Continued)

(51) Int. Cl.
*B01F 5/06* (2006.01)
*F01N 3/28* (2006.01)
(Continued)

(52) U.S. Cl.
CPC ........ *B01F 5/0691* (2013.01); *B01D 53/9431* (2013.01); *B01F 3/04049* (2013.01);
(Continued)

(58) Field of Classification Search
CPC .... B01F 5/0065; B01F 5/0473; B01F 5/0688; B01F 5/0691
(Continued)

(56) References Cited

U.S. PATENT DOCUMENTS 3,378,234 A * 4/1968 Svec .................. A22C 5/00
366/338
3,584,439 A * 6/1971 Gronholz ............... B01D 29/21
55/337
(Continued)

FOREIGN PATENT DOCUMENTS

DE 20 2007 010 324 U1 1/2009
DE 10 2008 031 136 A1 1/2010
(Continued)

OTHER PUBLICATIONS

International Search Report and Written Opinion for Application No. PCT/US2016/037252, dated Nov. 28, 2016, 17 pages.
(Continued)

*Primary Examiner* — Abbas Rashid
(74) *Attorney, Agent, or Firm* — Merchant & Gould P.C.

(57) ABSTRACT

An exhaust treatment arrangement includes a mixing assembly disposed between first and second substrates; and an injection mounting location disposed at the mixing assembly. The mixing assembly includes a mixing arrangement configured to direct exhaust flow exiting the first substrate in a swirling configuration, a restricting member defining a restricted passage, and optionally a dispersing member configured to even out the exhaust flow.

21 Claims, 38 Drawing Sheets

Related U.S. Application Data filed on Sep. 16, 2015, provisional application No. 62/289,738, filed on Feb. 1, 2016.

(51) Int. Cl.
*B01D 53/94* (2006.01)
*B01F 5/00* (2006.01)
*B01F 5/04* (2006.01)
*B01F 3/04* (2006.01)
*F01N 3/021* (2006.01)
*F01N 13/00* (2010.01)
*F01N 3/08* (2006.01)
*F01N 3/20* (2006.01)

(52) U.S. Cl.
CPC .......... *B01F 5/0065* (2013.01); *B01F 5/0473* (2013.01); *B01F 5/0688* (2013.01); *B01F 5/0693* (2013.01); *F01N 3/021* (2013.01); *F01N 3/2892* (2013.01); *F01N 13/0097* (2014.06); *B01D 2251/2067* (2013.01); *B01F 2005/0091* (2013.01); *F01N 3/0842* (2013.01); *F01N 3/2066* (2013.01); *F01N 2240/20* (2013.01); *F01N 2340/00* (2013.01); *F01N 2470/02* (2013.01); *F01N 2470/30* (2013.01); *F01N 2610/02* (2013.01); *F01N 2610/1453* (2013.01); *Y02T 10/20* (2013.01)

(58) Field of Classification Search
USPC ...................................................... 366/165.2
See application file for complete search history.

(56) References Cited

U.S. PATENT DOCUMENTS

| | | | | |
|---|---|---|---|---|
| 3,672,130 | A * | 6/1972 | Sullivan | B01D 46/0005 |
| | | | | 55/323 |
| 4,020,783 | A * | 5/1977 | Anderson | B01D 46/2411 |
| | | | | 116/268 |
| 4,135,899 | A * | 1/1979 | Gauer | B01D 46/0024 |
| | | | | 210/338 |
| 4,209,493 | A | 6/1980 | Olson | |
| 4,261,710 | A * | 4/1981 | Sullivan | B01D 46/2414 |
| | | | | 277/644 |
| 4,720,292 | A * | 1/1988 | Engel | B01D 46/2414 |
| | | | | 55/337 |
| 4,969,537 | A | 11/1990 | Wagner et al. | |
| 5,082,476 | A * | 1/1992 | Kahlbaugh | B01D 39/14 |
| | | | | 55/320 |
| 5,355,973 | A | 10/1994 | Wagner et al. | |
| 7,451,594 | B2 | 11/2008 | Blaisdell | |
| 7,713,493 | B2 | 5/2010 | Bosanec, Jr. et al. | |
| 8,033,104 | B2 * | 10/2011 | Zhang | F01N 3/36 |
| | | | | 60/295 |
| 8,038,127 | B2 * | 10/2011 | Matsuoka | B01F 3/0446 |
| | | | | 210/150 |
| 8,117,832 | B2 | 2/2012 | Wagner et al. | |
| 8,302,391 | B2 | 11/2012 | Wirth et al. | |
| 8,454,897 | B2 | 6/2013 | Wirth et al. | |
| 8,495,866 | B2 | 7/2013 | Wirth | |
| 8,511,076 | B2 | 8/2013 | Wirth | |
| 8,539,761 | B2 | 9/2013 | Lebas et al. | |
| 8,596,044 | B2 | 12/2013 | Werni et al. | |
| 8,915,064 | B2 | 12/2014 | Blaisdell et al. | |
| 8,938,954 | B2 | 1/2015 | De Rudder et al. | |
| 9,243,544 | B2 | 1/2016 | Többen et al. | |
| 9,289,724 | B2 | 3/2016 | Stanavich et al. | |
| 9,314,750 | B2 * | 4/2016 | Stanavich | B01F 5/0451 |
| 9,410,460 | B2 | 8/2016 | Hackländer | |
| 9,410,464 | B2 * | 8/2016 | Hicks | F01N 3/2066 |
| 9,435,240 | B2 * | 9/2016 | Sampath | F01N 3/206 |
| 9,464,552 | B2 | 10/2016 | Calvo | |
| 9,707,525 | B2 * | 7/2017 | De Rudder | F01N 3/2066 |
| 9,765,679 | B2 | 9/2017 | Palinkas et al. | |
| 9,784,163 | B2 | 10/2017 | Noren, IV et al. | |
| 9,790,833 | B2 | 10/2017 | Kobe et al. | |
| 9,810,119 | B2 | 11/2017 | Gschwind | |
| 9,810,123 | B2 | 11/2017 | Kauderer et al. | |
| 2003/0079467 | A1 | 5/2003 | Liu et al. | |
| 2003/0110763 | A1 * | 6/2003 | Pawson | B01D 53/9431 |
| | | | | 60/286 |
| 2006/0070375 | A1 | 4/2006 | Blaisdell | |
| 2008/0163612 | A1 * | 7/2008 | Gaiser | F01N 3/025 |
| | | | | 60/299 |
| 2010/0005790 | A1 | 1/2010 | Zhang | |
| 2010/0263359 | A1 | 10/2010 | Haverkamp et al. | |
| 2014/0116037 | A1 | 5/2014 | Lebas et al. | |
| 2015/0010681 | A1 | 4/2015 | Ferront et al. | |
| 2015/0132192 | A1 | 5/2015 | De Rudder et al. | |
| 2015/0211404 | A1 | 7/2015 | Blaisdell et al. | |
| 2015/0240692 | A1 | 8/2015 | De Rudder | |
| 2015/0260072 | A1 | 9/2015 | De Rudder et al. | |
| 2016/0017785 | A1 | 1/2016 | Resch et al. | |
| 2016/0115848 | A1 * | 4/2016 | Kurikka | B01F 5/0065 |
| | | | | 422/180 |
| 2016/0138454 | A1 | 5/2016 | Alano et al. | |
| 2016/0186640 | A1 | 6/2016 | Calvo et al. | |
| 2016/0377033 | A1 | 12/2016 | Ferront et al. | |
| 2017/0114693 | A1 | 4/2017 | Stelzer et al. | |
| 2017/0260888 | A1 | 9/2017 | Solipuram et al. | |
| 2017/0321592 | A1 | 11/2017 | Owen et al. | |
| 2017/0342888 | A1 | 11/2017 | Noren, IV et al. | |

FOREIGN PATENT DOCUMENTS

| | | |
|---|---|---|
| EP | 2 607 641 A1 | 6/2013 |
| EP | 3 216 992 A1 | 9/2017 |
| KR | 20-0438616 | 2/2008 |
| WO | WO 2008/144385 A2 | 11/2008 |
| WO | WO 2009/085641 A1 | 7/2009 |
| WO | 2012/013562 A1 | 2/2012 |
| WO | WO 2012/080585 A1 | 6/2012 |

OTHER PUBLICATIONS

Partial International Search Report for Application No. PCT/US2016/037252 dated Oct. 6, 2016.

* cited by examiner

EXHAUST TREATMENT DEVICE

CROSS-REFERENCE TO RELATED APPLICATIONS

This application claims the benefit of U.S. provisional application No. 62/174,824, filed Jun. 12, 2015; U.S. provisional application No. 62/219,342, filed Sep. 16, 2015; and U.S. provisional application No. 62/289,738, filed Feb. 1, 2016, the disclosures of which are hereby incorporated herein by reference in their entireties.

BACKGROUND

Vehicles equipped with diesel engines typically include exhaust systems that have aftertreatment systems such as selective catalytic reduction catalyst devices, lean NOx catalyst devices, or lean NOx trap devices to reduce the amount of undesirable gases, such as nitrogen oxides (NOx) from the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Therefore, there is a need for a flow device that provides a uniform mixture of exhaust gases and reactants.

SUMMARY

In accordance with some aspects of the disclosure, a mixing assembly has an upstream end and a downstream end. The mixing assembly has a central longitudinal axis extending between the upstream end and the downstream end. The mixing assembly includes a mixing arrangement and a restricting member disposed downstream of the mixing arrangement. The restricting member defines a restricted passage. The mixing arrangement includes a deflection body, a mesh holder, and a mesh. The deflection body extends across a full cross-dimension of the mixing assembly to divide the mixing assembly into a first region upstream of the deflection body and a second region downstream of the deflection body. The mesh holder defines a passage through the deflection body between the first and second regions. The passage is not parallel with the central longitudinal axis of the mixing assembly. The mesh is disposed in the passage to divide the passage into an upstream passage and a downstream passage. The mesh holder has a first set of perforations leading to the upstream passage and a second set of perforations leading to the downstream passage.

In certain implementations, the passage defined by the mesh holder extends perpendicular to the central longitudinal axis of the mixing assembly.

In certain examples, the passage defined by the mesh holder is offset from the central longitudinal axis of the mixing assembly so that exhaust leaving the mesh holder enters the second region of the mixing assembly tangentially.

In some implementations, the mesh has an upstream face that is parallel to the central longitudinal axis of the mixing assembly. In other implementations, the mesh has an upstream face that is angled relative to the central longitudinal axis of the mixing assembly by about 5° to about 45°.

In examples, the upstream face of the mesh is angled relative to the central longitudinal axis of the mixing assembly by about 25° to about 30°.

In certain implementations, a doser mount located at a first axial end of the mesh holder so that a doser mounted at the doser mount would spray into the upstream passage towards the mesh.

In certain implementations, the deflection body defines a plate extending across the mixing assembly at a non-zero, non-orthogonal angle relative to the central longitudinal axis.

In certain implementations, an annular wall extending between the first and second axial ends of the mixing assembly, the annular wall defining the cross-dimension of the mixing assembly; and a deflector arrangement disposed between the downstream passage of the mesh holder and the annular wall. The deflector arrangement is aligned with the downstream passage to inhibit reactant carried by exhaust flowing through the mesh holder from contacting the annular wall. The deflector arrangement is thermally buffered from the annular wall. In examples, the deflector arrangement is monolithically formed with the deflection body.

In certain implementations, the deflection body defines a second bypass downstream of the mesh holder and upstream of the restricting member. The second bypass includes at least one aperture defined in the deflection body to enable exhaust to enter the second region of the mixing assembly tangentially without passing through the mesh holder.

In certain implementations, an exhaust treatment arrangement using the mixing assembly includes a downstream exhaust treatment substrate disposed downstream of the mixing assembly.

In certain implementations, the mixing assembly and the downstream exhaust treatment substrate are coaxially aligned.

In certain implementations, an upstream exhaust treatment substrate is disposed upstream of the mixing assembly. In certain examples, the upstream exhaust treatment substrate is coaxially aligned with the mixing assembly.

In certain implementations, the downstream exhaust treatment substrate is an SCR or SCRf substrate. In certain examples, the upstream exhaust treatment substrate is particulate filter.

In certain implementations, at least one deflector is disposed in the second region of the mixing assembly. The deflector is not aligned with the downstream passage of the mesh holder. The deflector extends radially inwardly from an outer circumference of the second region.

In certain examples, the deflector extends radially inwardly from an annular wall of the mixing assembly. In certain examples, the deflector is formed by the deflection body.

In certain implementations, a dispersing member is disposed downstream of the restricting member. In certain examples, the dispersing member includes a plate that extends fully across the cross-dimension of the mixing assembly. The plate defines a plurality of perforations.

In certain implementations, the restricted passage defined by the restricting member is co-axially aligned with the central longitudinal axis of the mixing assembly.

In certain implementations, the deflection body is shaped so that exhaust can flow fully around a circumference of the mesh holder.

In certain implementations, the mesh holder includes a cylindrical tube. In certain examples, the mesh holder also includes a frustro-conical portion coupled to the cylindrical tube.

In certain implementations, the perforations of the second set of perforations defined by the mesh holder are located at a common side of the mesh holder to enhance swirling of the exhaust leaving the downstream passage of the mesh holder.

In some implementations, the perforations of the first set of perforations defined by the mesh holder are circular. In other implementations, the perforations of the first set of perforations defined by the mesh holder are elongated.

In certain implementations, the first set of perforations extend fully around a circumference of the mesh holder so that the first set of perforations includes perforations facing downstream and perforations facing upstream. The perforations facing downstream are sized and shaped to allow a greater volume of exhaust to pass therethrough compared to the perforations facing upstream.

In accordance with other aspects of the disclosure, an exhaust treatment arrangement includes a housing arrangement, a first substrate, a second substrate, a mixing assembly disposed between the first and second substrates, and an injection mounting location disposed at the mixing assembly. Certain types of mixing assemblies have an axial length that is less than 150% of an axial length of the second treatment substrate. The mixing assembly includes a mixing arrangement, a restricting member, and a dispersing member. The mixing arrangement is configured to direct exhaust flow exiting the first substrate in a swirling configuration. The restricting member includes a duct that defines a restricted passage through which the swirling exhaust flow passes. The dispersing arrangement defines apertures configured to even out the exhaust flow across a transverse cross-section of the housing arrangement. The injection mounting location is disposed upstream of the restricting member.

In certain implementations, the dispersing arrangement includes a baffle having radially tapered extensions defining the apertures.

In certain implementations, the duct extends from a baffle of the restricting member towards the mixing arrangement.

In certain implementations, the injector mounting location is disposed at the mixing region.

In certain implementations, the mixing arrangement includes a plate defining a passage, a mesh, a first conduit extending outwardly from an upstream face of the mesh, and a second conduit extending outwardly from a downstream face of the mesh to couple to the plate.

In certain examples, the first conduit defines a plurality of apertures at an upstream side of the first conduit. In examples, the first conduit defines a second plurality of apertures at a downstream side of the first conduit. In an example, the downstream side of the first conduit is more open than the upstream side. In an example, the plate includes a first portion that is spaced from a circumferential surface of the first conduit while following a curvature of the first conduit to enable exhaust flow to reach the second plurality of apertures.

In certain implementations, the second conduit has a frustro-conical portion that extends radially outwardly as the second conduit extends away from the mesh.

In certain implementations, the mesh is angled relative to a central longitudinal axis of the first conduit.

In certain implementations, an injector mounting location is disposed at an axial end of the first conduit and the mesh is angled relative to a dispensing direction from the injector mounting location.

In certain implementations, at least a downstream side of the second conduit defines bypass apertures that enable flow to pass through the passage without passing through the mesh.

In certain implementations, a deflector arrangement extends downstream of the mixing arrangement. The deflector arrangement has at least one deflector surface aligned with the passage.

In certain examples, the deflector arrangement includes a single deflector. In certain examples, the deflector arrangement includes a plurality of deflection surfaces. In certain examples, the deflector arrangement includes a perforated surface. In certain examples, the deflector arrangement includes a louvered surface.

In certain implementations, at least one flow deflector extends inwardly from an inner surface of the housing arrangement. In certain examples, the at least one flow deflector has a convex surface.

In certain implementations, the passage is offset from a central longitudinal axis of the housing arrangement. In certain examples, the restricted passage is centered on the central longitudinal axis of the housing arrangement.

In certain implementations, the passage is offset from a central longitudinal axis of the housing arrangement. In certain examples, a mesh is disposed in the passage. In an example, the mesh has a downstream face oriented parallel to a central longitudinal axis of the housing arrangement. In an example, the mixing assembly includes a flange extending downstream of the mixing assembly in alignment with the downstream face of the mesh.

In certain examples, the restricted passage is offset from the central longitudinal axis of the housing arrangement. In an example, the restricted passage is offset from the central longitudinal axis in a different direction than the passage.

In certain implementations, the duct is at least partially formed of a wire mesh. In some examples, the wire mesh extends around a portion of a circumference of the duct. In other examples, the wire mesh extends completely around a circumference of the duct. In some examples, the wire mesh extends along a portion of a length of the duct. In other examples, the wire mesh extends completely along a length of the duct.

In certain examples, a distal end of the duct opposes a blocking surface of the mixing arrangement to inhibit exhaust flow into the restricted passage through the distal end. In an example, the blocking surface defines a convexly curved central portion of the mixing arrangement.

In certain examples, the duct defines a frustro-conical shape. In an example, the duct tapers inwardly as the duct extends towards the mixing arrangement.

In certain implementations, the duct defines a tubular shape.

In certain implementations, the duct defines a frustro-conical shape.

In certain implementations, a portion of the duct defines a tubular shape and another portion of the duct defines a frustro-conical shape.

In certain implementations, the duct extends from a plate of the restricting member towards the mixing arrangement.

In certain implementations, the duct extends from a plate of the restricting member towards the dispersing member.

In certain implementations, the mixing arrangement includes flow deflectors extending downstream of a plate at apertures defined in the plate. In certain examples, the mixing assembly also includes flow deflectors extending upstream of the plate.

In certain implementations, the mixing arrangement includes a plate having deformed portions that cooperate to define a passage.

In certain implementations, the second substrate includes an SCR substrate.

In certain implementations, the dispersing member includes a plurality of flow deflectors disposed at a downstream side of a dispersing member. In certain examples, the flow deflectors face inwardly towards a central longitudinal axis of the housing arrangement.

In certain implementations, the injection mounting location is disposed between the mixing arrangement and the restricting member.

In certain implementations, the injection mounting location is disposed upstream of the mixing arrangement.

In certain implementations, the injection mounting location is positioned and oriented so that an injector mounted to the housing arrangement at the injection mounting location directs flow at a concave surface of the mixing arrangement.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure relates generally to an exhaust treatment device including a housing having an inlet arrangement and an outlet arrangement. A first exhaust conduit couples to the housing at the inlet arrangement; a second exhaust conduit couples to the housing at the outlet arrangement. The housing defines a first treatment region and a second treatment region disposed between the inlet arrangement and the outlet arrangement. Each treatment region is configured to hold one or more treatment substrates (e.g., a DPF substrate, a DOC substrate, an SCR substrate). As the term is used herein, an SCR substrate refers to a selective catalytic reduction substrate by itself or on a filter (also known as an SCRf). The housing also includes a mixing region disposed between the first and second treatment regions. In an example, the first treatment region, the mixing region, and the second treatment region are axially aligned between the inlet and outlet arrangements.

Figure 1:
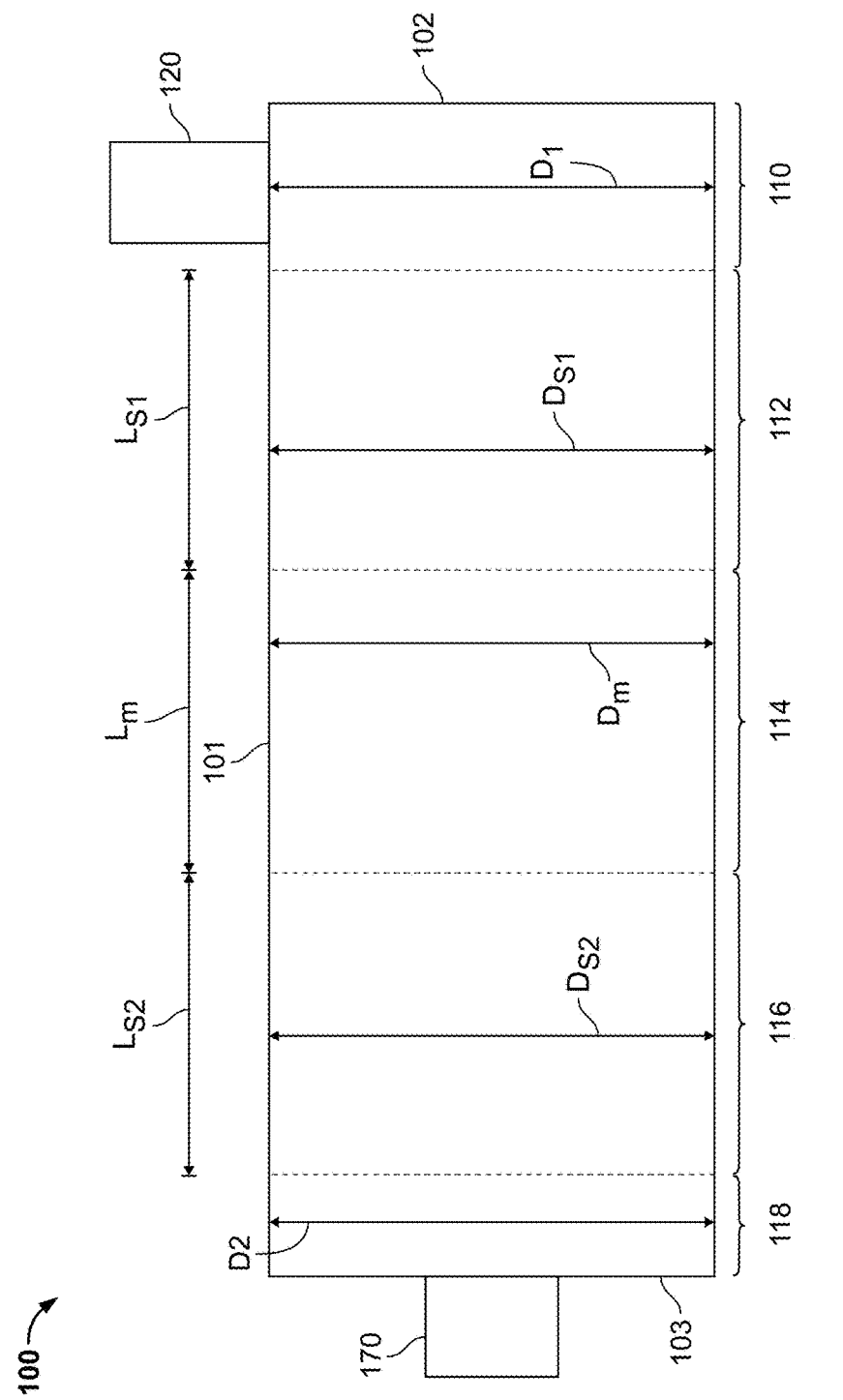
FIG. 1 is a schematic diagram of an exhaust treatment device configured in accordance with the principles of the present disclosure.

FIG. 1 illustrates an example exhaust treatment device 100 including a housing arrangement 101 defining an inlet region 110 and an outlet region 118. An inlet conduit 120 is disposed at the inlet region 110 and an outlet conduit 170 is disposed at the outlet region 118. A first exhaust conduit couples to the housing arrangement 101 at the inlet conduit 120. A second exhaust conduit couples to the housing arrangement 101 at the outlet conduit 170.

Figure 2:
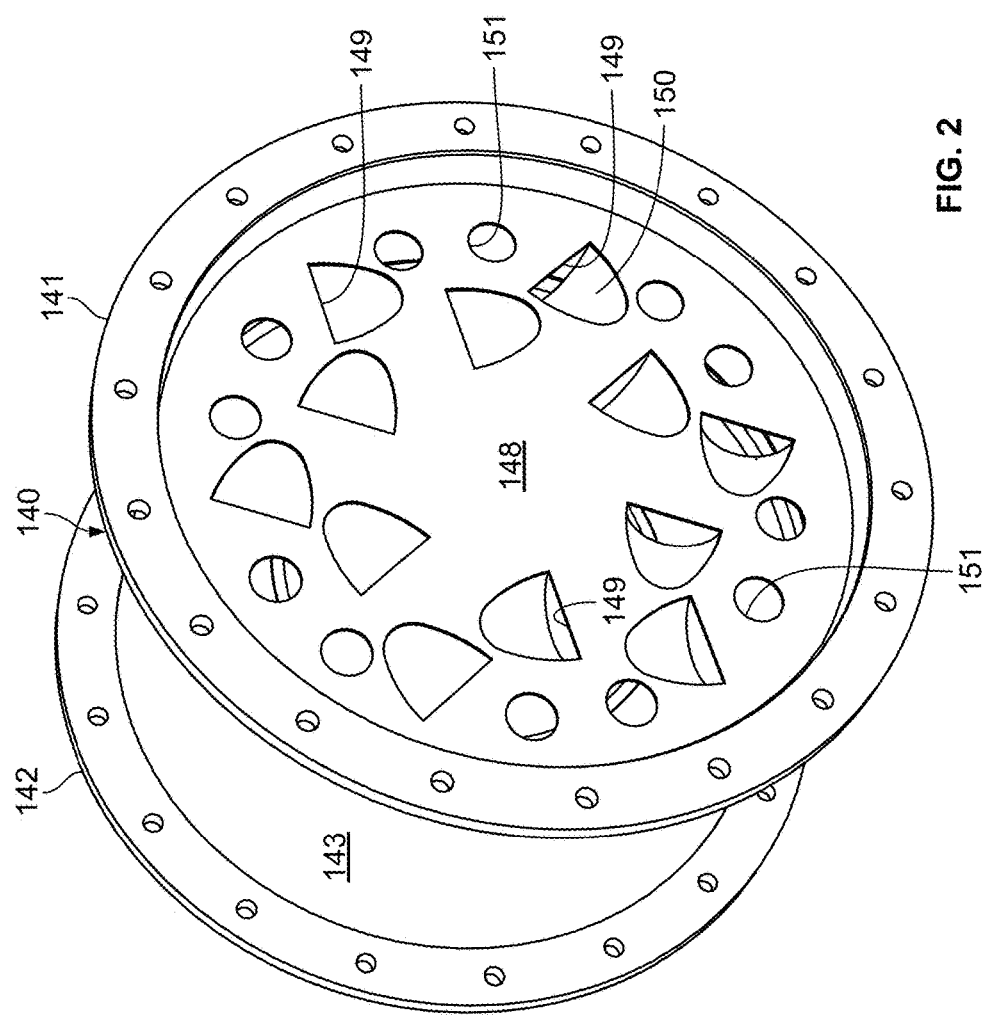
FIG. 2 is a front perspective view of an example mixing assembly suitable for use in the exhaust treatment device of FIG. 1.

A cross-dimension (e.g., a diameter) of the housing arrangement 101 is generally consistent along a length L of the housing arrangement 101. In certain implementations, the housing arrangement 101 includes one or more conduits aligned along a longitudinal axis and coupled together. A cross-dimension (e.g., a diameter) of the conduit(s) is generally consistent along the length L of the housing arrangement 101 (e.g., see FIG. 2). The cross-dimension of the housing arrangement 101 is larger than a cross-dimension of any exhaust conduits coupled to the inlet conduit 120 and/or the outlet conduit 170. In certain implementations, the exhaust conduits have cross-sectional profiles that are smaller than a smallest cross-sectional profile of the housing arrangement 101. In certain examples, the exhaust conduits have cross-sectional profiles that are no more than half the size of the smallest cross-sectional profile of the housing arrangement 101.

The housing arrangement 101 defines a mixing region 114 and a treatment region 116 disposed between the inlet conduit 120 and the outlet conduit 170. Reactant (e.g., urea) is dispensed into the exhaust flow at the mixing region 114. An SCR substrate is disposed at the treatment region 116 to receive the reactant mixed exhaust flow. In certain implementations, the housing arrangement 101 includes a first treatment region 112 and a second treatment region 116 disposed at opposite ends of the mixing region 114. Each treatment region 112, 116 is configured to hold one or more treatment substrates (e.g., a diesel particulate filter (DPF) substrate, a diesel oxidation catalyst (DOC) substrate, an SCR substrate). Reactant can be dispensed into the mixing region 114 to mix with the exhaust gas. A mixing arrangement also can be disposed at the mixing region 114 to enhance mixing of the reactant with the exhaust gas.

Figure 3:
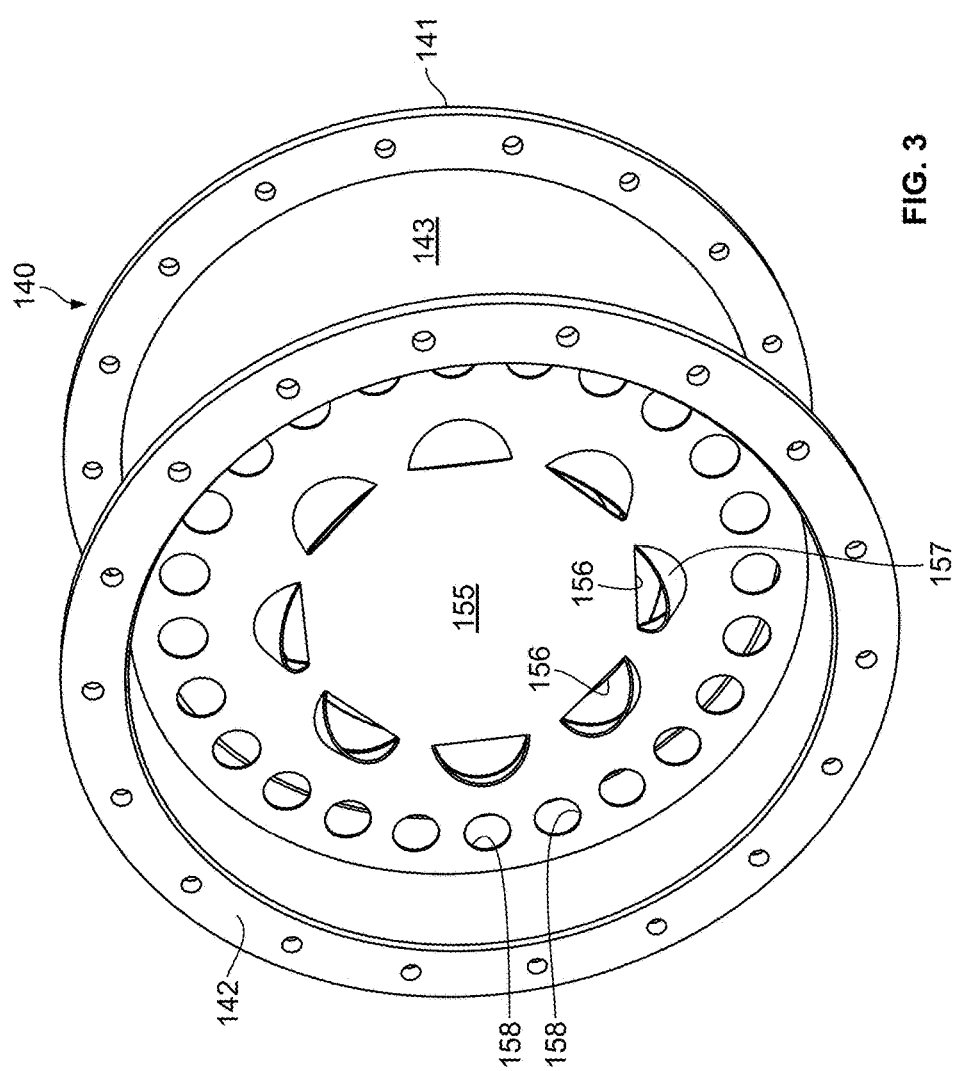
FIG. 3 is a rear perspective view of the mixing assembly of FIG. 2.

In certain examples, the first treatment region 112, the mixing region 114, and the second treatment region 116 are axially aligned between the inlet and outlet regions 110, 118. In certain examples, the first treatment region 112, the mixing region 114, and the second treatment region 116 have similar cross-dimensions $D_{S1}$, $D_M$, $D_{S2}$, respectively, compared to cross-dimensions of the exhaust conduits coupled to the housing arrangement 101. In certain examples, the cross-dimensions $D_{S1}$, $D_{S2}$ of the treatment regions 112, 116 are the outer diameters of the substrates disposed at the treatment regions 112, 116. In certain examples, the cross-dimension $D_M$ of the mixing region 114 is the outer diameter of a circumferential wall (e.g., wall 143 of FIG. 3) defining the mixing region 114.

In certain implementations, an axial length $L_M$ of the mixing region 114 is no larger than an axial length $L_{S1}$ of the first treatment region 112. In certain implementations, the axial length $L_M$ of the mixing region 114 is no larger than an axial length $L_{S2}$ of the second treatment region 116. In certain implementations, the axial length $L_M$ of the mixing region 114 is smaller than the axial lengths $L_{S1}$, $L_{S2}$ of either of the treatment regions 112, 116. In some implementations, the axial length $L_M$ of the mixing region 114 is no greater than 20 inches. In certain implementations, the axial length $L_M$ of the mixing region 114 is no greater than 17 inches. In certain implementations, the axial length $L_M$ of the mixing region 114 is no greater than 15 inches. In certain implementations, the axial length $L_M$ of the mixing region 114 is no greater than 13 inches.

In certain implementations, the axial length $L_M$ of the mixing region 114 is no greater than the cross-dimension $D_{S2}$ of the second treatment region 116. In certain examples, the axial length $L_M$ of the mixing region 114 is no greater than about 95% of the cross-dimension $D_{S2}$ of the second treatment region 116. In certain examples, the axial length $L_M$ of the mixing region 114 is no greater than about 90% of the cross-dimension $D_{S2}$ of the second treatment region 116. In other implementations, the axial length $L_M$ of the mixing region 114 is no greater than about 110% of the cross-dimension $D_{S2}$ of the second treatment region 116. In certain implementations, the axial length $L_M$ of the mixing region 114 is no greater than about 105% of the cross-dimension $D_{S2}$ of the second treatment region 116.

FIGS. 2-6 illustrate one example implementation of a mixing assembly 140 suitable for use at mixing region 114. The mixing assembly 140 extends along an axial length $L_M$ from a first axial end 141 to a second axial end 142. A circumferential wall 143 extends between the first and second axial ends 141, 142. In an example, the circumferential wall 143 defines an annular sidewall of the mixing assembly 140. In certain examples, the circumferential wall 143 defines the cross-dimension $D_M$ of the mixing region 114 (see FIGS. 2 and 3). In certain examples, the first and second axial ends 141, 142 include radial flanges defining mounting apertures through which fasteners can extend to connect the mixing assembly 140 to the treatment regions 112, 116. In other examples, the first and second axial ends 141, 142 can be clamped to the treatment regions 112, 116.

Figure 4:
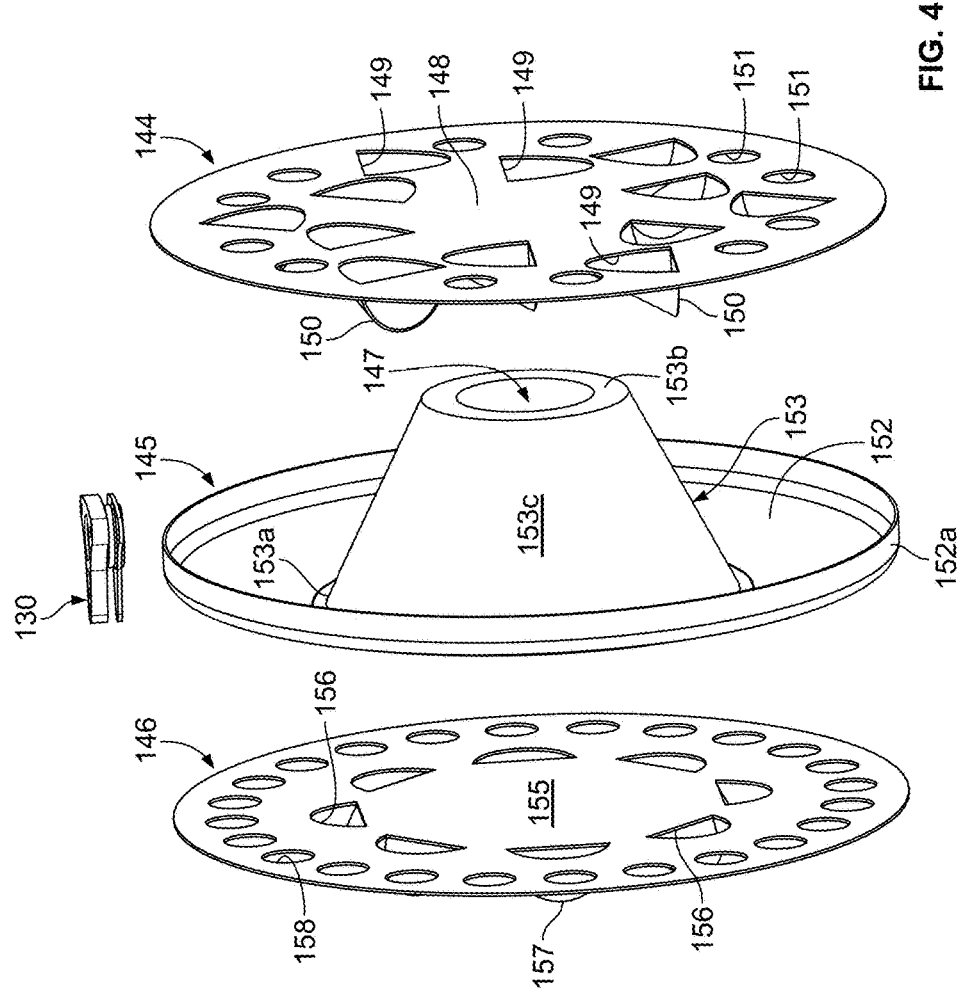
FIG. 4 is a front perspective view of the mixing assembly of FIG. 2 with the side walls removed and the components exploded axially outwardly from each other.
Figure 5:
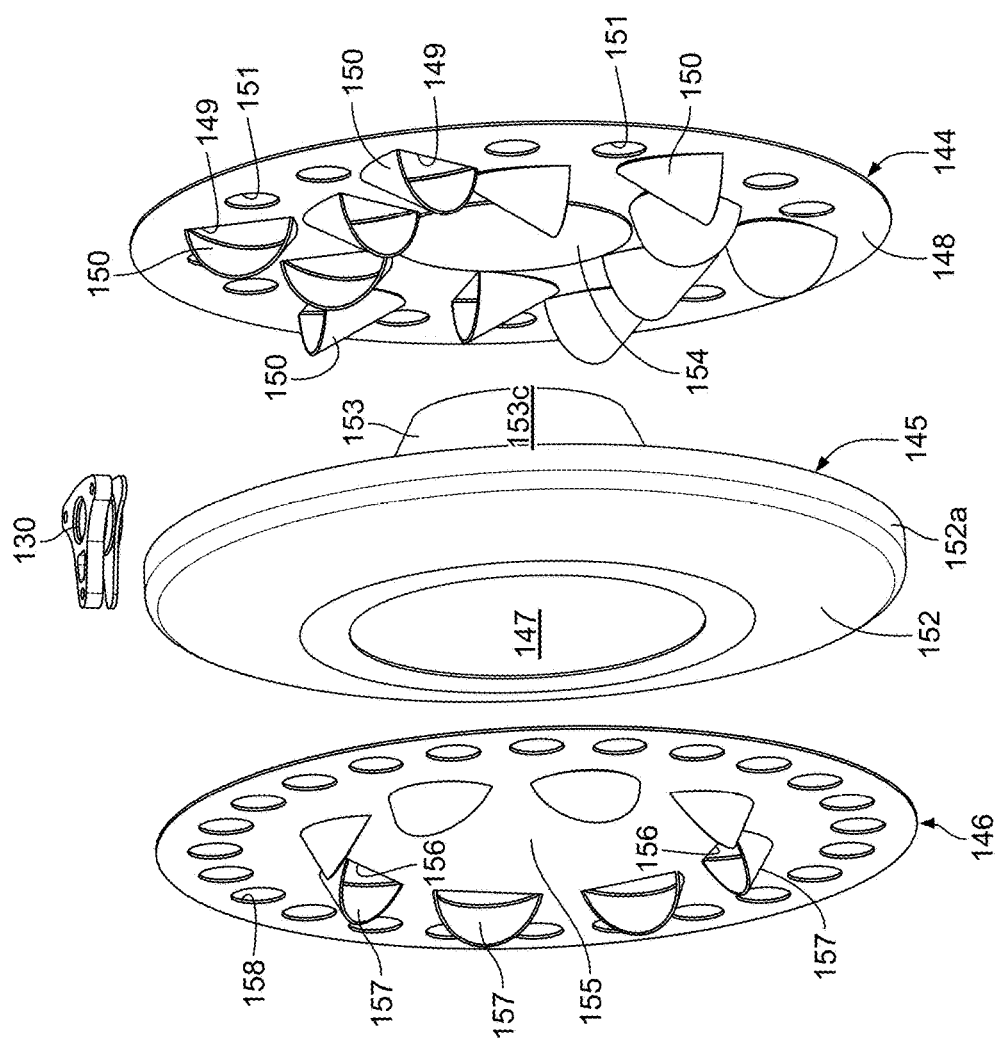
FIG. 5 is a rear perspective view of the mixing assembly of FIG. 4.
Figure 6:
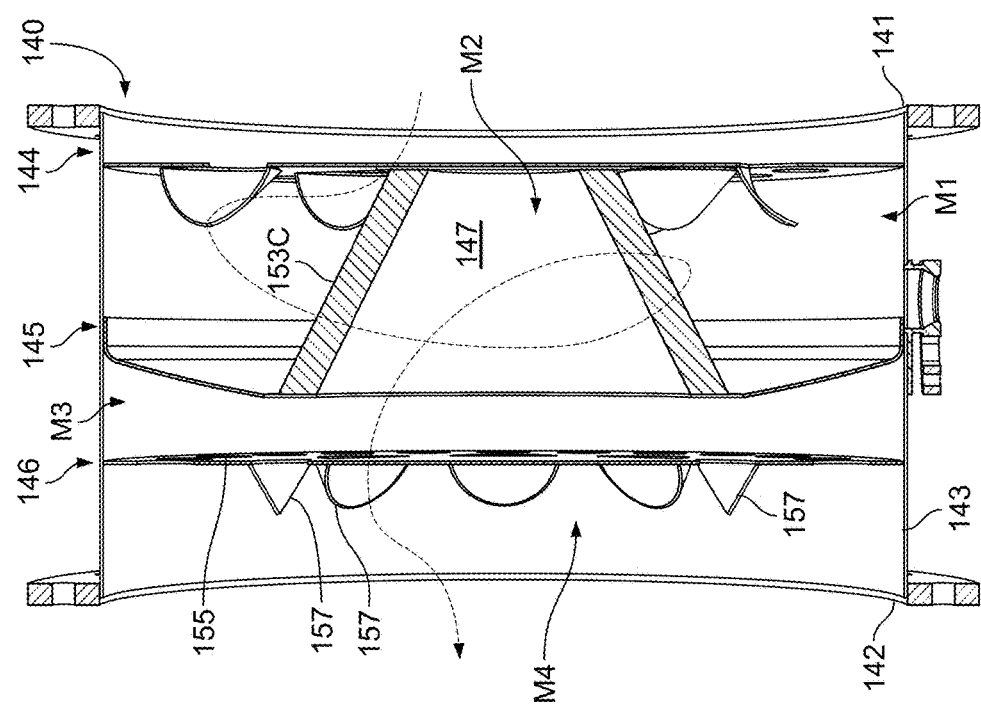
FIG. 6 is a cross-sectional view of the mixing assembly of FIG. 2 taken along a longitudinal axis of the mixing assembly.

As shown in FIG. 4, the mixing assembly 140 includes a mixing arrangement 144, a restricting member 145, and a dispersing member 146. The restricting member 145 defines a restricted passage 147. As shown in FIG. 6, a first mixing region $M_1$ is defined between the mixing arrangement 144 and an entrance of the restricted passage 147. A second mixing region $M_2$ is defined within the restricted passage 147. A third mixing region $M_3$ is defined between an exit of the restricted passage 147 and the dispersing member 146. A fourth mixing region $M_4$ is defined downstream of the dispersing member 146.

The mixing arrangement 144 is configured to cause swirling of the exhaust passing through the mixing arrangement 144. In certain implementations, the mixing arrangement 144 includes a plate 148 having an upstream face and a downstream face. In examples, the plate 148 extends fully across a transverse dimension of the mixing assembly 140 so that peripheral edges of the plate 148 contact the circumferential wall 143.

The plate 148 defines a first plurality of apertures 149 extending between the upstream and downstream faces. The apertures 149 are sized to enable exhaust to flow through the apertures 149. In certain examples, flow deflectors 150 (e.g., scoop-shaped flow deflectors) are disposed at the downstream face of the plate 148 at the apertures 149. In certain examples, the apertures 149 and flow deflectors 150 are oriented to direct the exhaust passing through the apertures 149 in a swirling flow. In an example, the apertures 149 and flow deflectors 150 cooperate to direct the exhaust in a clockwise flow. In another example, the apertures 149 and flow deflectors 150 cooperate to direct the exhaust in a counter-clockwise flow.

In certain implementations, the plate 148 defines a plurality of apertures 151 that do not open to flow deflectors. In certain examples, the apertures 151 define bypass apertures that enable exhaust to flow past the plate 148 without interacting with a flow deflector 150. Accordingly, the bypass apertures 151 reduce the pressure backdrop created at the upstream side of plate 148.

An injection mounting structure 130 is disposed in the second mixing region $M_2$. A doser can be mounted to the mixing assembly 140 at the injection mounting structure 130. The doser is configured to inject/spray a reductant (e.g., aqueous urea) into the second mixing region $M_2$ of the mixing assembly 140. In some implementations, the doser can be oriented to spray the reductant radially into the second mixing region $M_2$. In other implementations, the doser can be oriented to spray the reductant tangentially into the second mixing region $M_2$. In certain implementations, the doser can be oriented to spray the reductant towards the mixing arrangement 144. In certain implementations, the doser can be oriented to spray the reductant towards the restricting member 145.

The restricting member 145 is configured to reduce the amount of unhydrolized/unvaporized reductant leaving the mixing assembly 140. The restricting member 145 includes a plate 152 having an upstream face and a downstream face. In examples, the plate 152 extends fully across a transverse dimension of the mixing assembly 140 so that a peripheral edge of the plate 152 contacts the circumferential wall 143.

In certain examples, the peripheral edge of the plate 152 is defined by a flange 152a extending rearwardly from the plate 152.

As noted above, the restricting member 145 defines a restricted passage 147. In some implementations, a duct 153 extends rearwardly from the upstream side of the plate 152. The duct 153 defines the restricted passage 147. The duct 153 includes a sidewall 153c that extends from a first end 153a at the plate 152 to a second end 153b facing the mixing arrangement 144. The first mixing region M1 is defined between an exterior of the duct sidewall 153c, an interior of the mixing arrangement sidewall 143, the downstream side of the plate 148, and the upstream side of the plate 152

In certain implementations, the duct 153 is configured to enable exhaust to enter the restricted passage 147 through the duct sidewall 153c. In some implementations, the duct sidewall 153c defines a perforated tube. In other implementations, at least part of the duct sidewall 153c is defined by a mesh (e.g., a wire mesh) through which exhaust can flow. In certain implementations, the mesh is sized to inhibit unhydrolized/unvaporized reductant from passing through the sidewall 153c. For example, the unhydrolized/unvaporized reductant may impinge on the mesh and break into smaller droplets prior to entering the restricted passage 147. Breaking the droplets both decreases the size of and increases the number (and hence total surface area) of the droplets. The smaller size and increased surface area promotes evaporation of the droplets.

In certain implementations, the wire mesh absorbs heat from the exhaust passing therethrough. The wire mesh may pass some of the absorbed heat to the impinging droplets, which enhances evaporation of the droplets and/or inhibits deposition of the droplets on the restricting member 145. The wire mesh is thermally isolated from the outer wall 143 of the mixing assembly 140 to inhibit cooling of the mesh and droplets. Droplets that impinge on the wire mesh reside within the swirling exhaust flow while disposed on the wire mesh, which enhances evaporation of the droplets. In certain implementations, the wire mesh heats up faster than a solid surface would, especially during transient exhaust conditions.

In some implementations, the wire mesh extends fully around a circumference of the sidewall 153c. In other implementations, the wire mesh extends around less than the circumference of the sidewall 153c. For example, in certain implementations, the wire mesh may extend around no more than three-quarters of the circumference of sidewall 153c. In certain implementations, the wire mesh may extend around no more than half of the sidewall 153c. In certain implementations, the wire mesh may extend around no more than a quarter of the sidewall 153c. In some implementations, a remainder of the circumference of the sidewall 153c is solid. In other implementations, a remainder of the circumference of the sidewall 153c is perforated.

In some implementations, the wire mesh extends fully along a length of the sidewall 153c between the first and second ends 153a, 153b. In other implementations, the wire mesh extends along less than the length of the sidewall 153c. For example, in certain implementations, the wire mesh may extend along no more than three-quarters of the length of the sidewall 153c. In certain implementations, the wire mesh may extend along no more than half of the sidewall 153c. In certain implementations, the wire mesh may extend along no more than a quarter of the sidewall 153c. In some implementations, a remainder of the length of the sidewall 153c is solid. In other implementations, a remainder of the length of the sidewall 153c is perforated.

In some implementations, the duct 153 defines a frustro-conical shape so that a transverse cross-dimension (e.g., diameter) of the second end 153b is smaller than a transverse cross-dimension (e.g., diameter) of the first end 153a. In certain implementations, the transverse cross-dimension of the second end 153b is no more than half of the transverse cross-dimension of the circumferential wall 143 of the mixing assembly 140. In certain implementations, the transverse cross-dimension of the second end 153b is no more than a third of the transverse cross-dimension of the circumferential wall 143 of the mixing assembly 140. In certain implementations, the transverse cross-dimension of the first end 153a is no more than three-quarters of the transverse cross-dimension of the circumferential wall 143 of the mixing assembly 140. In certain implementations, the transverse cross-dimension of the first end 153a is no more than half of the transverse cross-dimension of the circumferential wall 143 of the mixing assembly 140. In other implementations, the duct 153 can have other shapes.

In certain examples, exhaust is at least partially blocked from entering the restricted passage 147 through the second end 153b of the duct 153. For example, in some implementations, the second end 153b contacts the mixing arrangement 144. In other implementations, the second end 153b is spaced closely to the mixing arrangement 144. In certain examples, the mixing arrangement 144 defines a blocking surface 154 that extends towards the duct 153 to reduce the amount of exhaust that enters the restricted passage 147 through the second end 153b of the duct 153. In certain examples, the blocking surface 154 extends partially into the restricted passage 147 through the second end 153b of the duct 153 (see FIG. 6). In an example, the blocking surface 154 convexly curves away from the plate 148 and towards the duct 153. In certain examples, the second end 153b of the duct 153 may contact the blocking surface 154. In certain examples, the blocking surface 154 contacts the second end 153b and the engagement between the blocking surface 154 and the duct 153 fully blocks exhaust from entering the passage 147 through the second end 153b of the duct 153. In other implementations, the second end 153b of the duct 153 is closed-ended.

Advantageously, a frustro-conically shaped duct 153 provides a large surface area for exhaust to pass through. This large surface area may reduce backpressure at the mixing assembly 140. This large surface area also may reduce the droplet mass concentration of the reactant by providing a large surface area against which the droplets can impinge. Reducing the droplet mass concentration may reduce mesh cooling, which may reduce the risk of deposit formation on the mesh. The frustro-conically shaped duct 153 also has a large outlet end providing a large cross-section through which exhaust passes to the next chamber $M_3$.

In certain implementations, the frustro-conically shaped duct 153 also may provide a concentric distribution of reactant at the outlet of the restricted passage 147. The concentric distribution may facilitate providing an even distribution of the reactant at the downstream aftertreatment substrate. In certain implementations, at least some exhaust enters the restricted passage 147 through the second end 153b. Such exhaust enters the restricted passage at a higher velocity than the exhaust passing through the duct sidewall 153c. The swirling exhaust recovers pressure from the higher velocity exhaust entering through the second end 153b, thereby reducing the back pressure at the mixing assembly 140.

The dispersing member 146 is configured to expand the swirling flow within the mixing assembly 140 to enhance reactant distribution at the downstream aftertreatment substrate. For example, the dispersing member 146 may straighten out the swirling flow to more evenly distribute the exhaust flow and reactant across a transverse cross-section of the fourth mixing region $M_4$. The dispersing member 146 includes a plate 155 having an upstream face and a downstream face. In examples, the plate 155 extends fully across a transverse dimension of the mixing assembly 140 so that peripheral edges of the plate 155 contact the circumferential wall 143 (e.g., FIG. 6). In other examples, the peripheral edge of the plate 155 defines cutouts so that portions of the peripheral edge do not contact the circumferential wall 143.

The plate 155 defines a first plurality of apertures 156 extending between the upstream and downstream faces. The apertures 156 are sized to enable exhaust to flow through the apertures 156. In certain examples, flow deflectors 157 (e.g., scoop-shaped flow deflectors) are disposed at the downstream face of the plate 155 at the apertures 156. In certain examples, the apertures 156 and flow deflectors 157 are oriented to straighten out the exhaust passing through the apertures 156. In the example shown, the flow deflectors 157 face inwardly towards a center of the plate 155.

In certain implementations, the plate 155 defines a plurality of bypass apertures 158 that do not open to flow deflectors. In certain implementations, one or more of the bypass apertures 158 define holes within the plate 155. In certain implementations, one or more of the bypass apertures 158 define cutouts at a perimeter of the plate 155. The bypass apertures 158 enable exhaust to flow past the plate 155 without interacting with a flow deflector 157. Accordingly, the bypass apertures 158 reduce the pressure backdrop created at the upstream side of plate 155. In certain implementations, the bypass apertures 158 are disposed radially outwardly from the flow deflectors 157. In an example, the dispersing member 146 includes an inner ring of flow deflectors 157 and an outer ring of bypass apertures 158.

Figure 7:
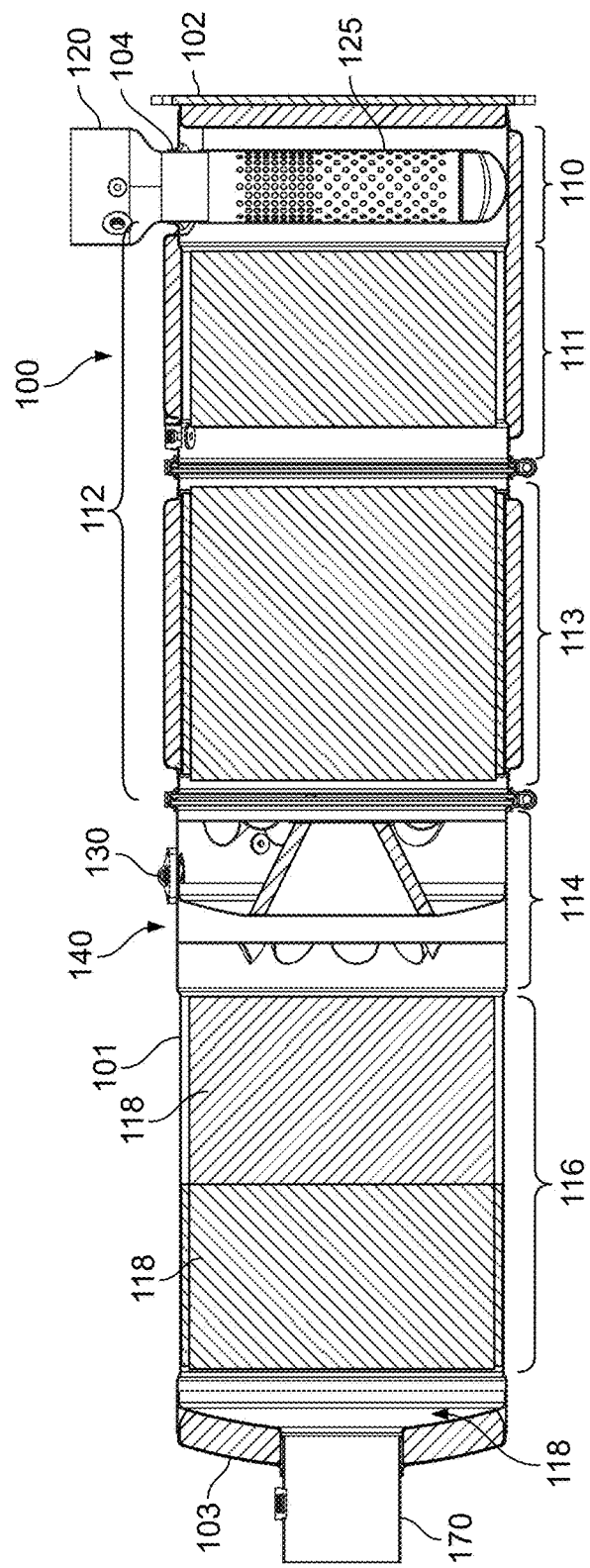
FIG. 7 is an axial cross-sectional view of a first example implementation of the exhaust treatment device of FIG. 1.

FIG. 7 illustrates an example implementation of an exhaust treatment device 100 utilizing the mixing assembly 140 of FIGS. 2-6. The exhaust treatment device 100' includes a housing arrangement 101 having an inlet region 110 and an outlet region 118. An inlet conduit 120 extends into the inlet region 110 to define a tube 125. In certain examples, the tube 125 defines a perforated section. Additional details regarding example perforated tubes suitable for use at the inlet region 110 can be found in U.S. Publication No. 2011/0308234 and in U.S. Publication No. 2014/0230411, the disclosures of which are hereby incorporated herein by reference. The tube 125 spreads the exhaust across an entrance to a first treatment region 112.

The housing arrangement 101 holds a first treatment substrate 182 at a first treatment region 112. In certain implementations, the first treatment substrate 182 includes a DOC filter. In certain implementations, the first treatment substrate 182 includes a diesel particulate filter (DPF). In certain implementations the first treatment region 112 can hold a plurality of substrates. For example, in FIG. 7, the first treatment region 112 also holds a second treatment substrate 184.

The axial distance $L_{s1}$ of the first treatment region 112 is the distance between the upstream end face of the most upstream substrate disposed in the first treatment region 112 to the downstream end face of the most downstream substrate disposed in the first treatment region 112. For example, the axial length $L_{s1}$ of the first treatment region 112 of FIG. 7 extends from an upstream end face of the first treatment substrate 182 to a downstream end face of the second treatment substrate 184. In an example, the first treatment substrate 182 includes a DOC filter and the second treatment substrate 184 includes a DPF.

The housing arrangement 101 also includes the mixing assembly 140 disposed downstream of the first treatment region 112. In certain implementations, any exhaust flow leaving the first treatment region 112 enters the mixing assembly 140. In certain examples, the sidewalls 143 of the mixing assembly 140 define part of the housing arrangement 101. In certain implementations, a gap between the mixing arrangement plate 148 and the second treatment substrate 184 is less than a gap between the mixing arrangement plate 148 and the restricting member plate 152. In certain implementations, an axial length of the mixing assembly 140 is less than an axial length of the mixing region 112. In certain implementations, an axial length of the mixing assembly 140 is less than an axial length of the second treatment substrate 184.

The housing arrangement 101 also includes a second treatment region 116 disposed downstream of the mixing assembly 140. The housing arrangement 101 holds at least a third treatment substrate 186 at the second treatment region 116. In certain implementations, the third treatment substrate 186 includes an SCR substrate. In certain implementations, two or more SCR substrates are disposed at the second treatment region 116. In an example, three SCR substrates are disposed at the second treatment region 116. In certain implementations, a gap between the dispersing member plate 155 and the SCR substrate 186 is less than a gap between the mixing arrangement plate 148 and the restricting member plate 152.

The axial length $L_{s2}$ of the second treatment region 116 is the distance between the upstream end face of the most upstream substrate disposed in the second treatment region 116 to the downstream end face of the most downstream substrate disposed in the second treatment region. For example, the axial length $L_{s2}$ of the second treatment region 116 shown in FIG. 7 is the distance between the upstream end of the third substrate 186 and the downstream end of the additional substrate 186'. In certain implementations, an axial length of the mixing assembly 140 is less than an axial length $L_{s2}$ of the second mixing region 116. In certain implementations, an axial length $L_M$ of the mixing assembly 140 is less than an axial length $L_{s2}$ of the SCR filter. In certain implementations, an axial length $L_M$ of the mixing assembly 140 is less than a majority of the axial length $L_{s2}$ of the second mixing region 116.

In use, exhaust flows into the housing arrangement 101 through the inlet conduit 120, through the first treatment substrate 182, through the second treatment substrate 184, and to the mixing assembly 140. Exhaust flows through the apertures 149 and bypass apertures 151 of the mixing arrangement 144. The flow deflectors 150 direct the exhaust into a swirling flow about the duct 153. Reactant is dispensed into the swirling flow. The reactant mixed swirling flow enters the restricted passage 147 and swirls towards the dispersing member 146, which evens out the swirling flow across a transverse cross-section of the housing arrangement 101. The reactant mixed flow passes through the third treatment substrate 186 and exits the housing arrangement 101 at the outlet conduit 170.

Figure 8:
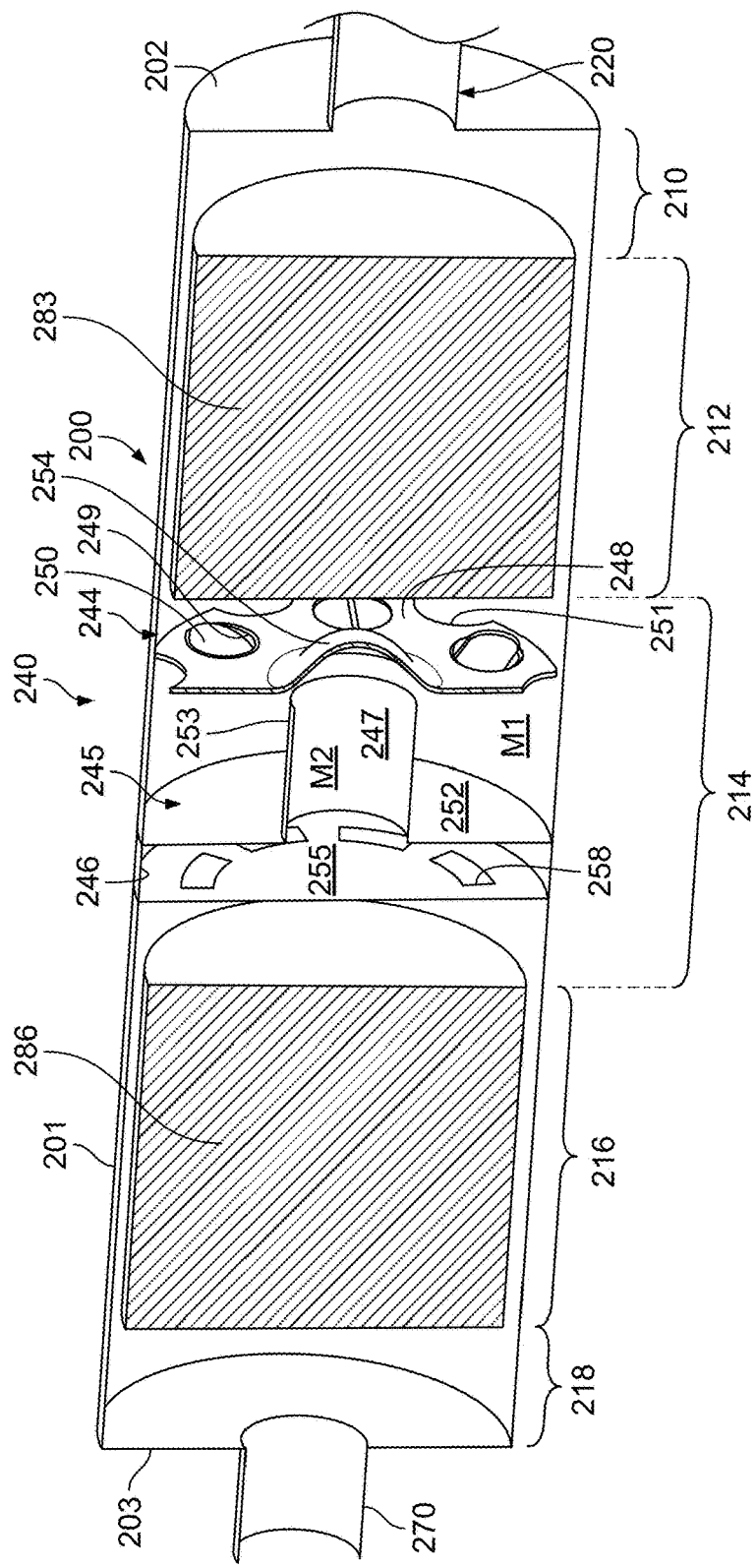
FIG. 8 is a front perspective view of an axial cross-section of a second example implementation of the exhaust treatment device of FIG. 1.

FIG. 8 illustrates another example implementation 200 of the exhaust treatment device 100 of FIG. 1. The exhaust treatment device 200 includes a housing arrangement 201 defining an inlet region 210 and an outlet region 218. An inlet conduit 220 is disposed at the inlet region 210 and an outlet conduit 270 is disposed at the outlet region 218. A first exhaust conduit couples to the housing arrangement 201 at the inlet conduit 220. A second exhaust conduit couples to the housing arrangement 201 at the outlet conduit 270. A cross-dimension (e.g., a diameter) of the housing arrangement 201 is generally consistent along a length of the housing arrangement 201. The cross-dimension of the housing arrangement 201 is larger than a cross-dimension of any exhaust conduits coupled to the inlet conduit 220 and/or the outlet conduit 270.

The housing arrangement 201 holds a first treatment substrate 283 and a second treatment substrate 286. A mixing assembly 240 is disposed between the first and second treatment substrates 283, 286 within the housing arrangement 201. In various implementations, the first treatment substrate 283 can be a DPF or a DOC. In certain implementations, both a DPF and a DOC are disposed upstream of the mixing assembly 240. In certain implementations, the second treatment substrate 286 includes an SCR substrate. In certain implementations, an axial length of the mixing assembly 240 is no more than an axial length of the SCR substrate.

The mixing assembly 240 includes a mixing arrangement 244, a restricting member 245, and a dispersing member 246. The mixing arrangement 244 is configured to swirl the exhaust flow leaving the first substrate 283. The restricting member 245 is configured to reduce an amount of unvaporized/unhydrolized reactant reaching the second treatment substrate 286. The dispersing member 246 is configured to even out the exhaust flow across the transverse cross-section of the housing 201 after the exhaust passes through the mixing arrangement 245.

The mixing arrangement 244 includes a plate 248 that defines mixing apertures (e.g., holes or notches) 249. Flow deflectors 250 are disposed at the mixing apertures 249 to direct exhaust into a swirling flow. In certain implementations, the flow deflectors 250 are disposed at both an upstream side and a downstream side of the plate 248. Example flow deflectors 250 suitable for use with the mixing arrangement 244 are further described in U.S. Pat. No. 8,539,761, the disclosure of which is hereby incorporated herein by reference. In certain implementations, the plate 248 also can define bypass apertures (e.g., holes or notches) 251 that are not associated with a corresponding flow deflector. In the example shown, bypass apertures are circumferentially spaced about a periphery of the plate 248. In certain implementations, the plate 248 defines a central concave portion 254 that extends away from the restricting member 245.

The restricting member 245 defines a restricted passage 247 through which the exhaust flows to pass through the restricting member 245. In certain implementations, the restricted passage 247 is defined by a duct 253 of the restricting member 245. In the example shown, the duct 253 is tubular and has a relatively constant cross-dimension (e.g., diameter). The duct 253 extends from a plate 252 towards the mixing arrangement 244. A distal end of the duct 253 axially aligns with the central concave portion 254 of the mixing arrangement 244 to allow exhaust to enter the restricted passage 247 through the distal end. The plate 252 blocks exhaust from flowing past the restricting member 245 without passing through the restricted passage 247.

Reactant can be dispensed at the mixing assembly 240 to mix with the exhaust gas. In certain implementations, the reactant is dispensed between the mixing arrangement 244 and the restricting member 245. In some implementations, the reactant is radially dispensed. In other implementations, the reactant is tangentially dispensed. In some implementations, the reactant is dispensed towards the duct 253 of the restricting member 245. In other implementations, the reactant is dispensed towards the mixing arrangement 244. In other implementations, the reactant is dispensed towards the duct 253 and towards the mixing arrangement 244. In still other implementations, the reactant is dispensed towards the plate 252 of the restricting member 245.

The dispersing member 246 includes a plate 255 defining a plurality of apertures 258. In certain examples, the apertures are positioned in a ring. In certain examples, the apertures 258 are elongated along a circumference of the ring. In certain implementations, a portion of the plate 255 that axially aligns with the exit of the duct 253 is solid.

In use, exhaust flows into the housing arrangement 201 through the inlet conduit 220, through the first treatment substrate 283, to the mixing assembly 240. Exhaust flows through the apertures 249 and bypass notches 251 of the mixing arrangement 244. The flow deflectors 250 direct the exhaust into a swirling flow about the duct 253. Reactant is dispensed into the swirling flow. The reactant mixed flow swirls into the restricted passage 247 through the distal end of the duct 253. In particular, the reactant mixed flow passes between the distal end of the duct 253 and the central concave portion 254 of the mixing arrangement 244. The flow swirls through the restricted passage 247 towards the dispersing member 246, which evens out the swirling flow across a transverse cross-section of the housing arrangement 201. The reactant mixed flow passes through the second treatment substrate 286 and exits the housing arrangement 201 at the outlet conduit 270.

Figure 9:
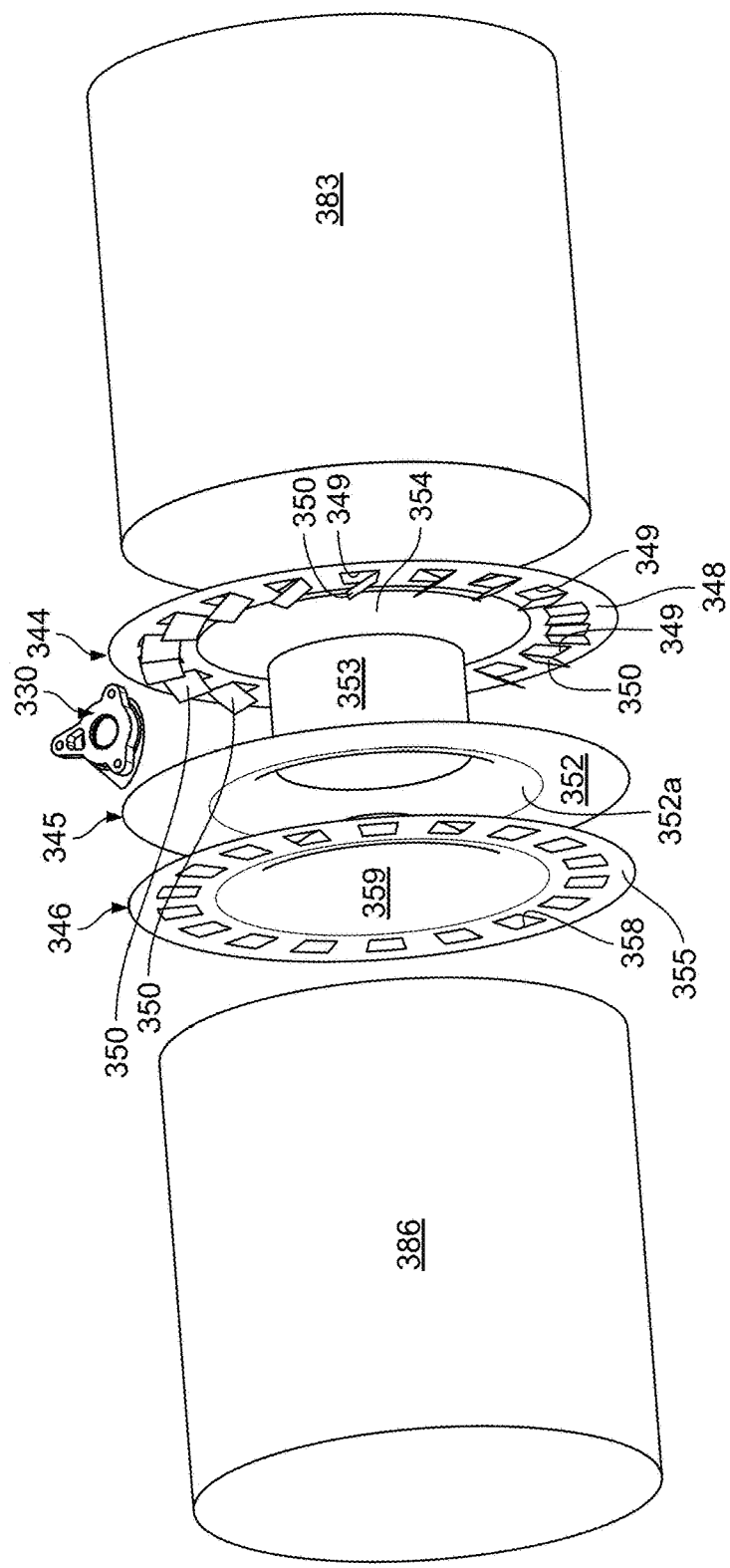
FIG. 9 is a front perspective view of a third example implementation of the exhaust treatment device of FIG. 1 with the housing arrangement removed for ease in viewing.
Figure 10:
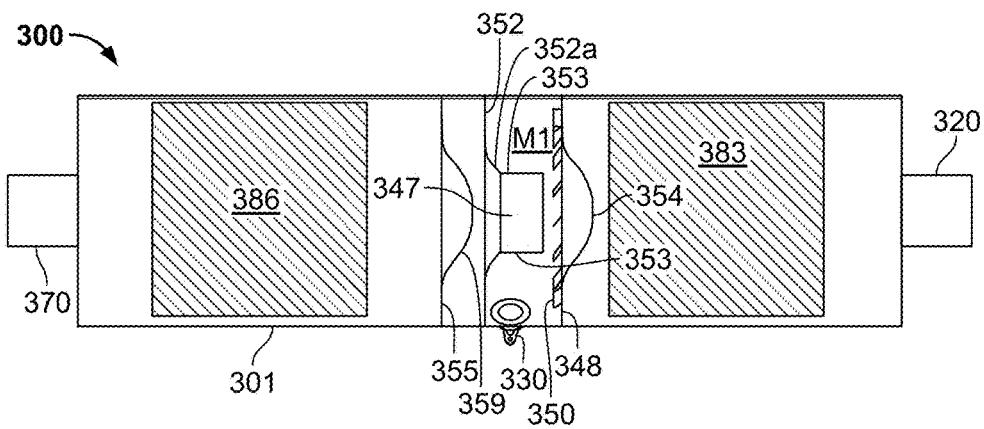
FIG. 10 is an axial cross-sectional view of the exhaust treatment device of FIG. 9.

FIGS. 9 and 10 illustrate another example implementation 300 of the exhaust treatment device 100 of FIG. 1. The exhaust treatment device 300 includes a housing arrangement 301 extending between an inlet conduit 320 and an outlet conduit 370. A cross-dimension (e.g., a diameter) of the housing arrangement 301 is generally consistent along a length of the housing arrangement 301. The cross-dimension of the housing arrangement 301 is larger than a cross-dimension of any exhaust conduits coupled to the inlet conduit 320 and/or the outlet conduit 370.

The housing arrangement 301 holds a first treatment substrate 383 and a second treatment substrate 386. A mixing assembly 340 is disposed between the first and second treatment substrates 383, 386 within the housing arrangement 301. In various implementations, the first treatment substrate 383 can be a DPF or a DOC. In certain implementations, both a DPF and a DOC are disposed upstream of the mixing assembly 340. In certain implementations, the second treatment substrate 386 includes an SCR substrate. In certain implementations, an axial length of the mixing assembly 340 is no more than an axial length of the SCR substrate.

The mixing assembly 340 includes a mixing arrangement 344, a restricting member 345, and a dispersing member 346. The mixing arrangement 344 is configured to swirl the exhaust flow leaving the first substrate 383. The restricting member 345 is configured to reduce an amount of unvaporized/unhydrolized reactant reaching the second treatment substrate 386. The dispersing member 346 is configured to even out the exhaust flow across the transverse cross-section of the housing 301 after the exhaust passes through the mixing arrangement 345.

The mixing arrangement 344 includes a plate 348 that defines apertures 349. Flow deflectors 350 are disposed at the apertures 349 to direct exhaust into a swirling flow. In certain implementations, the flow deflectors 350 include flaps 350 bent away (e.g., downstream) from the apertures 349. In an example, the apertures 349 and flow deflectors 350 are disposed in a circle towards an outer edge of the plate 348. In certain examples, the flow deflectors 350 face in a common circumferential direction to direct the exhaust into a swirling flow. In certain implementations, the plate 348 defines a central concave portion 354 that extends away from the restricting member 345 (see FIG. 10).

The restricting member 345 defines a restricted passage 347 through which the exhaust flows to pass through the restricting member 345. In certain implementations, the restricted passage 347 is defined by a duct 353 of the restricting member 345. In the example shown, the duct 353 is tubular and has a relatively constant cross-dimension (e.g., diameter). In certain examples, the duct 353 is connected to a plate 352 by a funnel portion 352a. The duct 353 extends from a funnel 352a towards the mixing arrangement 344. A distal end of the duct 353 axially aligns with the central concave portion 354 of the mixing arrangement 344 to allow exhaust to enter the restricted passage 347 through the distal end. In certain implementations, the distal end of the duct 353 is spaced from the mixing arrangement 344. The restricting member plate 352 blocks exhaust from flowing past the restricting member 345 without passing through the restricted passage 347.

Reactant can be dispensed at the mixing assembly 340 to mix with the exhaust gas. For example, the housing arrangement 301 includes an injection mounting location 330 disposed between the mixing arrangement 344 and the restricting member 345. In some implementations, the reactant is radially dispensed. In other implementations, the reactant is tangentially dispensed. In some implementations, the reactant is dispensed towards the duct 353 and/or funnel 252a of the restricting member 345. In other implementations, the reactant is dispensed towards the mixing arrangement 344. In still other implementations, the reactant is dispensed towards the plate 352 of the restricting member 345.

The dispersing member 346 includes a plate 355 defining a plurality of apertures 358. In certain examples, the apertures are positioned in a ring. In certain examples, the apertures 358 are elongated along a circumference of the ring. In certain implementations, a portion of the plate 355 that axially aligns with the exit of the duct 353 is solid. In certain implementations, the plate 355 defines a central concave portion 359 that extends towards the restricting member 345. In an example, a cross-dimension (e.g., diameter) of the central concave portion 359 approximates the cross-dimension of the funnel 352a at the plate 352. In certain implementations, the central concave portion 359 is spaced from the restricting member plate 352.

In use, exhaust flows into the housing arrangement 301 through the inlet conduit 320, through the first treatment substrate 383, to the mixing assembly 340. Exhaust flows through the apertures 349 of the mixing arrangement 344. The flow deflectors 350 direct the exhaust into a swirling flow about the duct 353. Reactant is dispensed into the swirling flow. The reactant mixed flow swirls into the restricted passage 347 through the distal end of the duct 353. In particular, the reactant mixed flow passes between the distal end of the duct 353 and the central concave portion 354 of the mixing arrangement 344. The flow swirls through the restricted passage 347 towards the dispersing member 346, which evens out the swirling flow across a transverse cross-section of the housing arrangement 301. The reactant mixed flow passes through the second treatment substrate 386 and exits the housing arrangement 301 at the outlet conduit 370.

Figure 11:
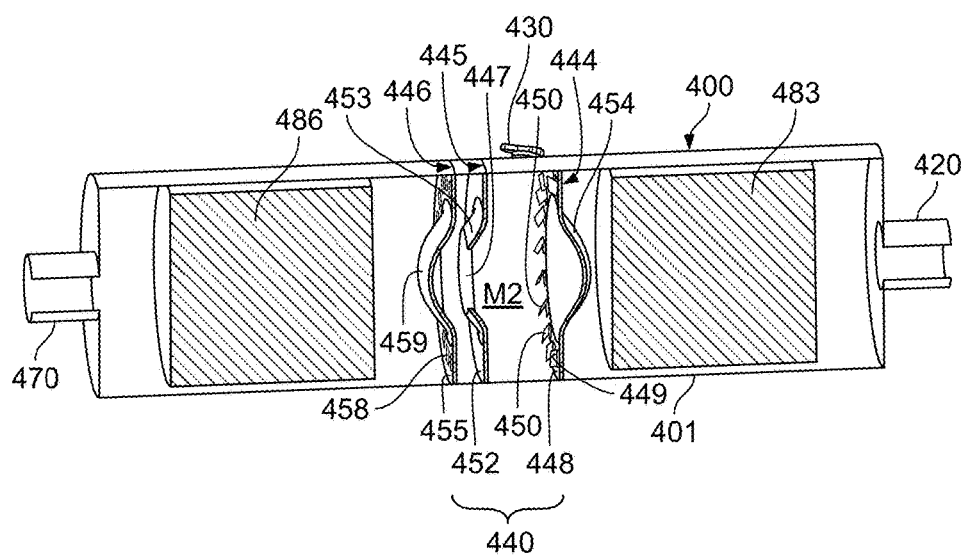
FIG. 11 is an axial cross-sectional view of a fourth example implementation of the exhaust treatment device of FIG. 1.

FIG. 11 illustrates another example implementation 400 of the exhaust treatment device 100 of FIG. 1. The exhaust treatment device 400 includes a housing arrangement 401 extending between an inlet conduit 420 and an outlet conduit 470. A cross-dimension (e.g., a diameter) of the housing arrangement 401 is generally consistent along a length of the housing arrangement 401. The cross-dimension of the housing arrangement 401 is larger than a cross-dimension of any exhaust conduits coupled to the inlet conduit 420 and/or the outlet conduit 470.

The housing arrangement 401 holds a first treatment substrate 483 and a second treatment substrate 486. A mixing assembly 440 is disposed between the first and second treatment substrates 483, 486 within the housing arrangement 401. In various implementations, the first treatment substrate 483 can be a DPF or a DOC. In certain implementations, both a DPF and a DOC are disposed upstream of the mixing assembly 440. In certain implementations, the second treatment substrate 486 includes an SCR substrate. In certain implementations, an axial length of the mixing assembly 440 is no more than an axial length of the SCR substrate.

The mixing assembly 440 includes a mixing arrangement 444, a restricting member 445, and a dispersing member 446. The mixing arrangement 444 is configured to swirl the exhaust flow leaving the first substrate 483. The restricting member 445 is configured to reduce an amount of unvaporized/unhydrolized reactant reaching the second treatment substrate 486. The dispersing member 446 is configured to even out the exhaust flow across the transverse cross-section of the housing 401 after the exhaust passes through the mixing arrangement 445.

The mixing arrangement 444 includes a plate 448 that defines apertures 449. Flow deflectors 450 are disposed at the apertures 449 to direct exhaust into a swirling flow. In certain implementations, the flow deflectors 450 include flaps 450 bent away (e.g., downstream) from the apertures 449. In an example, the apertures 449 and flow deflectors 450 are disposed in a circle towards an outer edge of the plate 448. In certain examples, the flow deflectors 450 face in a common circumferential direction to direct the exhaust into a swirling flow. In certain implementations, the plate 448 defines a central concave portion 454 that extends away from the restricting member 445.

The restricting member 445 defines a restricted passage 447 through which the exhaust flows to pass through the restricting member 445. In certain implementations, the restricted passage 447 is defined by a duct 453 extending downstream of a plate 452. The restricting member plate 452 blocks exhaust from flowing past the restricting member 445 without passing through the restricted passage 447. In the example shown, the duct 453 has a frustro-conical shape and tapers inwardly as the duct 453 extends downstream. A distal end of the duct 453 axially aligns with the central concave portion 454 of the mixing arrangement 444. In certain implementations, an axial length of the duct 453 is smaller than an axial length of the central concave portion 454 of the plate 448.

Reactant can be dispensed at the mixing assembly 440 to mix with the exhaust gas. For example, the housing arrangement 401 includes an injection mounting location 430 disposed between the mixing arrangement 444 and the restricting member 445. In some implementations, the reactant is radially dispensed. In other implementations, the reactant is tangentially dispensed. In some implementations, the reactant is dispensed towards the restricted passage 447. In other implementations, the reactant is dispensed towards the mixing arrangement 444. In still other implementations, the reactant is dispensed towards the plate 452 of the restricting member 445. In still other implementations, the reactant is dispensed between the mixing arrangement 444 and the restricting member 445.

The dispersing member 446 includes a plate 455 defining a plurality of apertures 458. In certain examples, the apertures are positioned in a ring. In certain examples, the apertures 458 are elongated along a circumference of the ring. In certain implementations, a portion of the plate 455 that axially aligns with the exit of the duct 453 is solid. In certain implementations, the portion of the plate 455 defines a central concave portion 459 that extends away from the restricting member 445. In certain implementations, the distal end of the duct 453 is spaced from the dispersing member 446. In an example, a cross-dimension (e.g., diameter) of the central concave portion 459 is larger than the cross-dimension of the distal end of the duct 453.

In use, exhaust flows into the housing arrangement 401 through the inlet conduit 420, through the first treatment substrate 483, to the mixing assembly 440. Exhaust flows through the apertures 449 of the mixing arrangement 444. The flow deflectors 450 direct the exhaust into a swirling flow in a mixing region. Reactant is dispensed into the swirling flow. The reactant mixed flow swirls into and through the restricted passage 447 towards the dispersing member 446. In particular, the reactant mixed flow passes between the distal end of the duct 453 and the central concave portion 459 of the dispersing member 446. The flow expands to pass through the apertures 458, thereby evening out across a transverse cross-section of the housing arrangement 401. The reactant mixed flow passes through the second treatment substrate 486 and exits the housing arrangement 401 at the outlet conduit 470.

Figure 12:
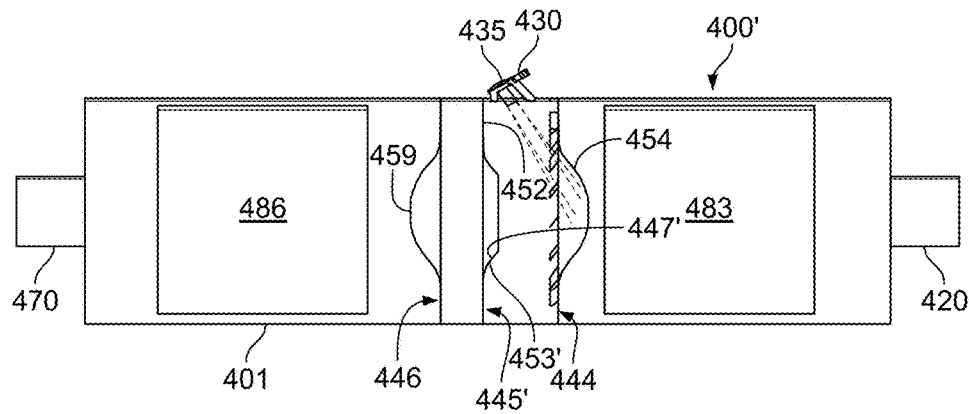
FIG. 12 is an axial cross-sectional view of a fifth example implementation of the exhaust treatment device of FIG. 1.

FIG. 12 illustrates an alternative implementation 400' to the exhaust treatment device 400 of FIG. 11. The exhaust treatment device 400' is substantially similar to the exhaust treatment substrate 400 except as specified below. The injection mounting location 430 is oriented and position so that a doser 435 mounted at the injection mounting location 430 is directed to dispense reactant towards the mixing arrangement 444. For example, the doser 435 may be oriented and positioned to dispense reactant towards an interior of the central concave portion 454 of the plate 348 of the mixing arrangement 444. In some cases, the droplets may break up upon impingement on the concave surface, which aids in evaporation of the reactant. A mixing arrangement 445' includes a restricted passage 447' that is defined by a duct 453' extending from a plate 452 towards the mixing arrangement 444. The duct 453' has a frustro-conical shape. In certain implementations, an axial length of the duct 453' is smaller than an axial length of the central concave portion 454 of the plate 448.

Figure 13:
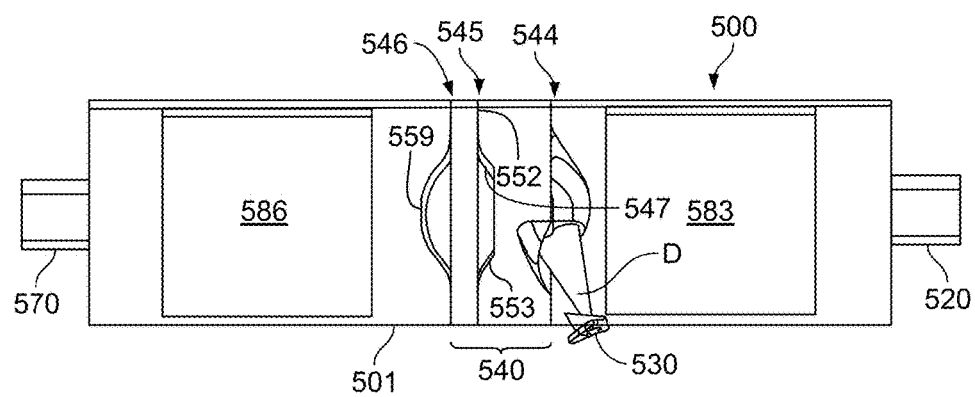
FIG. 13 is an axial cross-sectional view of a sixth example implementation of the exhaust treatment device of FIG. 1.
Figure 14:
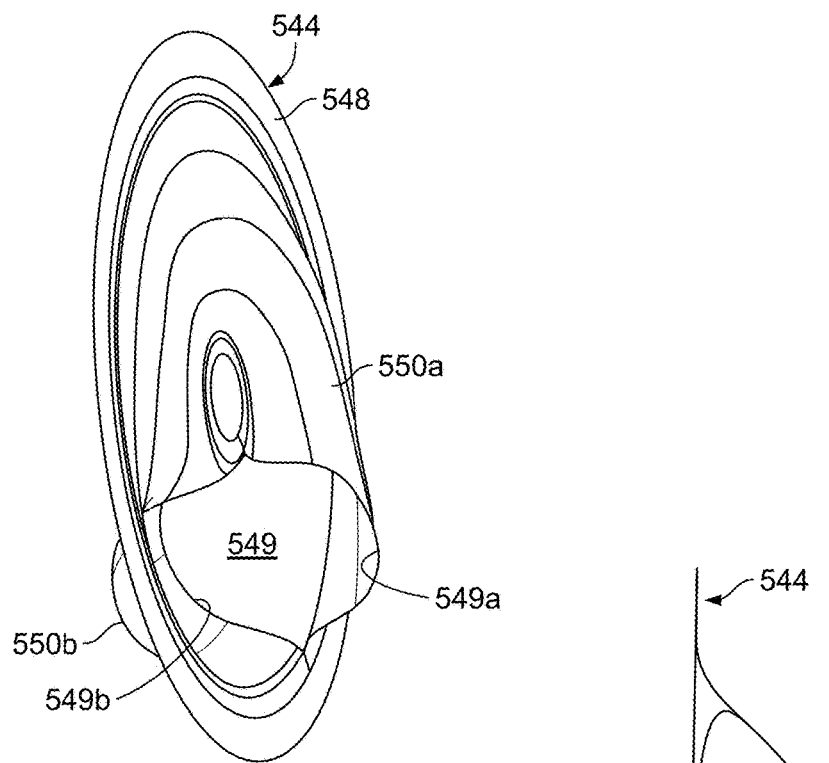
FIG. 14 is a front perspective view of an example mixing arrangement suitable for use in the mixing assembly of the fifth example exhaust treatment device of FIG. 13.
Figure 15:
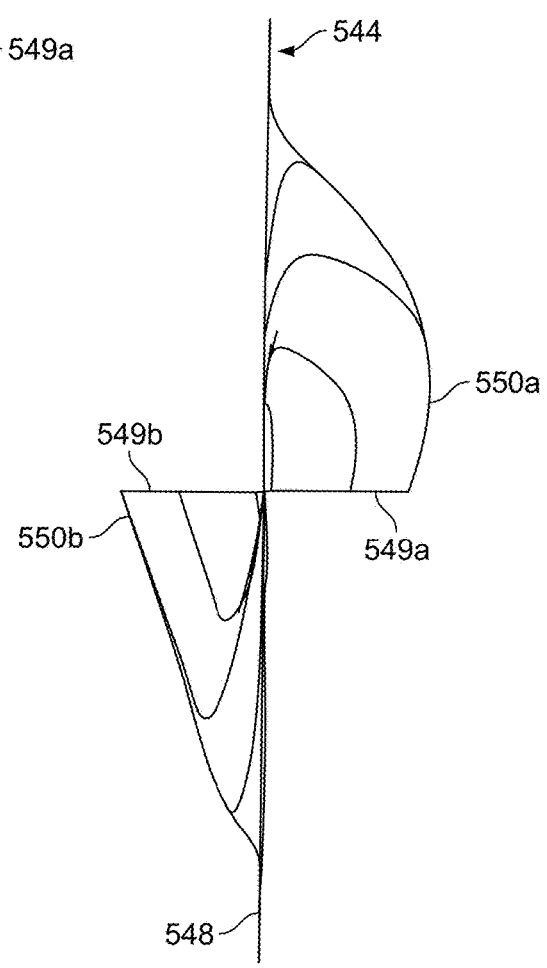
FIG. 15 is a side elevational view of the mixing arrangement of FIG. 14.
Figure 16:
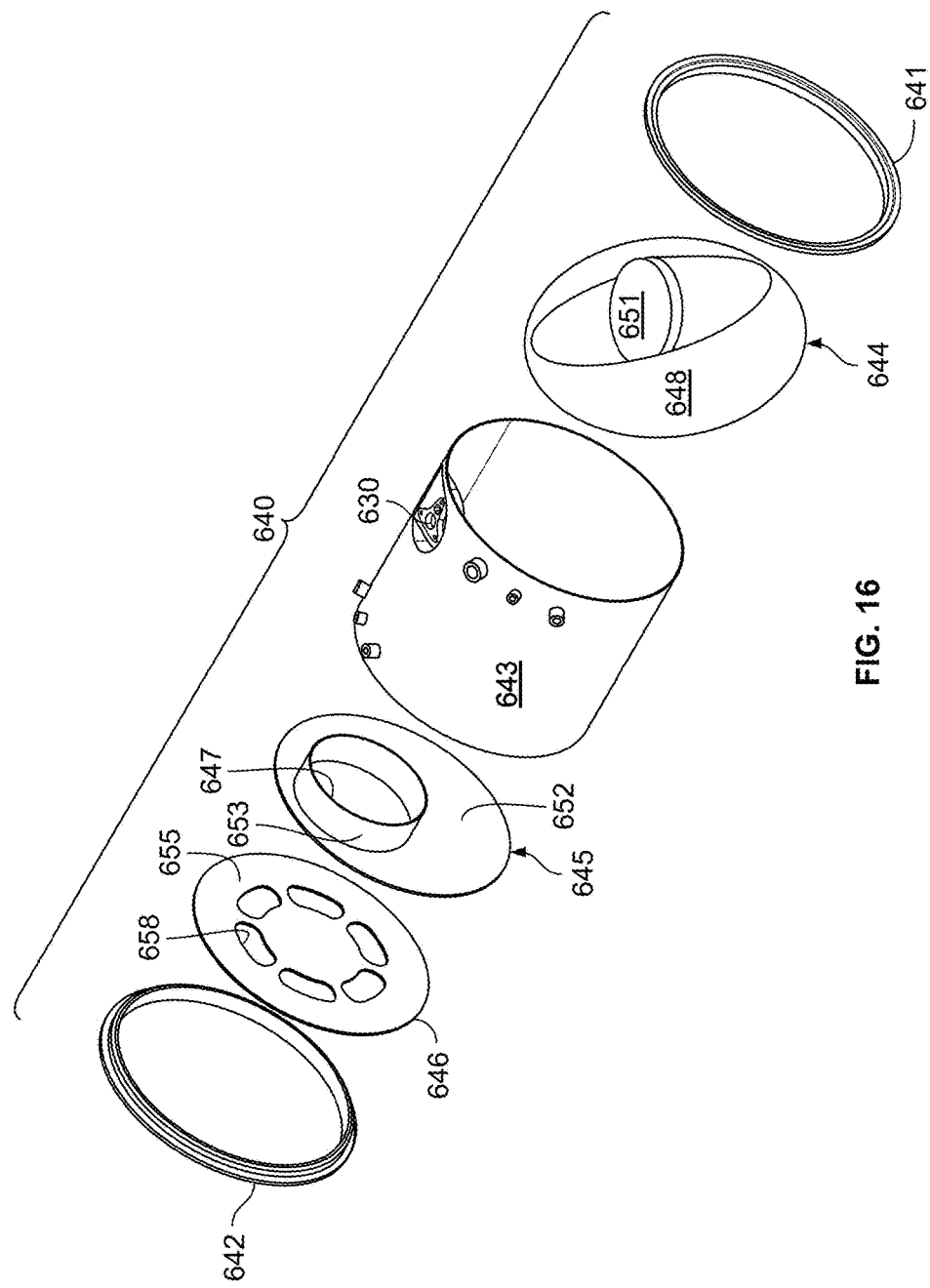
FIG. 16 is an exploded view of another example mixing assembly suitable for use in the exhaust treatment device of FIG. 1.

FIGS. 13-15 illustrate another example implementation 500 of the exhaust treatment device 100 of FIG. 1. The exhaust treatment device 500 includes a housing arrangement 501 extending between an inlet conduit 520 and an outlet conduit 570. A cross-dimension (e.g., a diameter) of the housing arrangement 501 is generally consistent along a length of the housing arrangement 501. The cross-dimension of the housing arrangement 501 is larger than a cross-dimension of any exhaust conduits coupled to the inlet conduit 520 and/or the outlet conduit 570.

The housing arrangement 501 holds a first treatment substrate 583 and a second treatment substrate 586. A mixing assembly 540 is disposed between the first and second treatment substrates 583, 586 within the housing arrangement 501. In various implementations, the first treatment substrate 583 can be a DPF or a DOC. In certain implementations, both a DPF and a DOC are disposed upstream of the mixing assembly 540. In certain implementations, the second treatment substrate 586 includes an SCR substrate. In certain implementations, an axial length of the mixing assembly 540 is no more than an axial length of the SCR substrate.

The mixing assembly 540 includes a mixing arrangement 544, a restricting member 545, and a dispersing member 546. The mixing arrangement 544 is configured to swirl the exhaust flow leaving the first substrate 583. The restricting member 545 is configured to reduce an amount of unvaporized/unhydrolized reactant reaching the second treatment substrate 586. The dispersing member 546 is configured to even out the exhaust flow across the transverse cross-section of the housing 501 after the exhaust passes through the mixing arrangement 544.

As shown in FIGS. 14 and 15, the mixing arrangement 544 includes a plate 548 that defines swirl passage 549 through which the exhaust is guided into a swirl pattern. A first portion 550a of the plate 548 deforms outwardly upstream of the plate 548 to define a first passage 549a leading from the upstream side to a downstream side of the plate 548. A second portion 550b of the plate 548 deforms outwardly downstream of the plate 548 to define a second passage 549b leading from the upstream side to the downstream side of the plate 548. In certain implementations, the first and second portions 550a, 550b are radially spaced from each other. In certain implementations, an entrance to the first passage 549a and an exit to the second passage 549b cooperate to define the swirl passage 549 (e.g., FIG. 14). In certain implementations, the swirl passage 549 extends along less than a radius of the plate 548.

Reactant D (e.g., shown schematically in FIG. 13) can be dispensed at the mixing assembly 540 to mix with the exhaust gas. For example, the housing arrangement 501 includes an injection mounting location 530 disposed between the mixing arrangement 544 and the treatment substrate 583. In some implementations, the reactant D is radially dispensed. In other implementations, the reactant D is tangentially dispensed. In some implementations, the reactant D is dispensed towards the mixing arrangement 544. For example, the reactant D can be dispensed into the swirl passage 549 of the mixing arrangement 544. In other implementations, the reactant D is dispensed towards the plate 548 of the mixing arrangement 544.

A restricting member 545 includes a restricted passage 547 that is defined by a duct 553 extending from a plate 552 towards the mixing arrangement 544. The restricting member plate 552 blocks exhaust from flowing past the restricting member 545 without passing through the restricted passage 547. The duct 553 has a frustro-conical shape. In certain implementations, an axial length of the duct 553 is smaller than an axial length of the deformed portions 550a, 550b of the mixing arrangement 544. In certain implementations, the axial length of the duct 553 is smaller than an axial length of one of the deformed portions 550a, 550b of the mixing arrangement 544.

The dispersing member 546 includes a plate defining a plurality of apertures. In certain examples, the apertures are positioned in a ring. In certain examples, the apertures are elongated along a circumference of the ring. In certain implementations, a portion of the dispersing plate that axially aligns with the exit of the duct 553 is solid. In certain implementations, the portion of the dispersing plate defines a central concave portion 559 that extends away from the restricting member 545.

In use, exhaust flows into the housing arrangement 501 through the inlet conduit 520, through the first treatment substrate 583, to the mixing assembly 540. Exhaust flows through the apertures 549 of the mixing arrangement 544 in a swirling pattern. Reactant is dispensed into the swirling flow (e.g., within the swirl passage 549 defined by the mixing arrangement 544). The reactant mixed flow swirls into the restricted passage 547 through the distal end of the duct 553. The flow swirls through the restricted passage 547 towards the dispersing member 546, which evens out the swirling flow across a transverse cross-section of the housing arrangement 501. The reactant mixed flow passes through the second treatment substrate 586 and exits the housing arrangement 501 at the outlet conduit 570.

FIGS. 16-21 illustrate another example implementation of a mixing assembly 640 suitable for use at mixing region 114 of FIG. 1. The mixing assembly 640 extends from a first axial end 641 to a second axial end 642. A circumferential wall 643 extends between the first and second axial ends 641, 642. In an example, the circumferential wall 643 defines an annular sidewall of the mixing assembly 640. In certain examples, the circumferential wall 643 defines the cross-dimension $D_M$ of the mixing region 114.

Figure 21:
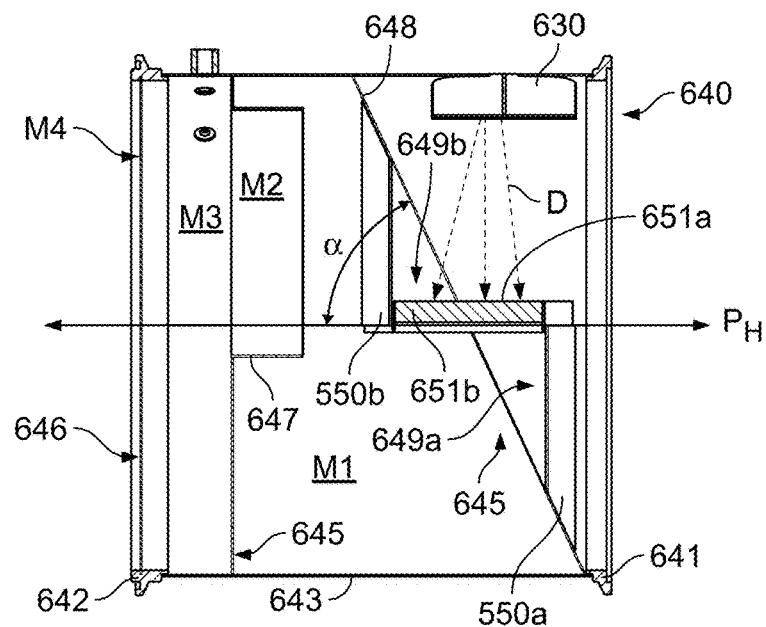
FIG. 21 is another axial cross-sectional view taken along the line 21-21 of FIG. 19.

The mixing assembly 640 includes a mixing arrangement 644, a restricting member 645, and a dispersing member 646 disposed within the circumferential wall 643. The restricting member 645 defines a restricted passage 647. As shown in FIG. 21, a first mixing region $M_1$ is defined between the mixing arrangement 644 and an entrance of the restricted passage 647. A second mixing region $M_2$ is defined within the restricted passage 647. A third mixing region $M_3$ is defined between an exit of the restricted passage 647 and the dispersing member 646. A fourth mixing region M4 is defined downstream of the dispersing member 646.

The mixing arrangement 644 is configured to cause swirling of the exhaust passing through the mixing arrangement 644. The restricting member 645 is configured to reduce an amount of unvaporized/unhydrolized reactant reaching a treatment substrate (e.g., at second treatment region 116 of FIG. 1). The dispersing member 646 is configured to even out the exhaust flow across the transverse cross-section of the housing after the exhaust passes through the mixing arrangement 645.

Figure 17:
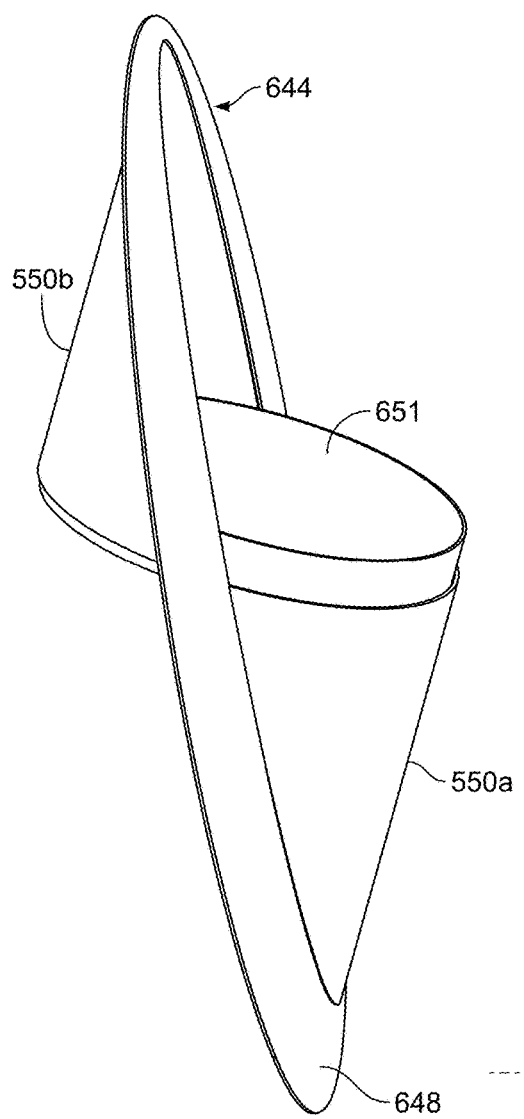
FIG. 17 is a perspective view of an example mixing arrangement utilized in the mixing assembly of FIG. 16.
Figure 20:
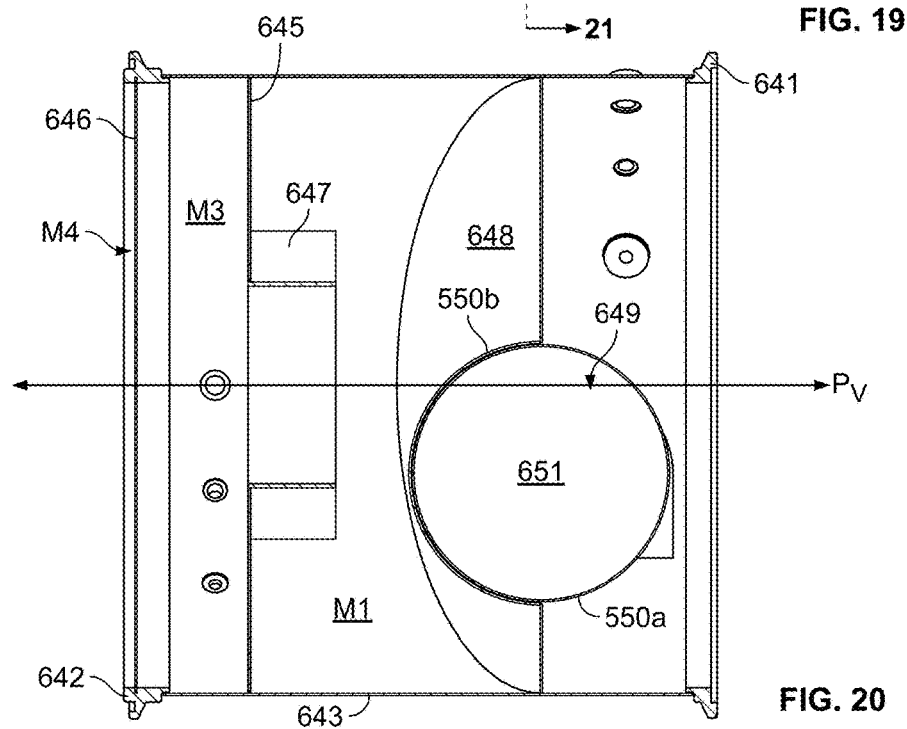
FIG. 20 is an axial cross-sectional view taken along the line 20-20 of FIG. 19.

As shown in FIGS. 17, 20, and 21, the mixing arrangement 644 includes a plate 648 that defines swirl passage 649 through which the exhaust is guided into a swirl pattern. A first portion 550a of the plate 648 deforms outwardly upstream of the plate 648 to define a first passage 649a. A second portion 550b of the plate 648 deforms outwardly downstream of the plate 648 to define a second passage 649b. In certain implementations, the first and second portions 550a, 550b are radially spaced from each other. In certain implementations, an entrance to the first passage 649a and an exit to the second passage 649b cooperate to define the swirl passage 649 (e.g., FIG. 18). In certain implementations, the swirl passage 649 extends along less than a radius of the plate 648 (e.g., see FIG. 20).

In some implementations, the plate 648 is disposed within the mixing housing so that the plate 648 extends generally orthogonal to the central longitudinal axis of the mixing assembly 640. In other implementations, the plate 648 is oriented at an angle α relative to the central longitudinal axis (see FIG. 21). In some examples, the angle α ranges from about 40° to about 80°. In certain examples, the angle α ranges from about 30° to about 60°. In some examples, the angle α ranges from about 55° to about 75°. In an example, the angle α is about 60°.

In some implementations, the swirl passage 649 is offset from a central longitudinal axis of the mixing assembly 640. For example, as shown in FIG. 20, the swirl passage 649 can be offset from a first central reference plane $P_V$ extending longitudinally along the mixing assembly 640. In an example, the first central reference plane $P_V$ is a vertically-extending reference plane. In certain implementations, a portion of the swirl passage 649 extends across the first central reference plane $P_V$. In examples, a majority of the swirl passage 649 is disposed to one side of the first central reference plane $P_V$.

In certain implementations, the swirl passage 649 also is offset from a second central reference plane $P_H$ extending longitudinally along the mixing assembly 640 (e.g., see FIG. 21). In certain examples, the second central reference plane $P_H$ is oriented generally orthogonal to the first central reference plane $P_V$. In an example, the second central reference plane $P_H$ is a horizontally-extending reference plane. Offsetting the swirl passage 649 relative to the central longitudinal axis enhances the swirling of the exhaust passing through the mixing assembly 640.

In some implementations, a mesh 651 (e.g., a wire mesh) is disposed within the swirl passage 649. In certain implementations, the mesh 651 is disposed between an exit of the second passage 649b and an entrance to the first passage 649a. In certain implementations, the mesh 651 is sized (e.g., the wire diameter and mesh density are sized) to inhibit unhydrolized/unvaporized reductant from passing through the mesh 651. For example, the unhydrolized/unvaporized reductant may impinge on the mesh 651 and break into smaller droplets prior to entering the restricted passage 647 downstream of the mixing arrangement 644. Breaking the droplets both decreases the size of and increases the number (and hence total surface area) of the droplets. The smaller size and increased surface area promotes evaporation of the droplets.

In certain implementations, the mesh 651 absorbs heat from the exhaust passing therethrough. The mesh 651 may pass some of the absorbed heat to the impinging droplets, which enhances evaporation of the droplets and/or inhibits deposition of the droplets on the restricting member 645. The mesh 651 is thermally isolated from the outer wall 643 of the mixing assembly 640 to inhibit cooling of the mesh and droplets. Droplets that impinge on the mesh 651 reside within the swirling exhaust flow while disposed on the mesh 651, which enhances evaporation of the droplets. In certain implementations, the mesh 651 heats up faster than a solid surface would, especially during transient exhaust conditions.

In some implementations, the mesh 651 has a circular or oval shape. The mesh 651 has a first major surface 651a that faces upstream of the plate 648 and a second major surface 651b that faces downstream of the plate 648. In certain implementations, the first and second major surfaces 651a, 651b extend generally parallel to the second central reference plane $P_H$ (FIG. 21) extending longitudinally along the mixing assembly 640. In certain implementations, both major surfaces 651a, 651b are disposed to one side of the second central reference plane $P_H$ (see FIG. 21).

Reactant D (e.g., shown schematically in FIG. 21) can be dispensed at the mixing assembly 640 to mix with the exhaust gas. For example, the mixing assembly 640 includes an injection mounting location 630 disposed between the mixing arrangement 644 and the downstream treatment substrate (e.g., at substrate region 116 of FIG. 1). In some implementations, the reactant D is radially dispensed. In other implementations, the reactant D is tangentially dispensed. In some implementations, the reactant D is dispensed towards the mesh 651 of the mixing arrangement 644. In some examples, the mesh 651 can be disposed and oriented to align with the nozzle of the dispenser. In other examples, the mesh 651 can be disposed at an offset from the nozzle of the dispenser and/or be oriented at a non-zero angle relative to the dispenser.

A restricting member 645 includes a restricted passage 647 that is defined by a duct 653 extending from a plate 652 towards the mixing arrangement 644. The restricting member plate 652 blocks exhaust from flowing past the restricting member 645 without passing through the restricted passage 647. In the example shown, the duct 653 has a tubular shape. In other examples, the duct 653 may have a frustro-conical or stepped shape. In certain implementations, an axial length of the duct 653 is smaller than an axial length of the deformed portions 650a, 650b of the mixing arrangement 644. In certain implementations, the axial length of the duct 653 is smaller than an axial length of one of the deformed portions 650a, 650b of the mixing arrangement 644.

In some implementations, a diameter D1 of the restricted passage 647 is between 25% and 75% of a diameter of the circumferential wall 643. In certain implementations, the diameter D1 of the restricted passage 647 is between 35% and 65% of the diameter of the circumferential wall 643. In certain implementations, the diameter D1 of the restricted passage 647 is between 45% and 55% of the diameter of the circumferential wall 643. In certain implementations, the diameter D1 of the restricted passage 647 is about 50% of the diameter of the circumferential wall 643.

Figure 18:
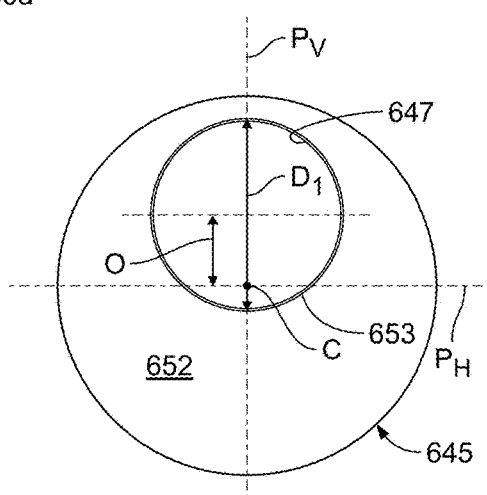
FIG. 18 is an upstream end view of an example restricting member utilized in the mixing assembly of FIG. 16.
Figure 19:
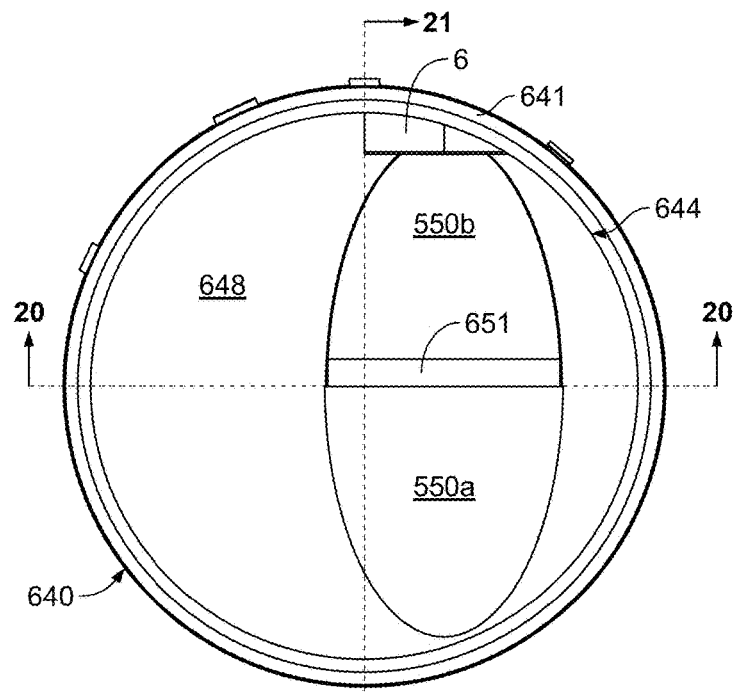
FIG. 19 is an upstream end view of the mixing assembly of FIG. 16.

In some implementations, the restricted passage 647 is offset from a central longitudinal axis C (FIG. 18) of the mixing assembly 640. For example, as shown in FIG. 18, the restricted passage 647 can be offset from the second central reference plane $P_H$ by an offset distance O. Offsetting the restricted passage 647 relative to the central longitudinal axis enhances the swirling of the exhaust in the first mixing region M1. In certain examples, a portion of the restricted passage 647 extends over the second central reference plane $P_H$. In an example, a majority of the restricted passage 647 is located at one side of the second central reference plane $P_H$. In certain implementations, the restricted passage 647 straddles the first central reference plane $P_V$. In examples, the first central reference plane $P_V$ bisects the restricted passage 647.

In certain implementations, the restricted passage 647 is offset from the central longitudinal axis C in a different direction than the swirl passage 649. In certain examples, the restricted passage 647 is offset from the central longitudinal axis C in a first direction and the swirl passage 649 is offset from the central longitudinal axis C in a second direction that is not aligned with the first direction. In examples, the first and second directions are generally orthogonal to each other. For example, the swirl passage 649 can be offset along the second central reference plane $P_H$ and the restricted passage 647 can be offset along the first central reference plane $P_V$. In other examples, the first and second directions can be otherwise angled relative to or opposite to each other.

The dispersing member 646 is configured to expand the swirling flow within the mixing assembly 640 to enhance reactant distribution at the downstream aftertreatment substrate. For example, the dispersing member 646 may straighten out the swirling flow to more evenly distribute the exhaust flow and reactant across a transverse cross-section of the fourth mixing region $M_4$. The dispersing member 646 includes a plate 655 having an upstream face and a downstream face. In examples, the plate 655 extends fully across a transverse dimension of the mixing assembly 640 so that peripheral edges of the plate 655 contact the circumferential wall 643.

The plate 655 of the dispersing member 646 defines a plurality of apertures 658 extending between the upstream and downstream faces. In certain examples, the apertures 658 are oriented to straighten out the exhaust passing through the apertures 658. In certain examples, the apertures 658 are positioned in a ring. In certain examples, the apertures 658 are elongated along a circumference of the ring. In certain examples, each aperture 658 defines a super ellipse. In certain examples, each aperture 658 has a kidney shape. In certain examples, each aperture 658 has a trapezoidal shape.

Figure 22:
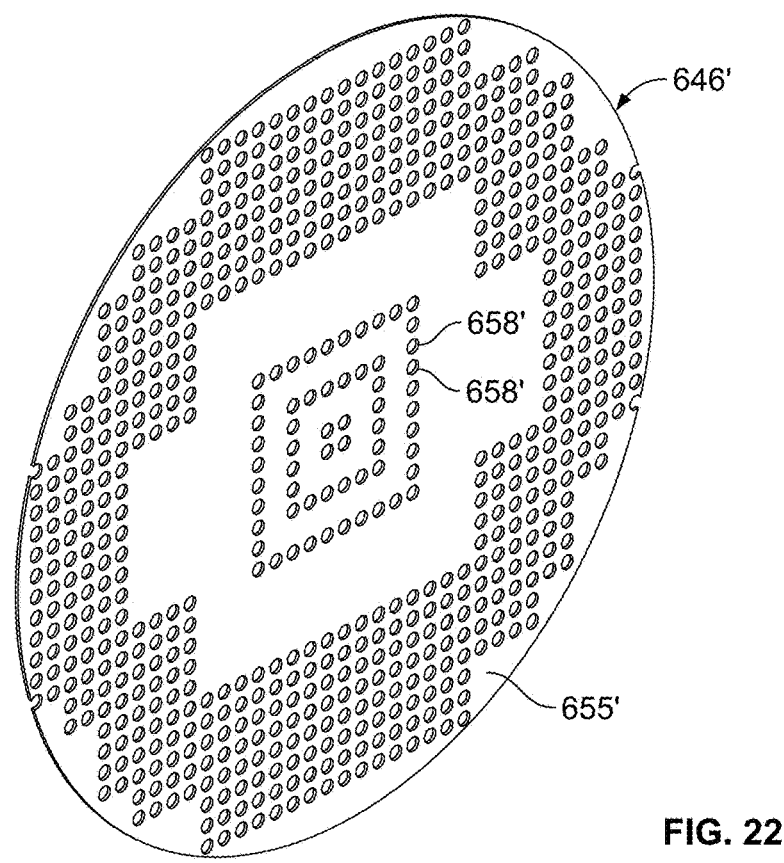
FIG. 22 is a perspective view of another diffuser member suitable for use in any of the mixing assemblies described herein.
Figure 23:
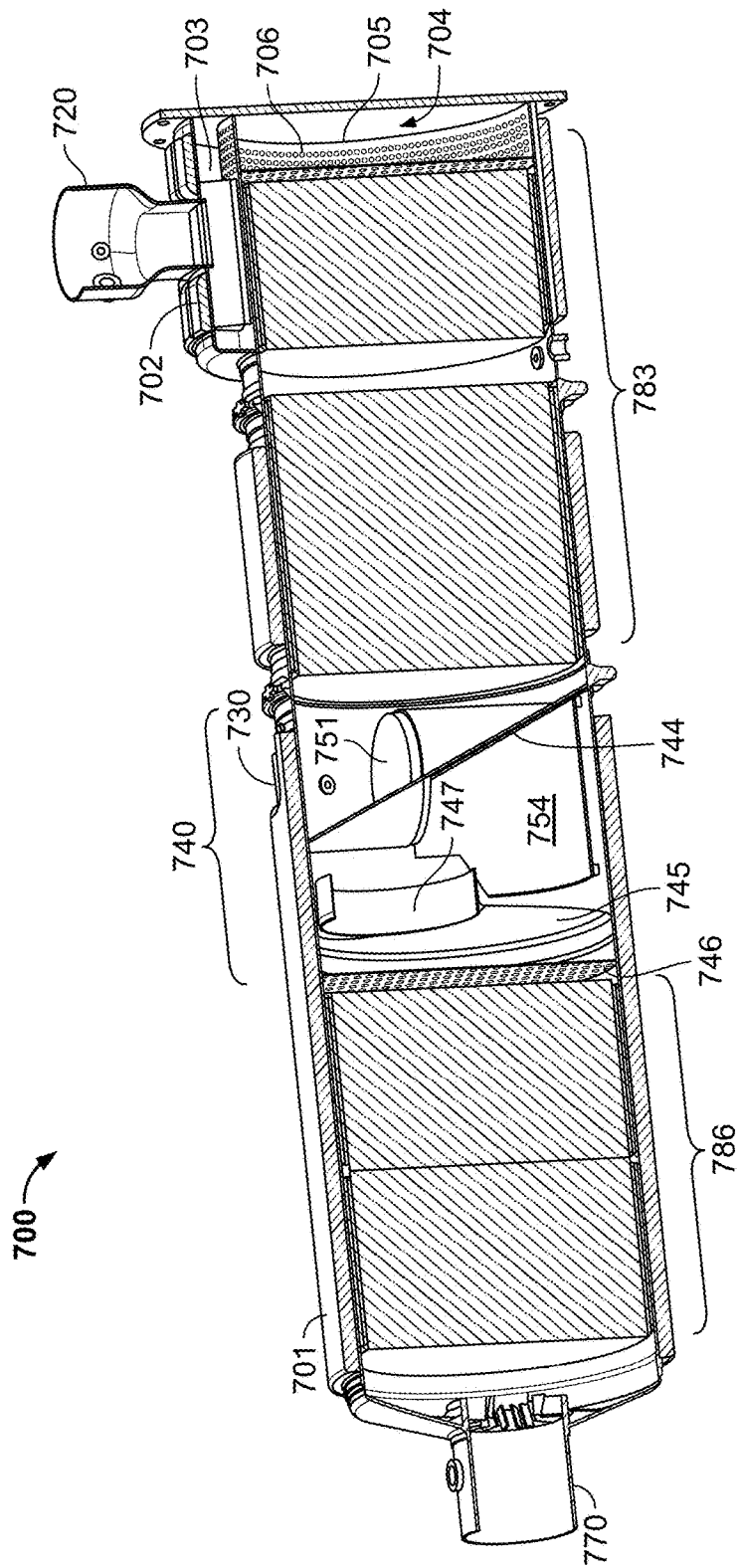
FIG. 23 is a perspective axial cross-sectional view of another example implementation of the exhaust treatment device of FIG. 1.

FIG. 22 illustrates an alternative implementation of a dispersing member 646' including a plate 655' defining a plurality of apertures 658'. In certain examples, the apertures 658' are concentrated in an outer radial portion of the plate 655'. For example, in certain implementations, a majority of the apertures 658' can be disposed in an outer pattern while one or more apertures 658' form a pattern at a central portion of the plate 655'. In the example shown, the apertures 658' define three concentric rectangles at a central portion of the plate. In the example shown, the apertures 658' are disposed in an inverse perforation pattern.

In use, the mixing assembly 640 is disposed within a housing arrangement. The exhaust flows into the housing arrangement through the inlet conduit, through the first treatment substrate, to the mixing assembly 640. Exhaust flows through the swirl passage 649 of the mixing arrangement 644 in a swirling pattern. Reactant is dispensed into the swirling flow (e.g., at the mesh 651 disposed in the swirl passage 649). The reactant mixed flow swirls into the restricted passage 647 through the distal end of the duct 653. The flow swirls through the restricted passage 647 towards the dispersing member 646, 646', which evens out the swirling flow across a transverse cross-section of the housing arrangement. The reactant mixed flow passes through the second treatment substrate and exits the housing arrangement at the outlet conduit.

FIGS. 23-26 illustrate another example implementation 700 of the exhaust treatment device 100 of FIG. 1. The exhaust treatment device 700 includes a housing arrangement 701 extending between an inlet conduit 720 and an outlet conduit 770. A cross-dimension (e.g., a diameter) of the housing arrangement 701 is generally consistent along a length of the housing arrangement 701. The cross-dimension of the housing arrangement 701 is larger than a cross-dimension of any exhaust conduits coupled to the inlet conduit 720 and/or the outlet conduit 770.

The housing arrangement 701 holds a treatment substrate arrangement 786 downstream of a mixing assembly 740. In certain implementations, the treatment substrate arrangement 786 includes one or more treatment substrates. For example, one or more of the treatment substrates of the treatment substrate arrangement 786 includes an SCR substrate. In certain implementations, the axial length of the mixing assembly 740 is no greater than the cross-dimension of the treatment substrate arrangement 786.

In certain examples, the axial length of the mixing assembly 740 is no greater than about 95% of the cross-dimension of the treatment substrate arrangement 786. In certain examples, the axial length of the mixing assembly 740 is no greater than about 90% of the cross-dimension of the treatment substrate arrangement 786. In other implementations, the axial length of the mixing assembly 740 is no greater than about 110% of the cross-dimension of the treatment substrate arrangement 786. In other implementations, the axial length of the mixing assembly 740 is no greater than about 115% of the cross-dimension of the treatment substrate arrangement 786. In certain implementations, the axial length of the mixing assembly 740 is no greater than about 105% of the cross-dimension of the treatment substrate arrangement 786.

In certain implementations, the axial length of the mixing assembly 740 is no less than about 85% of the cross-dimension of the treatment substrate arrangement 786. In certain implementations, the axial length of the mixing assembly 740 is no less than about 90% of the cross-dimension of the treatment substrate arrangement 786. In certain implementations, the axial length of the mixing assembly 740 is no less than about 95% of the cross-dimension of the treatment substrate arrangement 786. In other implementations, however, the axial length of the mixing assembly 740 can be any desired.

In certain implementations, the housing arrangement 701 also holds a treatment substrate 783 upstream of the mixing assembly 740. In various implementations, the upstream treatment substrate 783 can be a DPF or a DOC. In certain implementations, both a DPF and a DOC are disposed upstream of the mixing assembly 740. In certain implementations, the upstream treatment substrate 783 has substantially the same cross-dimension as the downstream treatment substrate arrangement 786.

In some implementations, the inlet conduit 720 connects to the housing arrangement 701 at a location spaced axially inwardly from an axial end of the housing arrangement 701. For example, the inlet conduit 720 may connect to the housing arrangement 701 at a location radially aligned with an outer wall of the upstream treatment substrate 783. In certain implementations, the housing arrangement 701 includes a radially enlarged section 702 adjacent the inlet conduit 720 so that exhaust entering the housing arrangement 701 from the inlet conduit 720 flows both axially and circumferentially along the upstream treatment substrate 783 prior to passing through the upstream treatment substrate 783. In particular, the exhaust can flow through an outer passage 703 defined by the radially enlarged section 702 and the upstream treatment substrate 783.

In certain implementations, a perforated flange 705 is disposed within the radially enlarged section 702 to separate the outer passage 703 from an inner passage 704 leading to the upstream end face of the upstream treatment substrate 783. The perforated flange 703 defines holes 704 that allow exhaust to flow from the outer passage 703 to the inner passage 704. In some examples, the outer passage 703 extends a full 360° around the treatment substrate 783. In such examples, the perforated flange 705 defines an annular ring. In other examples, the outer passage 703 extends along only a portion of the circumference of the treatment substrate 783.

In the example shown in FIGS. 23-26, the mixing assembly 740 is substantially similar to the mixing assembly 640 shown in FIGS. 16-21. The mixing assembly 740 extends from a first axial end 741 to a second axial end 742. In the example shown, the first axial end 741 is defined by the downstream end face of the upstream treatment substrate 783 and the second axial end 742 is defined by the upstream end face of the downstream treatment substrate 786. A circumferential wall 743 extends at least between the first and second axial ends 741, 742. In an example, the circumferential wall 743 defines part of an annular sidewall of the housing arrangement 701. In certain examples, the circumferential wall 743 defines the cross-dimension $D_M$ of the mixing region 114.

Figure 26:
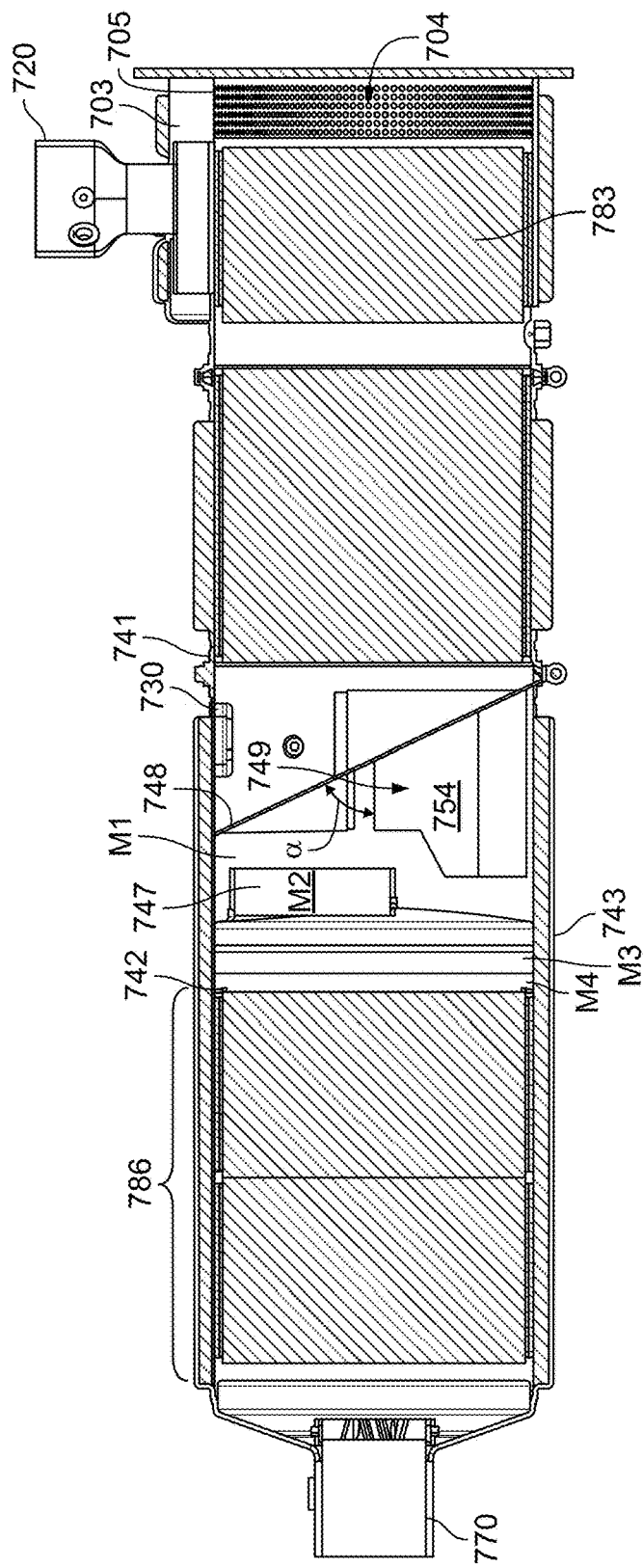
FIG. 26 is an axial cross-sectional view of the exhaust treatment device of FIG. 23.

The mixing assembly 740 includes a mixing arrangement 744, a restricting member 745, and a dispersing member 746 disposed within the circumferential wall 743. The restricting member 745 defines a restricted passage 747. As shown in FIG. 26, a first mixing region $M_1$ is defined between the mixing arrangement 744 and an entrance of the restricted passage 747. A second mixing region $M_2$ is defined within the restricted passage 747. A third mixing region $M_3$ is defined between an exit of the restricted passage 747 and the dispersing member 746. A fourth mixing region M4 is defined downstream of the dispersing member 746.

The mixing arrangement 744 is configured to cause swirling of the exhaust passing through the first mixing region $M_1$. In certain examples, the mixing arrangement 744 also causes swirling of the exhaust in the second mixing region $M_2$. The restricting member 745 is configured to reduce an amount of unvaporized/unhydrolized reactant reaching a treatment substrate (e.g., at second treatment region 116 of FIG. 1). The dispersing member 746 is configured to even out the exhaust flow across the transverse cross-section of the housing after the exhaust passes through the mixing arrangement 745.

Figure 24:
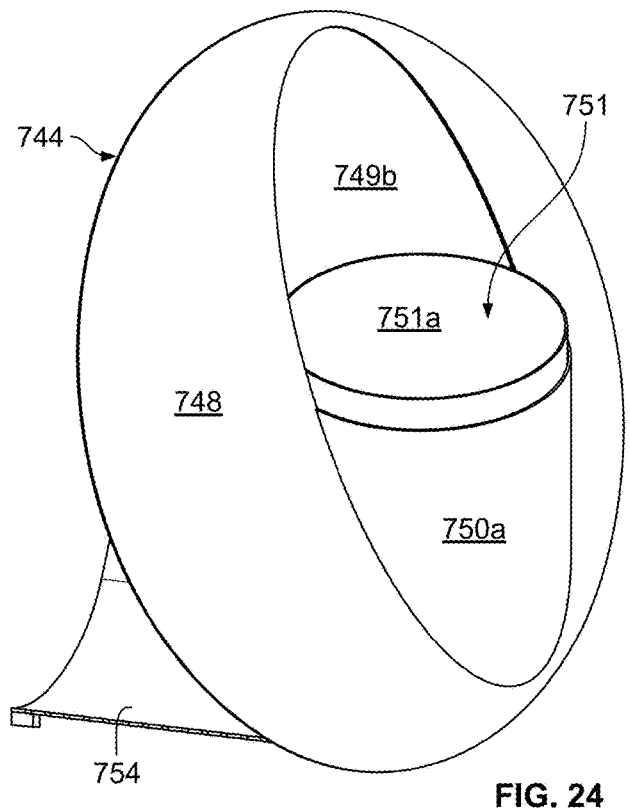
FIG. 24 is a perspective view of the upstream end of the mixing arrangement of the mixing assembly shown in FIG. 23.
Figure 25:
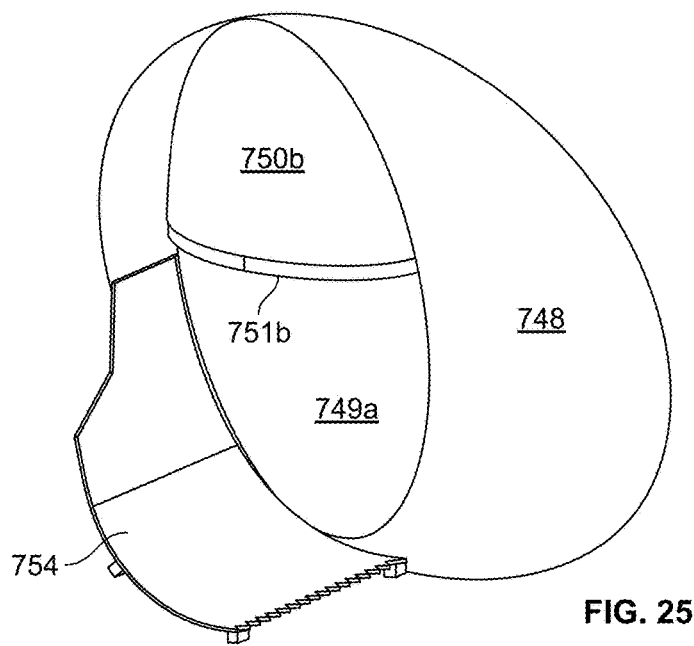
FIG. 25 is a perspective view of the downstream end of the mixing arrangement of the mixing assembly shown in FIG. 23.

As shown in FIGS. 24-26, the mixing arrangement 744 includes a plate 748 that defines swirl passage 749 through which the exhaust is guided into a swirl pattern. A first portion 750a of the plate 748 deforms outwardly upstream of the plate 748 to define a downstream passage 749a. A second portion 750b of the plate 748 deforms outwardly downstream of the plate 748 to define an upstream passage 749b. In certain implementations, the first and second portions 750a, 750b are radially spaced from each other. In certain implementations, an entrance to the downstream passage 749a and an exit to the upstream passage 749b cooperate to define the swirl passage 749. In certain implementations, the swirl passage 749 extends along less than a radius of the plate 748.

In some implementations, the plate 748 is disposed within the mixing housing so that the plate 748 extends generally orthogonal to the central longitudinal axis of the mixing assembly 740. In other implementations, the plate 748 is oriented at an angle α relative to the central longitudinal axis (see FIG. 26). In some examples, the angle α ranges from about 30° to about 90°. In certain examples, the angle α ranges from about 40° to about 80°. In some examples, the angle α ranges from about 50° to about 70°. In certain examples, the angle α ranges from about 55° to about 65°. In certain examples, the angle α ranges from about 55° to about 70°. In certain examples, the angle α ranges from about 50° to about 65°. In an example, the angle α is about 60°.

In some implementations, the swirl passage 749 is offset from a central longitudinal axis of the mixing assembly 740. For example, the swirl passage 749 can be offset from a first central reference plane extending longitudinally along the mixing assembly 740. In an example, the first central reference plane is a vertically-extending reference plane. In certain implementations, a portion of the swirl passage 749 extends across the first central reference plane. In examples, a majority of the swirl passage 749 is disposed to one side of the first central reference plane.

In certain implementations, the swirl passage 749 also is offset from a second central reference plane extending longitudinally along the mixing assembly 740. In certain examples, the second central reference plane is oriented generally orthogonal to the first central reference plane. In an example, the second central reference plane is a horizontally-extending reference plane. Offsetting the swirl passage 749 relative to the central longitudinal axis enhances the swirling of the exhaust passing through the mixing assembly 740.

In some implementations, a mesh 751 (e.g., a wire mesh) is disposed within the swirl passage 749. In certain implementations, the mesh 751 is disposed between an exit of the upstream passage 749b and an entrance to the downstream passage 749a. In certain implementations, the mesh 751 is sized (e.g., the wire diameter and mesh density are sized) to inhibit unhydrolized/unvaporized reductant from passing through the mesh 751. For example, the unhydrolized/unvaporized reductant may impinge on the mesh 751 and break into smaller droplets prior to entering the restricted passage 747 downstream of the mixing arrangement 744. Breaking the droplets both decreases the size of and increases the number (and hence total surface area) of the droplets. The smaller size and increased surface area promotes evaporation of the droplets.

In certain implementations, the mesh 751 absorbs heat from the exhaust passing therethrough. The mesh 751 may pass some of the absorbed heat to the impinging droplets, which enhances evaporation of the droplets and/or inhibits deposition of the droplets on the restricting member 745. The mesh 751 is thermally isolated from the outer wall 743 of the mixing assembly 740 to inhibit cooling of the mesh and droplets. Droplets that impinge on the mesh 751 reside within the swirling exhaust flow while disposed on the mesh 751, which enhances evaporation of the droplets. In certain implementations, the mesh 751 heats up faster than a solid surface would, especially during transient exhaust conditions.

In some implementations, the mesh 751 has a circular or oval shape. The mesh 751 has a first major surface 751a that faces upstream of the plate 648 and a second major surface 751b that faces downstream of the plate 748. In certain implementations, the first and second major surfaces 751a, 751b extend generally parallel to the second central reference plane extending longitudinally along the mixing assembly 740. In certain implementations, both major surfaces 751a, 751b are disposed to one side of the second central reference plane.

Reactant can be dispensed at the mixing assembly 740 to mix with the exhaust gas. For example, the mixing assembly 740 includes an injection mounting location 730 disposed between the mixing arrangement 744 and the downstream treatment substrate 786. In some implementations, the reactant is radially dispensed. In other implementations, the reactant is tangentially dispensed. In some implementations, the reactant is dispensed towards the mesh 751 of the mixing arrangement 744. In some examples, the mesh 751 can be disposed and oriented to align with the nozzle of the dispenser. In other examples, the mesh 751 can be disposed at an offset from the nozzle of the dispenser and/or be oriented at a non-zero angle relative to the dispenser.

In certain implementations, a flange 754 may be disposed downstream of the plate 748. The flange 754 aligns with the second major surface 751b of the mesh 751. Accordingly, any reactant passing through the mesh 751 without being caught in the exhaust flow impinges on the flange 754 instead of on the circumferential wall 743. The flange 754 maintains the reactant within the heated exhaust flow and away from the cooler circumferential wall 743, thereby reducing deposits of the reactant within the mixing assembly 740. In some implementations, the flange 754 forms part of the mixing arrangement 744. In other implementations, the flange 754 is a separate piece disposed at the mixing arrangement 744.

The restricting member 745 is substantially the same as the restricting member 644 of FIGS. 16-21. The dispersing member 746 is configured to expand the swirling flow within the mixing assembly 740 to enhance reactant distribution at the downstream aftertreatment substrate. For example, the dispersing member 746 may straighten out the swirling flow to more evenly distribute the exhaust flow and reactant across a transverse cross-section of the fourth mixing region $M_4$. In some implementations, the dispersing member 746 is substantially the same as the dispersing member 646 of FIG. 16. In other implementations, the dispersing member 746 is substantially the same as the dispersing member 646' of FIG. 22.

FIGS. 27-37 illustrate another example implementation 800 of the exhaust treatment device 100 of FIG. 1. The exhaust treatment device 800 includes a housing arrangement 801 extending between an inlet conduit 820 and an outlet conduit 870. In some implementations, the inlet conduit 820 connects to the housing arrangement 801 at a location spaced axially inwardly from an axial end of the housing arrangement 801. In other implementations, the inlet conduit 820 could extend from the axial end of the housing arrangement 801. A cross-dimension (e.g., a diameter) of the housing arrangement 801 is generally consistent along a length of the housing arrangement 801. The cross-dimension of the housing arrangement 801 is larger than a cross-dimension of any exhaust conduits coupled to the inlet conduit 820 and/or the outlet conduit 870.

The housing arrangement 801 holds a treatment substrate arrangement 886 downstream of a mixing assembly 840. In certain implementations, the treatment substrate arrangement 886 includes one or more treatment substrates. For example, one or more of the treatment substrates of the treatment substrate arrangement 886 includes an SCR substrate. In some implementations, the axial length of the mixing assembly 840 is no greater than 150% the axial length of the treatment substrate arrangement 886. In certain implementations, the axial length of the mixing assembly 840 is no greater than 125% the axial length of the treatment substrate arrangement 886. In certain implementations, the axial length of the mixing assembly 840 is no greater than the axial length of the treatment substrate arrangement 886.

In certain implementations, the housing arrangement 801 also holds a treatment substrate 883 upstream of the mixing assembly 840. In various implementations, the upstream treatment substrate 883 can be a DPF or a DOC. In certain implementations, both a DPF and a DOC are disposed upstream of the mixing assembly 840. In certain implementations, the upstream treatment substrate 883 has substantially the same cross-dimension as the downstream treatment substrate arrangement 886.

Figure 28:
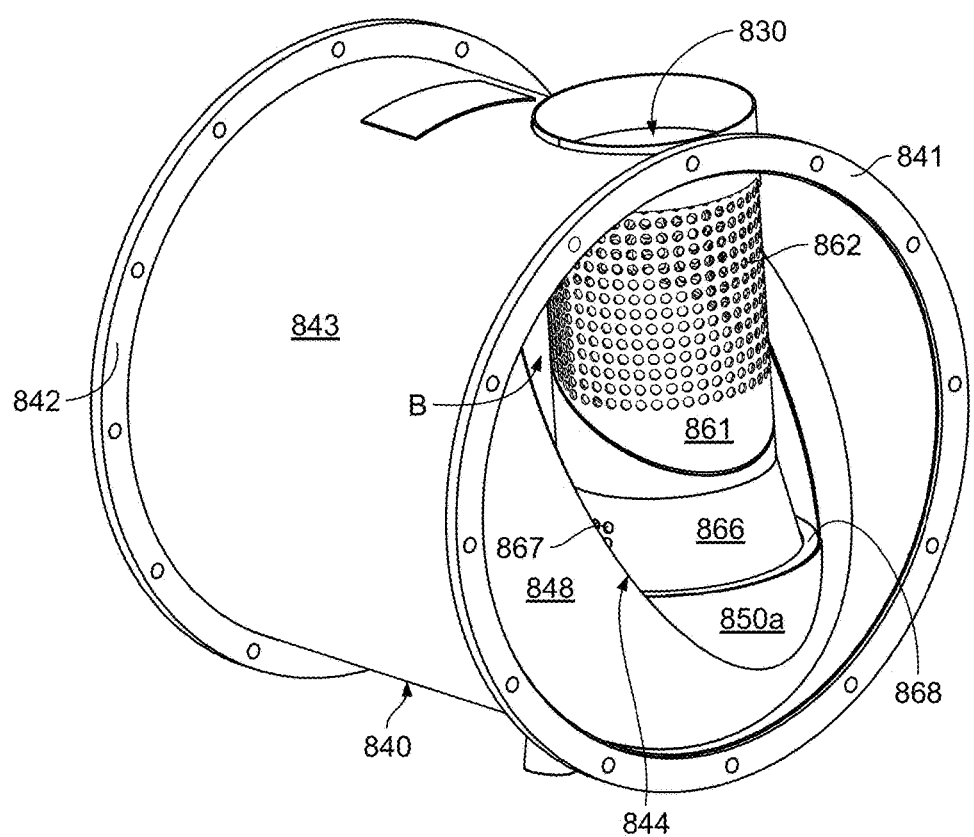
FIG. 28 is a perspective view of an example mixing assembly suitable for use with the exhaust treatment device of FIG. 27.
Figure 29:
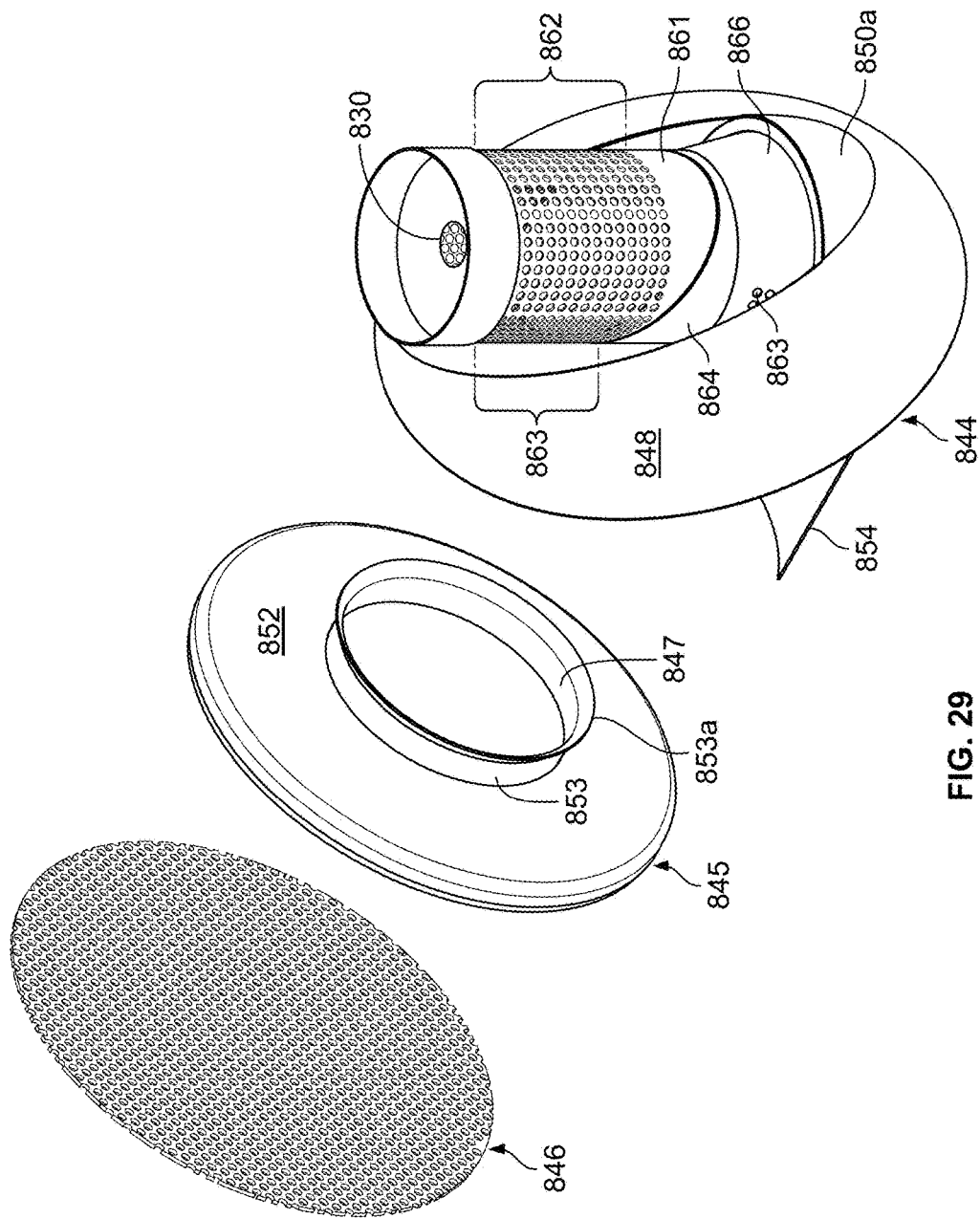
FIG. 29 is an exploded view of the mixing assembly of FIG. 28 with a housing removed.

In the example shown in FIG. 28, the mixing assembly 840 extends from a first axial end 841 to a second axial end 842. A circumferential wall 843 extends between the first and second axial ends 841, 842. In the example shown, the first axial end 841 is defined by the upstream housing clamp and the second axial end 842 is defined by the downstream housing clamp. In an example, the circumferential wall 843 defines part of an annular sidewall of the housing arrangement 801. In certain examples, the circumferential wall 843 defines the cross-dimension $D_M$ of the mixing region 114.

Figure 27:
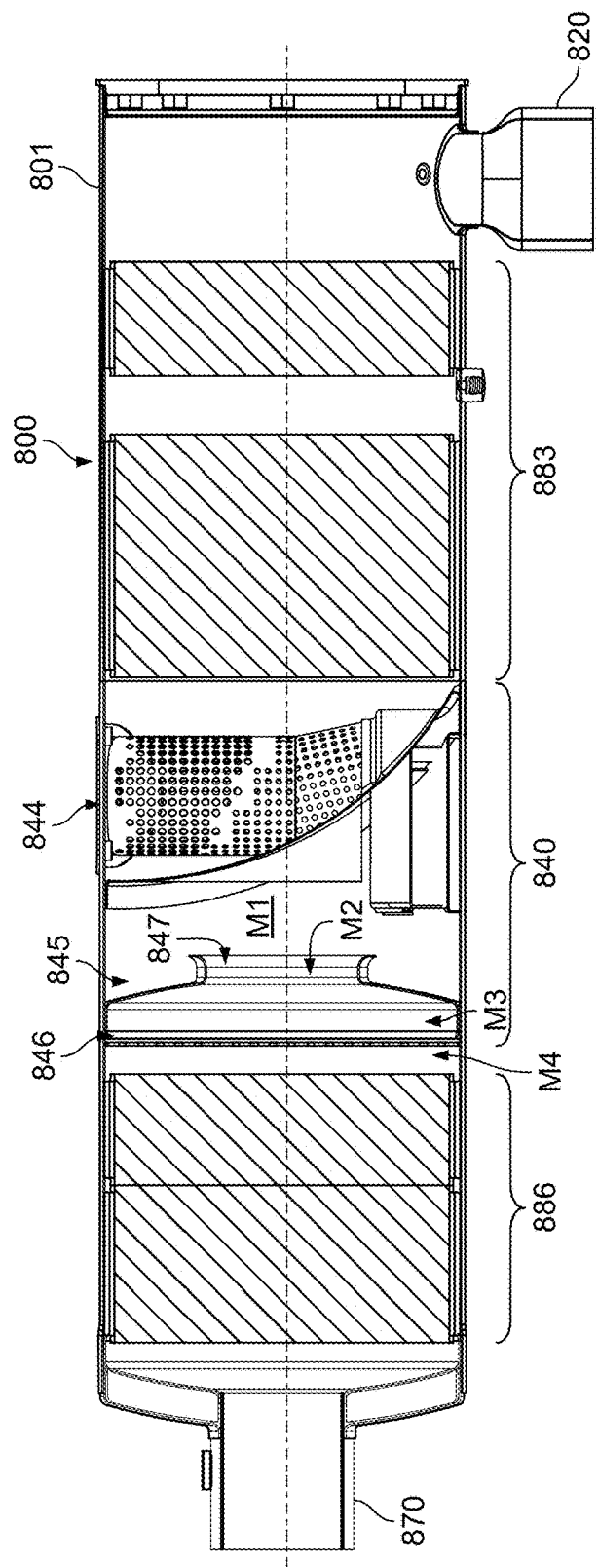
FIG. 27 is an axial cross-sectional view of another example implementation of the exhaust treatment device of FIG. 1.

The mixing assembly 840 includes a mixing arrangement 844, a restricting member 845, and a dispersing member 846 disposed within the circumferential wall 843. The restricting member 845 defines a restricted passage 847. As shown in FIG. 27, a first mixing region $M_1$ is defined between the mixing arrangement 844 and an entrance of the restricted passage 847. A second mixing region $M_2$ is defined within the restricted passage 847. A third mixing region $M_3$ is defined between an exit of the restricted passage 847 and the dispersing member 846. A fourth mixing region $M_4$ is defined downstream of the dispersing member 846.

The mixing arrangement 844 is configured to cause swirling of the exhaust passing through the first mixing region $M_1$. In certain implementations, the mixing arrangement 844 is configured to cause swirling of the exhaust passing through the second mixing region $M_2$. The restricting member 845 is configured to reduce an amount of unvaporized/unhydrolized reactant reaching a treatment substrate (e.g., at second treatment region 116 of FIG. 1). The dispersing member 846 is configured to even out the exhaust flow across the transverse cross-section of the housing after the exhaust passes through the mixing arrangement 845.

As shown in FIGS. 29-33, the mixing arrangement 844 includes a plate 848 that defines passage 849 through which the exhaust is guided into a swirl pattern. A first portion 850*a* of the plate 848 deforms outwardly upstream of the plate 848 to define a downstream portion of the passage 849. A second portion 850*b* of the plate 848 deforms outwardly downstream of the plate 848 to define an upstream portion of the passage 849. In some implementations, the passage 849 extends along no more than a radius of the plate 848. In certain implementations, the passage 849 extends along less than a radius of the plate 848.

In some implementations, the plate 848 is disposed within the mixing housing 843 so that the plate 848 extends generally orthogonal to the central longitudinal axis of the mixing assembly 840. In other implementations, the plate 848 is oriented at an angle α relative to the central longitudinal axis C (see FIG. 30). In some examples, the angle α ranges from about 40° to about 80°. In certain examples, the angle α ranges from about 45° to about 75°. In certain examples, the angle α ranges from about 50° to about 70°. In certain examples, the angle α ranges from about 55° to about 65°. In an example, the angle α is about 60°.

Figure 30:
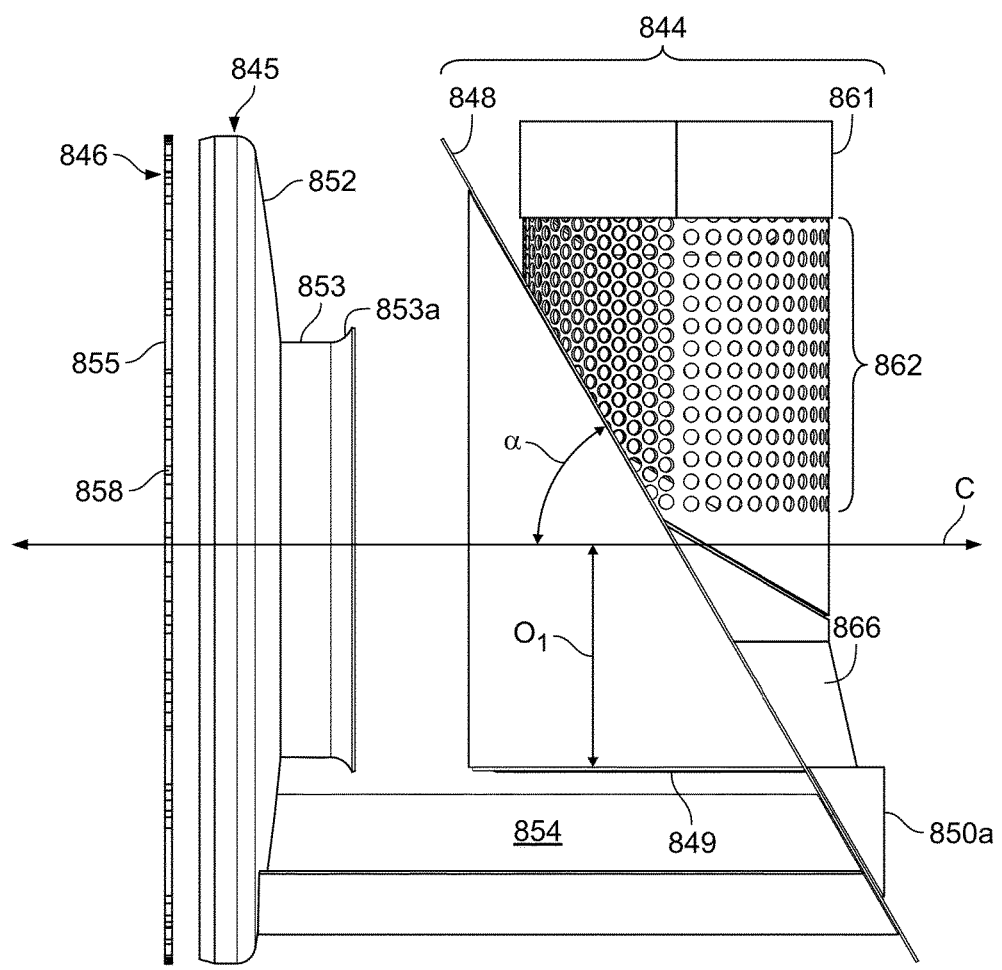
FIG. 30 is a side elevational view of the mixing assembly of FIG. 29 with the components more appropriately spaced.
Figure 31:
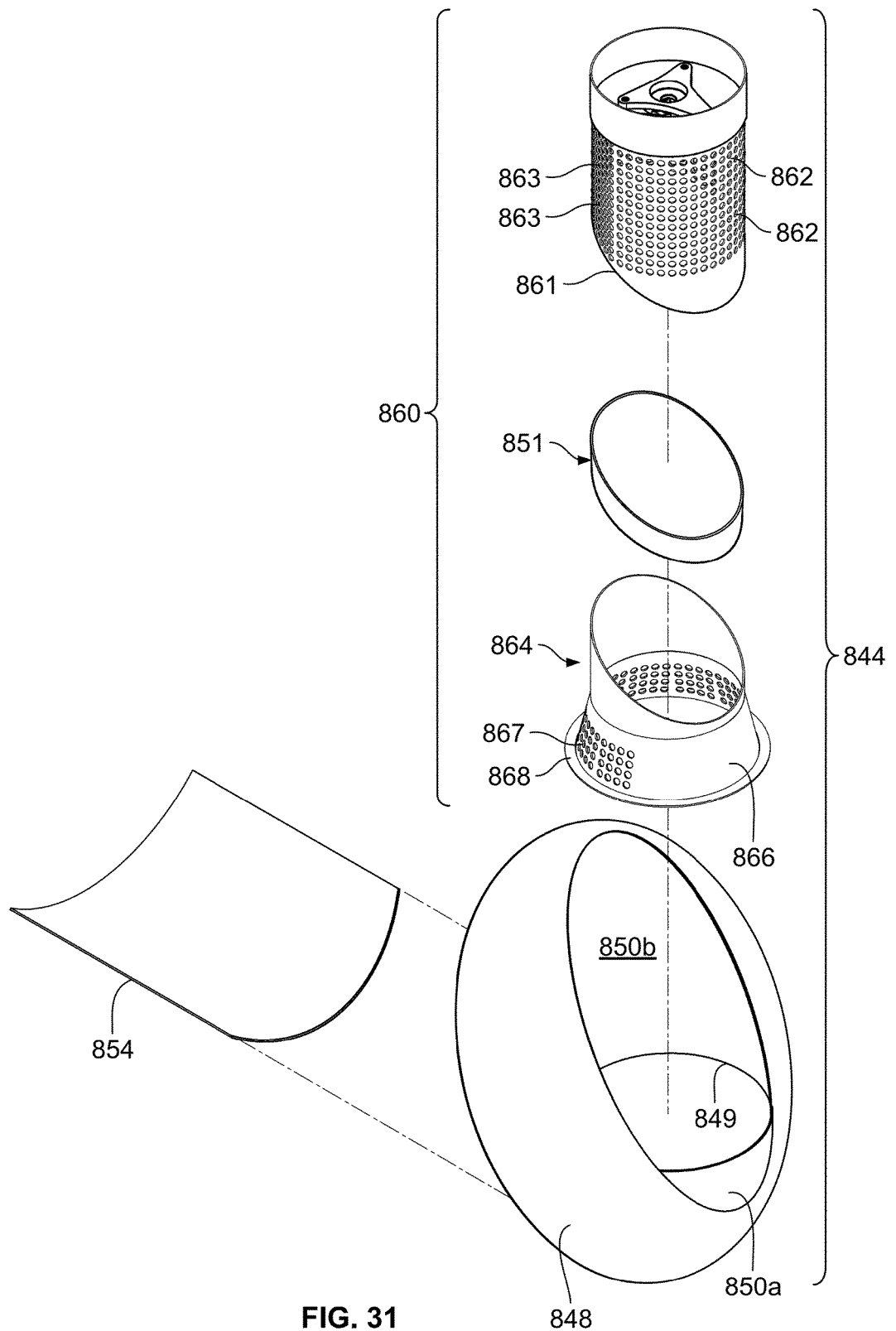
FIG. 31 is an exploded view of a mixing arrangement of the mixing assembly of FIG. 28.
Figure 32:
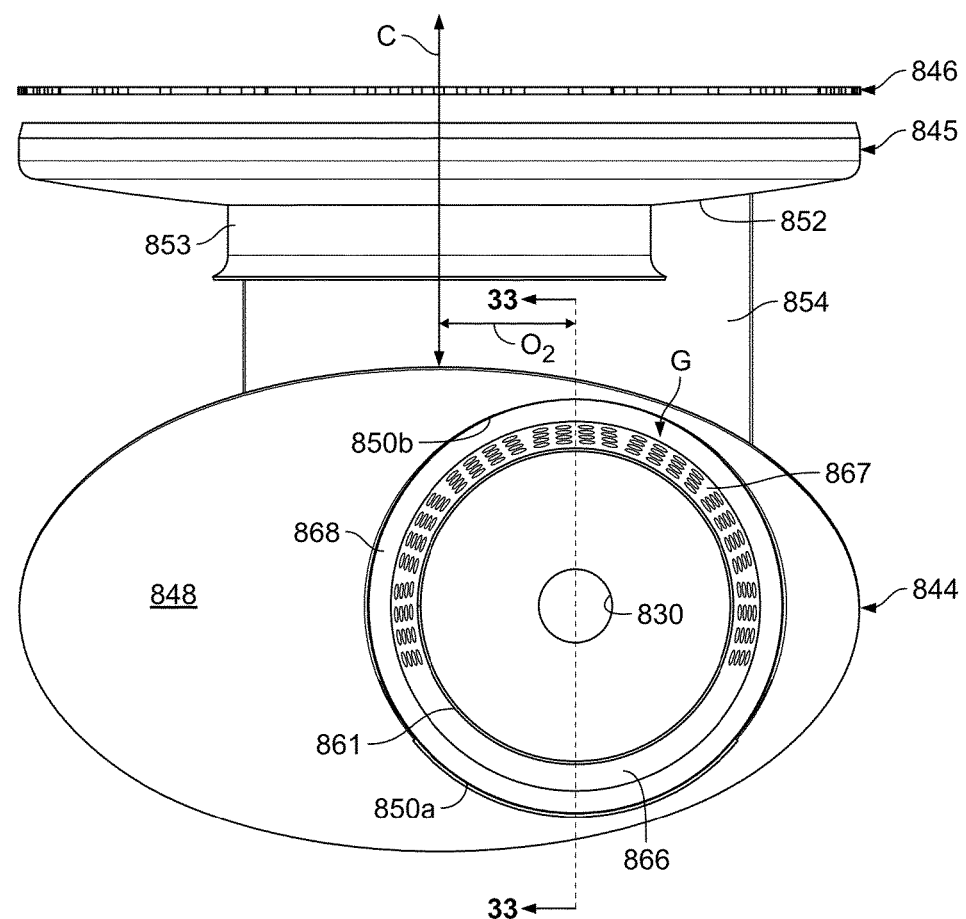
FIG. 32 is a top plan view of the mixing assembly of FIG. 30.

In some implementations, the passage 849 is offset from a central longitudinal axis C of the mixing assembly 840. Offsetting the passage 849 relative to the central longitudinal axis C enhances the swirling of the exhaust passing through the mixing assembly 840. In certain implementations, the passage 849 is offset from the central longitudinal axis C by a distance $O_1$ in a first direction transverse to the central longitudinal axis C (FIG. 30). For example, the passage 849 can be offset so that the downstream end of the passage 849 is closer to the annular wall 843 than the upstream end of the passage 849. In certain implementations, the passage 849 is offset from the central longitudinal axis C by a distance $O_2$ in a second direction transverse to both the central longitudinal axis C and the first direction (FIG. 32). In the example shown, the second direction extends along a plane defined by the open face of the passage 849.

In some implementations, the mixing assembly 840 includes a mesh 851 (e.g., a wire mesh) aligned with the passage 849 so that at least some of the flow passes through the mesh 851 before passing through the passage 849. In certain implementations, the mesh 851 is sized (e.g., the wire diameter and mesh density are sized) to inhibit unhydrolized/unvaporized reductant from passing through the mesh 851. For example, the unhydrolized/unvaporized reductant may impinge on the mesh 851 and break into smaller droplets prior to entering the restricted passage 847 downstream of the mixing arrangement 844. Breaking the droplets both decreases the size of and increases the number (and hence total surface area) of the droplets. The smaller size and increased surface area promotes evaporation of the droplets.

In certain implementations, the mesh 851 absorbs heat from the exhaust passing therethrough. The mesh 851 may pass some of the absorbed heat to the impinging droplets, which enhances evaporation of the droplets and/or inhibits deposition of the droplets on the restricting member 845. The mesh 851 is thermally isolated from the outer wall 843 of the mixing assembly 840 to inhibit cooling of the mesh and droplets. Droplets that impinge on the mesh 851 reside within the swirling exhaust flow while disposed on the mesh 851, which enhances evaporation of the droplets. In certain implementations, the mesh 851 heats up faster than a solid surface would, especially during transient exhaust conditions.

In some implementations, the mesh 851 has a circular or oval shape. The mesh 851 has a first major surface that faces upstream of the plate 848 and a second major surface that faces downstream of the plate 848. In some implementations, the first and second major surfaces extend generally parallel with the central longitudinal axis C of the mixing assembly 840. In other implementations, the first and second major surfaces are angled relative to the central longitudinal axis C.

In certain implementations, at least the first major surface of the mesh 851 is angled between about 0° and about 45° relative to the central longitudinal axis C. In certain implementations, at least the first major surface of the mesh 851 is angled between about 10° and about 40° relative to the central longitudinal axis C. In certain implementations, at least the first major surface of the mesh 851 is angled between about 20° and about 35° relative to the central longitudinal axis C. In certain implementations, at least the first major surface of the mesh 851 is angled between about 25° and about 35° relative to the central longitudinal axis C. In certain implementations, at least the first major surface of the mesh 851 is angled between about 20° and about 30° relative to the central longitudinal axis C. In an example, the first major surface of the mesh 851 is angled about 30°. In an example, the first major surface of the mesh 851 is angled about 25°.

In some implementations, the mesh is disposed in a mesh holder 860, which includes an annular conduit 861 extending outwardly from the upstream face of the mesh 851. The annular conduit 861 defines one or more apertures through which the exhaust flow can enter the annular conduit 861. The annular conduit 861 guides the exhaust flow to the upstream face of the mesh 851. In certain implementations, the upstream face of the mesh 851 is angled relative to the central longitudinal axis Tc of the annular conduit 861. The annular conduit 861 has a smaller diameter than the second deformed portion 850b of the plate 848. Accordingly, a gap G (FIG. 33) extends between the annular conduit 861 and the second deformed portion 850b of the plate 848 to enable exhaust to flow along the entire circumference of the annular conduit 861.

In certain implementations, the annular conduit 861 aids in guiding the exhaust flow to the upstream face of the mesh 851 in a relatively even distribution. In some implementations, the annular conduit 861 defines a first set of apertures 862 at an upstream side of the annular conduit 861 and a second set of apertures 863 at a downstream side of the annular conduit 861. In certain implementations, the downstream side of the annular conduit 861 is more open (e.g., has more or larger apertures) than the upstream side of the annular conduit 861. In certain implementations, the apertures 862, 863 are sized and distributed along the annular conduit 861 to encourage a consistent distribution of exhaust flow within the annular conduit 861.

Reactant can be dispensed at the mixing assembly 840 to mix with the exhaust gas. For example, the mixing assembly 840 includes an injection mounting location 830 at an axial end of the annular conduit 861 so that a dispenser D mounted at the injection mounting location 830 sprays in a code extending along the central longitudinal axis Tc of the annular conduit 861 (see FIG. 33). The reactant is dispensed towards the mesh 851 of the mixing arrangement 844. In certain examples, the mesh 851 is oriented at a non-zero angle relative to the dispenser D (see FIG. 33). The angled orientation of the mesh 851 in combination with the uneven distribution of conduit apertures 862, 863 aids in consistently distributing the reactant across the upstream surface of the mesh 851.

A second conduit 864 extends downstream of the mesh 851. The second conduit 864 includes a tapered portion 866 that extends radially outwardly to provide pressure recovery for the exhaust flow. A flange 868 extends radially outwardly from the tapered portion 866 to meet the first and second deformed portions 850a, 850b of the plate 848.

Figure 33:
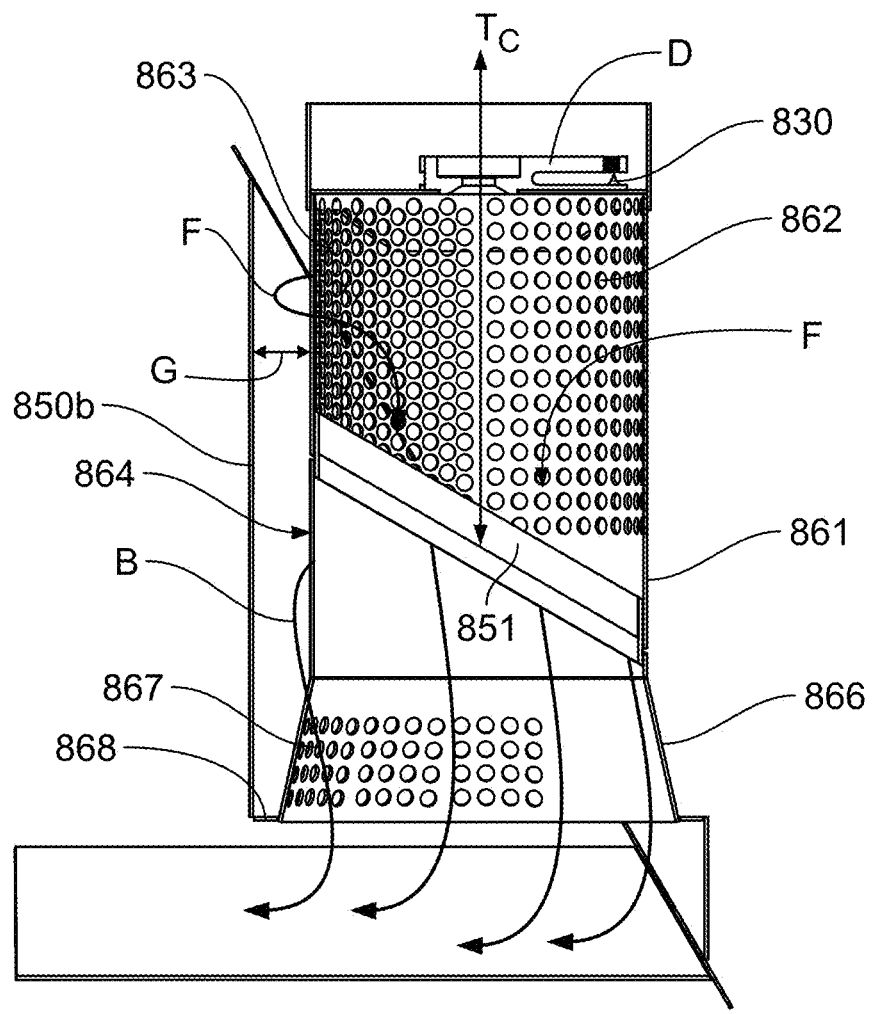
FIG. 33 is an axial cross-sectional view of the mixing assembly taken along the line 33-33 of FIG. 32.
Figure 34:
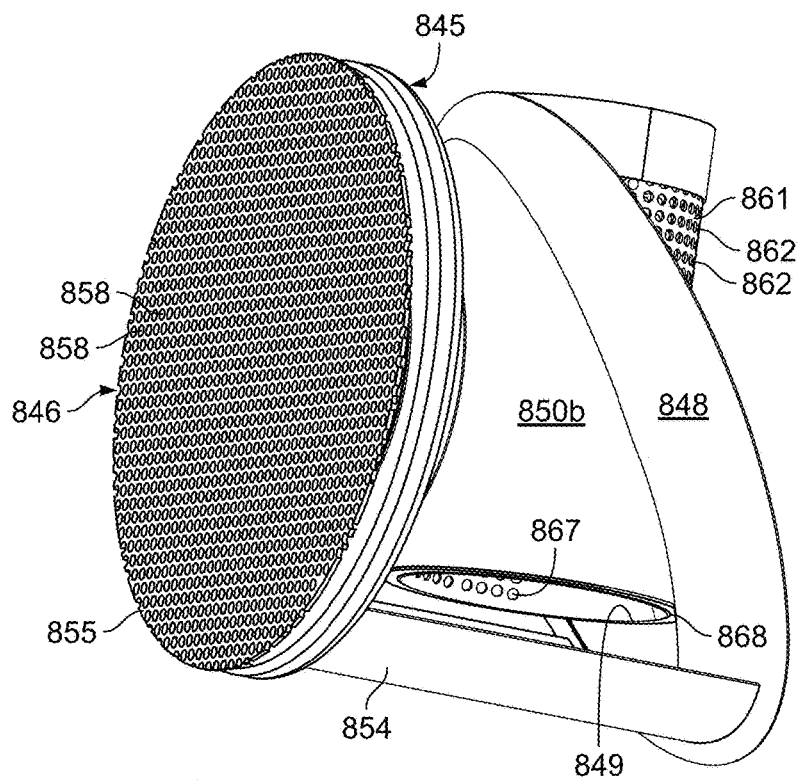
FIG. 34 is a rear perspective view of the mixing assembly of FIG. 30.
Figure 35:
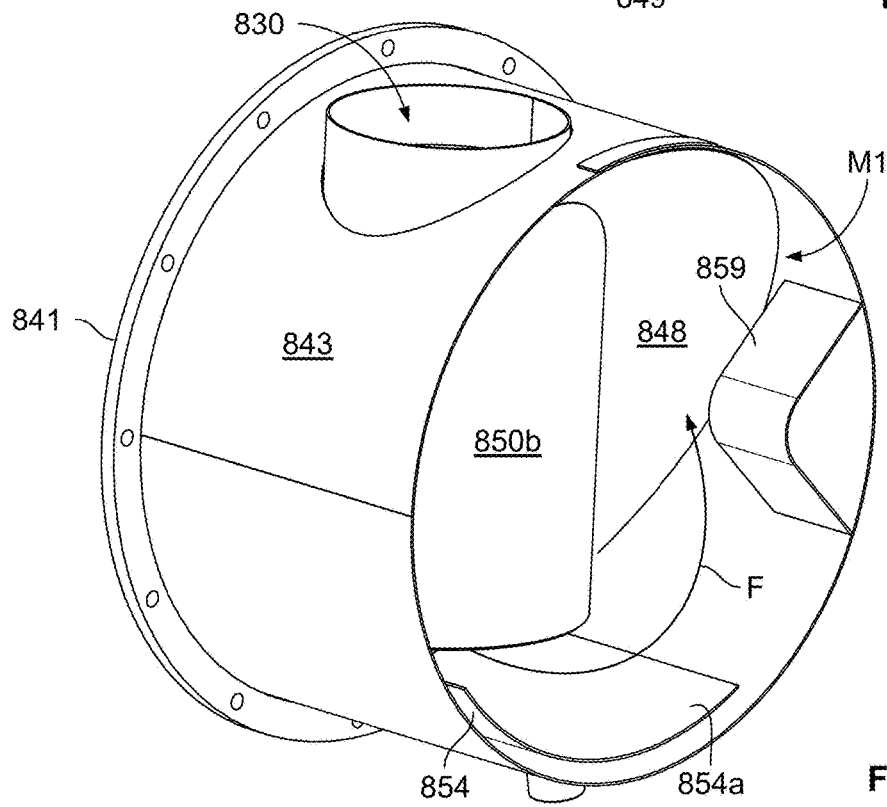
FIG. 35 is a rear perspective view of a portion of the mixing assembly of FIG. 28 showing one optional deflection arrangement having a single deflection plate.

In some implementations, the second conduit 864 defines a plurality of bypass apertures 867 that provide a bypass flow path B for exhaust to enter the passage 849 without passing through the mesh 851 (see FIG. 33). In some implementations, the bypass apertures 867 are primary located at a downstream side of the second conduit 864. In certain implementations, the bypass apertures 867 are located around no more than 66% of a circumference of the second conduit 864. In the example shown, the bypass apertures 867 are not located at the upstream facing portion of the second conduit 864. In other implementations, however, the bypass apertures 867 extend around an entire circumference of the second conduit 864.

In some implementations, the size and density of the bypass apertures 867 are sufficient so that at least 10% of the total flow passing through the passage 849 has bypassed the mesh 851. In certain implementations, the size and density of the bypass apertures 867 are sufficient so that at least 15% of the total flow passing through the passage 849 has bypassed the mesh 851. In certain implementations, the size and density of the bypass apertures 867 are sufficient so that between about 15% and about 50% of the total flow passing through the passage 849 has bypassed the mesh 851. In certain implementations, the size and density of the bypass apertures 867 are sufficient so that at least 20% of the total flow passing through the passage 849 has bypassed the mesh 851. In certain implementations, the size and density of the bypass apertures 867 are sufficient so that between about 15% and about 35% of the total flow passing through the passage 849 has bypassed the mesh 851. In certain implementations, the size and density of the bypass apertures 867 are sufficient so that between about 20% and about 40% of the total flow passing through the passage 849 has bypassed the mesh 851. In certain implementations, the size and density of the bypass apertures 867 are sufficient so that at least 25% of the total flow passing through the passage 849 has bypassed the mesh 851. In certain implementations, the size and density of the bypass apertures 867 are sufficient so that at least 30% of the total flow passing through the passage 849 has bypassed the mesh 851. In certain implementations, the size and density of the bypass apertures 867 are sufficient so that at least 40% of the total flow passing through the passage 849 has bypassed the mesh 851. In certain implementations, the size and density of the bypass apertures 867 are sufficient so that at least 45% of the total flow passing through the passage 849 has bypassed the mesh 851. In certain implementations, the size and density of the bypass apertures 867 are sufficient so that about 50% of the total flow passing through the passage 849 has bypassed the mesh 851. In other implementations, however, the size and density of the bypass apertures 867 are sufficient so that at least 70% of the total flow passing through the passage 849 has bypassed the mesh 851.

In certain implementations, the mixing arrangement 844 also includes a deflector arrangement 854 extending downstream of the plate 848. The deflector arrangement 854 aligns with the passage 849. Accordingly, any reactant passing through the mesh 851 without being caught in the exhaust flow impinges on the deflector arrangement 854 instead of on the circumferential wall 843. The deflector arrangement 854 maintains the reactant within the heated exhaust flow and away from the cooler circumferential wall 843, thereby reducing deposits of the reactant within the mixing assembly 840. In certain implementations, the deflector arrangement 854 is shaped and positioned to guide the exhaust flow in a swirling pattern around the inner circumference of the annular wall 843.

Figure 36:
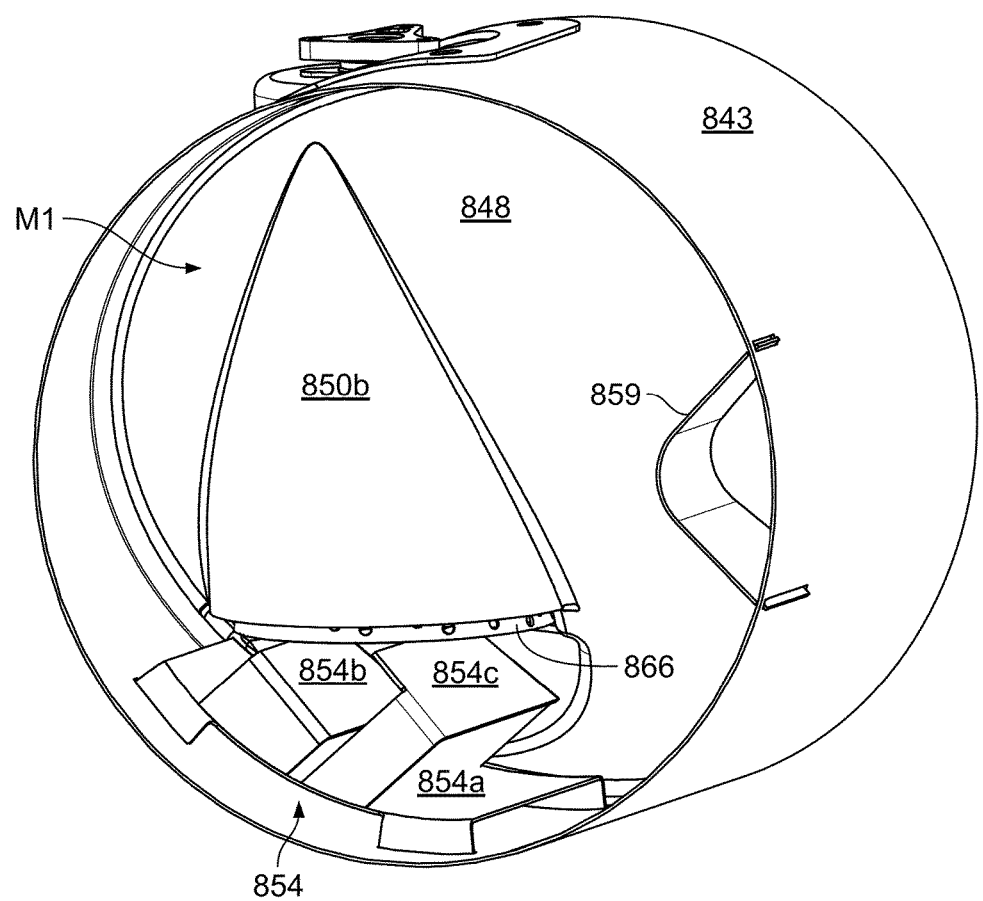
FIG. 36 is a rear perspective view of a portion of the mixing assembly of FIG. 28 showing another optional deflection arrangement having multiple deflection surfaces.
Figure 37:
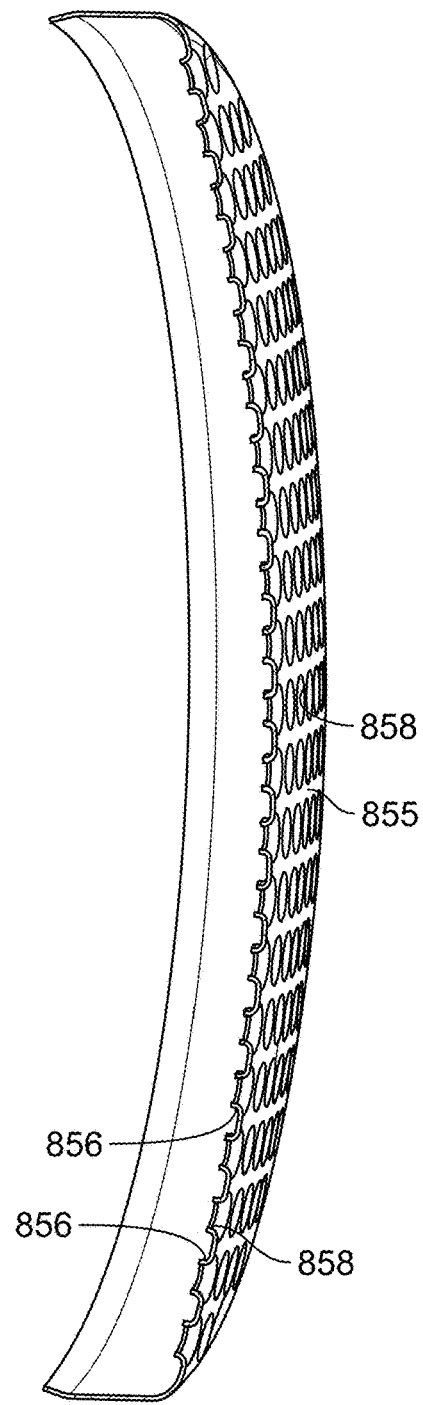
FIG. 37 is a cross-sectional view of a dispersing member of the mixing assembly of FIG. 28 shown in isolation.

In some implementations, the deflector arrangement 854 includes a single deflector plate. In certain such implementations, the deflector plate has a concavely curved deflector surface 854a facing the passage 849 (see FIG. 35). In other implementations, the deflector arrangement 854 includes a plurality of deflector surfaces aligned with the passage 849 (FIG. 36). In examples, the deflector plate 854 has a concavely curved deflector surface 854a, a first planar surface 854b disposed above the curved deflector surface 854a, and a second planar surface 854c disposed above the curved deflector surface 854c. In the example shown in FIG. 36, the second planar surface 854c partially overlaps the first planar surface 854b. In the example shown in FIG. 36, both planar surfaces 854b, 854c overlap the curved deflector surface 854a.

In some implementations, the deflector arrangement surfaces are solid. In other implementations, however, one or more of the deflector arrangement surfaces can be perforated or louvered.

In some implementations, one or more flow deflectors 859 can be positioned along an inner circumference of the annular wall 843 to direct exhaust flow away from the cooler inner surface of the annular wall 843. For example, one or more flow deflectors 859 can extend inwardly from the inner surface of the annular wall 843 to direct the flow radially inwardly within mixing region M1. In the example shown, the flow deflector 859 has an elbow shape with both distal ends connecting to the annular wall 843. In other implementations, however, the flow deflector 859 can have a convex curvature with only one end connecting to the annular wall 843. In still other implementations, the flow deflector 859 can have a concave curvature with only one end connecting to the annular wall 843. In still other implementations, the flow deflector 859 can be planar and extend inwardly from the annular wall 843. In still other implementations, the mixing assembly 840 can be devoid of flow deflectors 859 extending inwardly from the annular wall 843.

As shown in FIGS. 27-30, a restricting member 845 includes a restricted passage 847 that is defined by a duct 853 extending from a baffle 852 towards the mixing arrangement 844. The restricting member baffle 852 blocks exhaust from flowing past the restricting member 845 without passing through the restricted passage 847. In some implementations, the restricted passage 847 is centered on the central longitudinal axis C of the mixing assembly 840. In certain implementations, the restricted passage 847 is centered on a central longitudinal axis of the exhaust treatment device 800.

As shown in FIG. 30, the duct 853 has a tubular shape with a frustro-conical lip 853a. In certain implementations, the lip 853a funnels the exhaust flow to the restricted passage 847. In certain implementations, an axial length of the duct 853 is smaller than an axial length of the deformed portions 850a, 850b of the mixing arrangement 844. In certain implementations, the axial length of the duct 853 is smaller than an axial length of one of the deformed portions 850a, 850b of the mixing arrangement 844.

The dispersing member 846 is configured to expand the swirling flow within the mixing assembly 840 to enhance reactant distribution at the downstream aftertreatment substrate. For example, the dispersing member 846 may straighten out the swirling flow to more evenly distribute the exhaust flow and reactant across a transverse cross-section of the fourth mixing region $M_4$. In some implementations, the dispersing member 846 is substantially the same as the dispersing member 646 of FIG. 16. In other implementations, the dispersing member 846 is substantially the same as the dispersing member 646' of FIG. 22.

In still other implementations, the dispersing member 846 includes a plate 855 defining a plurality of apertures 858. In some examples, the apertures 858 are positioned in a ring. In other examples, the apertures 858 are evenly dispersed over the plate 855. In some implementations, the plate 855 is sufficiently thick to provide straightening to the exhaust flowing through the apertures 858. In other examples, the plate 855 includes radially tapered extensions that define the apertures 858 (see FIG. 37). The radially tapered extensions have sufficient axial length to provide straightening to the exhaust flowing through the apertures 858.

In use, exhaust flows into the housing arrangement 801 through the inlet conduit 820, through the first treatment substrate 883, to the mixing assembly 840. Exhaust flows through the apertures 862, 863, 867 towards the passage 849. The flow passing through the apertures 862, 863 mixes with reactant from the dispenser D and passes through the mesh 851. The flow passing through the bypass apertures 867 does not pass through the mesh 851. The passage 849 is positioned and oriented within the mixing assembly 840 to cause the reactant infused exhaust to swirl around the central longitudinal axis C of the mixing assembly 840 to further mix the reactant with the exhaust flow.

In some implementations, the reactant mixed flow is deflected by the deflection arrangement 854 and/or by one or more flow deflectors 859 to further enhance swirling. The flow deflectors 859 also may aid in directing the flow away from the inner surface of the annular wall 843. In an example, the flow deflectors 859 may cause the flow to swirl more tightly around the central longitudinal axis C of the mixing assembly 840.

The reactant mixed flow swirls into the restricted passage 847 of the restricting member 845. For example, the flow may pass through the lip 853a at the distal end of the duct 853. The flow swirls through the restricted passage 847 towards the dispersing member 846, which evens out the swirling flow across a transverse cross-section of the housing arrangement 801. In certain implementations, the dispersing member 846 also straightens the flow as the flow passes through apertures 858 of the dispersing member 846. The reactant mixed flow passes through the second treatment substrate 886 and exits the housing arrangement 801 at the outlet conduit 870.

FIGS. 38-46 illustrate another example implementation of a mixer assembly 940 suitable for use with an exhaust aftertreatment device, such as the exhaust aftertreatment device 100 of FIG. 1. The mixing assembly 940 includes a mixing arrangement 944 and a restricting member 945 disposed downstream of the mixing arrangement 944. In certain implementations, the mixing assembly 940 can include a dispersing member 946. In certain implementations, the mixing assembly 940 includes a doser mounting location 930.

Figure 38:
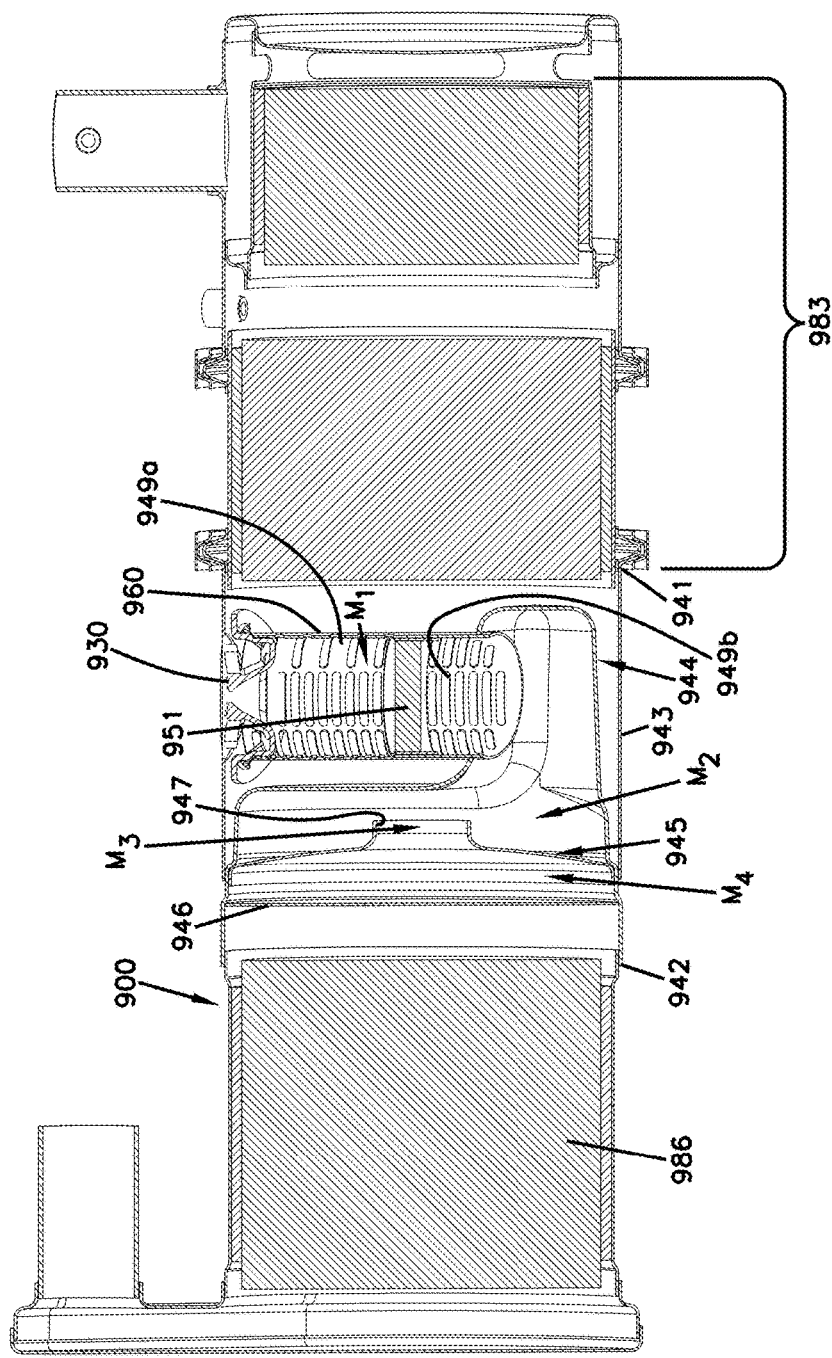
FIG. 38 is an axial cross-sectional view of another example implementation of the exhaust treatment device of FIG. 1.
Figure 39:
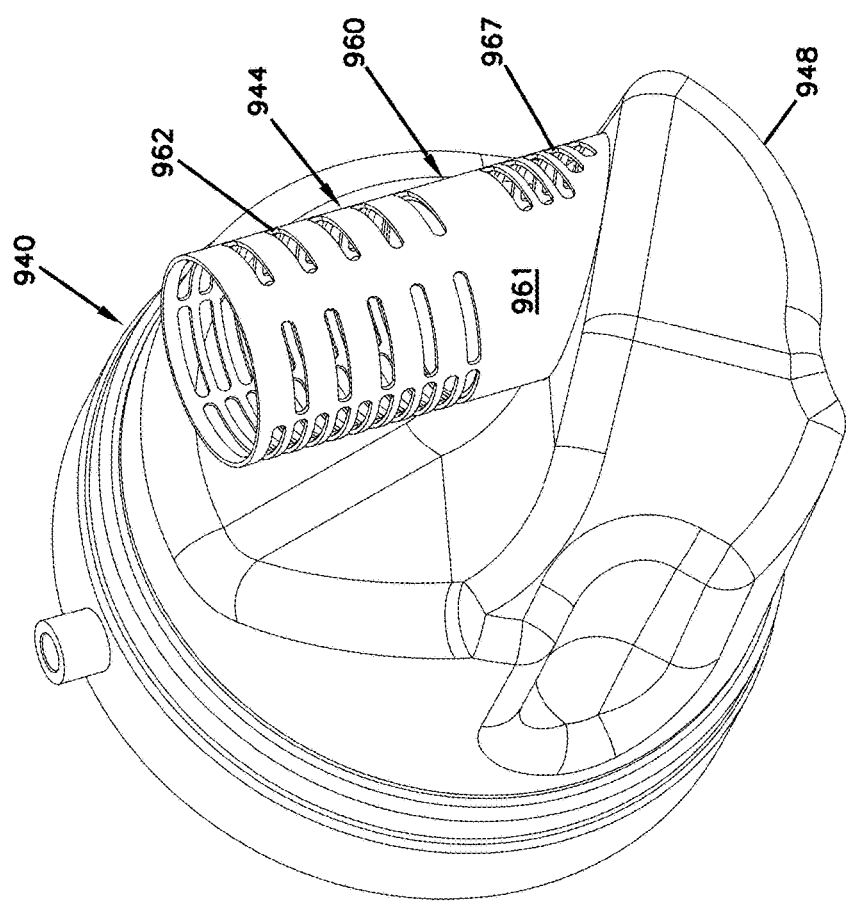
FIG. 39 is an upstream perspective view of a mixing assembly of the treatment device of FIG. 38.
Figure 40:
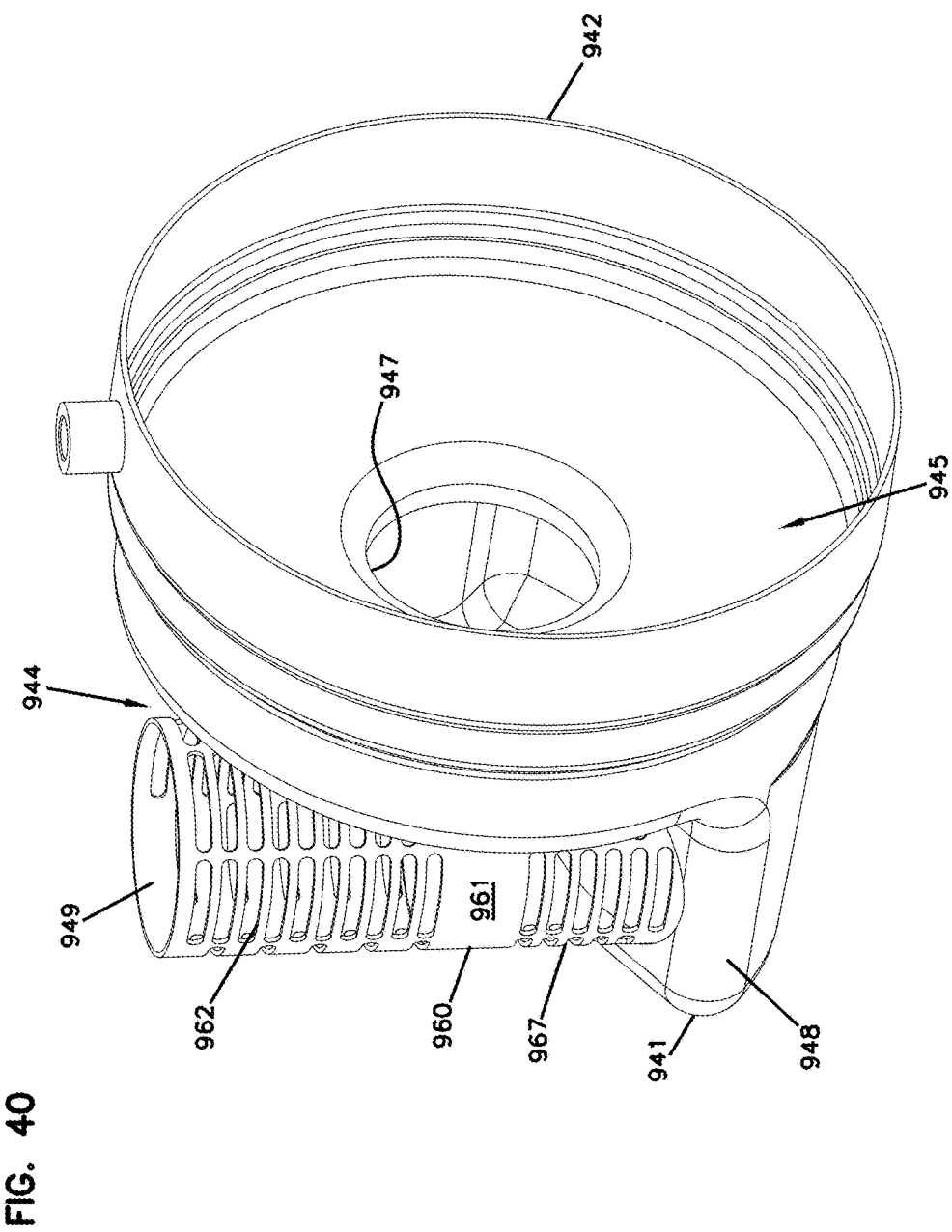
FIG. 40 is a downstream perspective view of the mixing assembly of FIG. 39.
Figure 41:
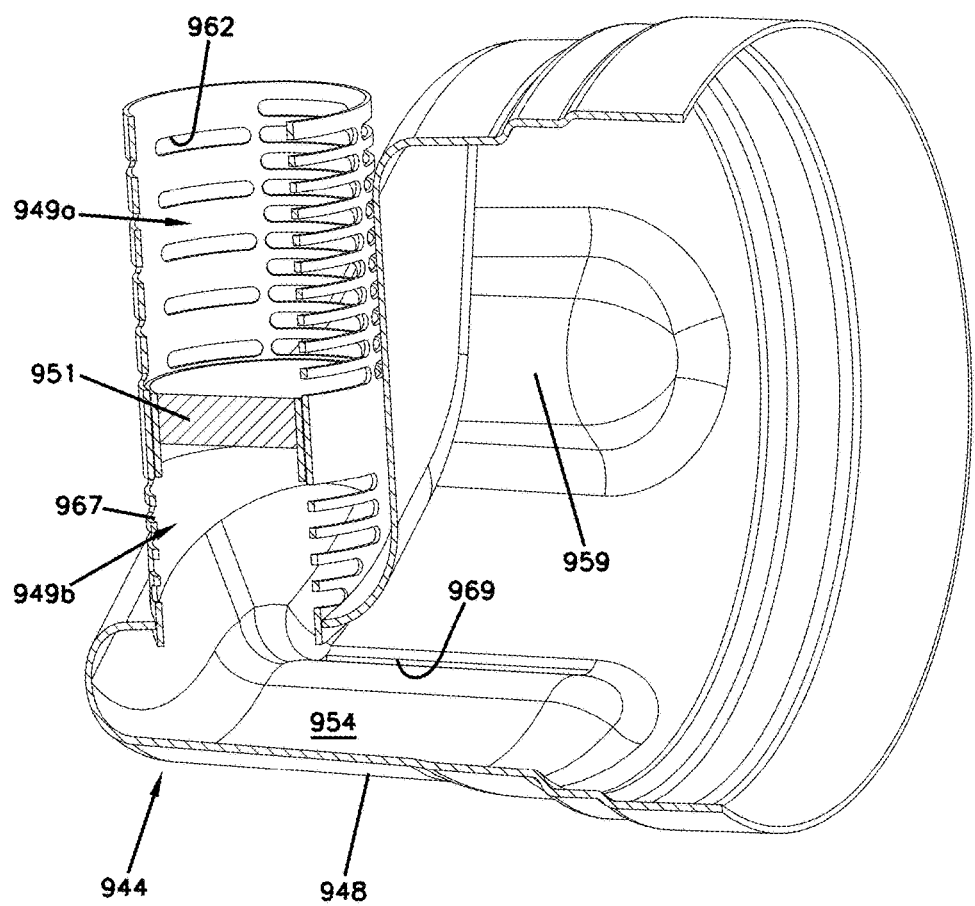
FIG. 41 is an axial cross-sectional view of the mixing assembly of FIG. 40 with the restricting member removed for ease in viewing.
Figure 42:
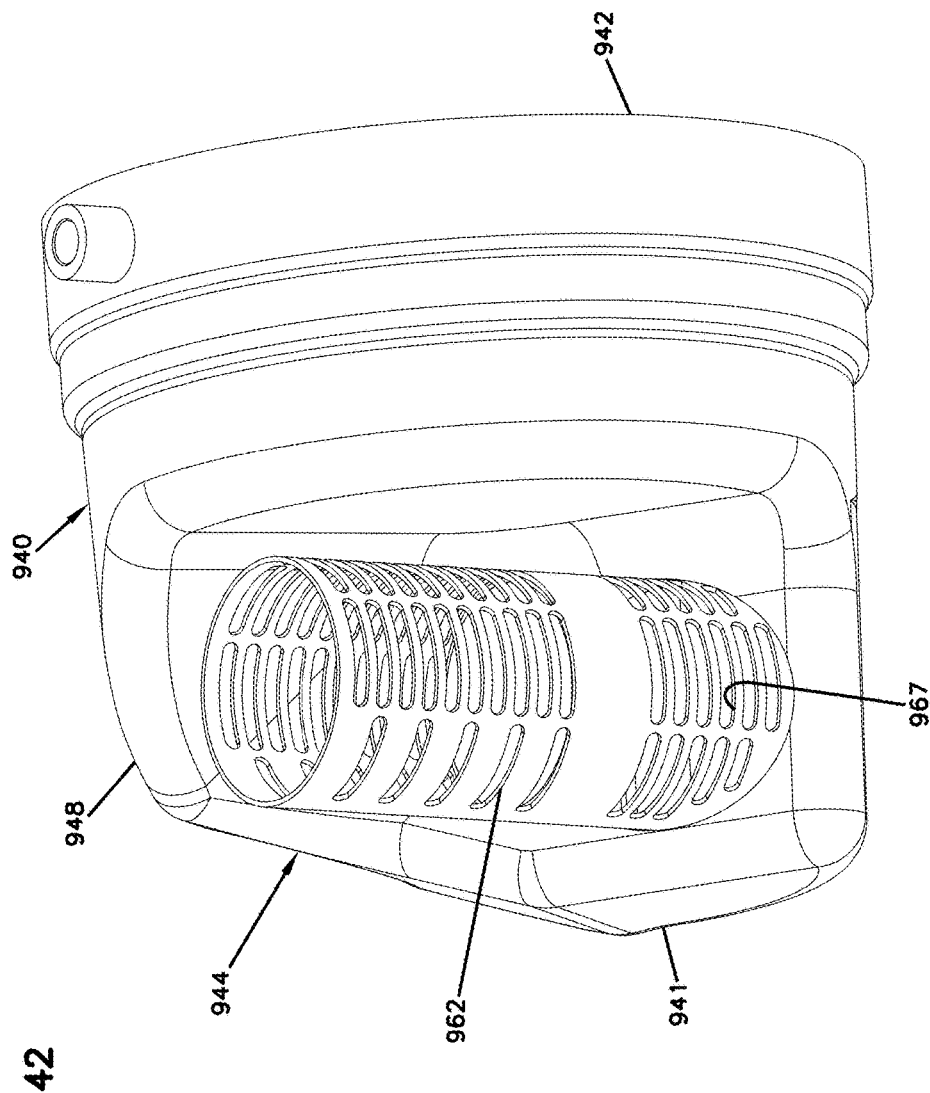
FIG. 42 is another perspective view of the mixing assembly of FIG. 39.
Figure 43:
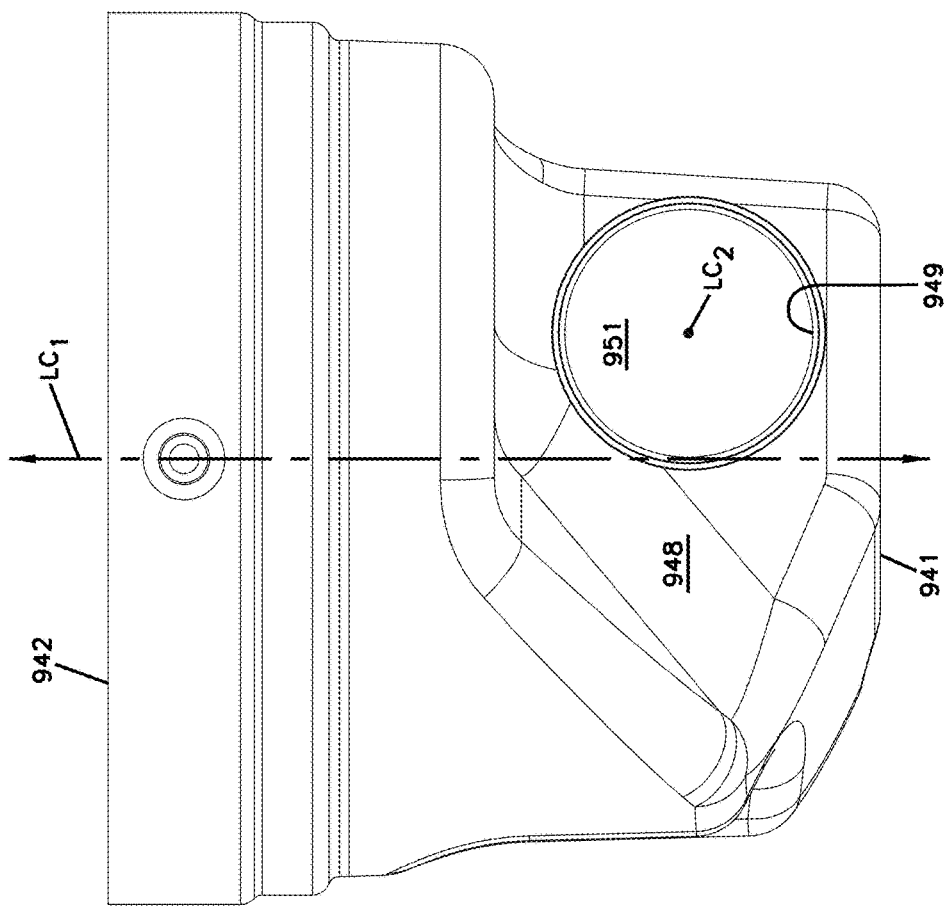
FIG. 43 is another perspective view of the mixing assembly of FIG. 39.

As shown in FIG. 38, a first mixing region $M_1$ is defined in the mixing arrangement 944. A second mixing region $M_2$ is defined between the mixing arrangement 944 and an entrance of the restricted passage 947. A third mixing region $M_3$ is defined within the restricted passage 947. A fourth mixing region $M_4$ is defined between an exit of the restricted passage 947 and the dispersing member 946.

The restricting member 945 defines a restricted passage 947. In some implementations, the restricted passage 947 defined by the restricting member 945 is co-axially aligned with the central longitudinal axis of the mixing assembly 940. In other implementations, the restricted passage 947 is offset from the central longitudinal axis of the mixing assembly 940. The restricted passage 947 is about 0.1 to about 0.9 of the cross-dimension of the mixing assembly 940. In certain examples, the restricted passage 947 is about 0.2 to about 0.8 of the cross-dimension of the mixing assembly 940. In examples, the restricted passage 947 is about 0.2 to about 0.4 of the cross-dimension of the mixing assembly 940. In examples, the restricted passage 947 is about 0.4 to about 0.4 of the cross-dimension of the mixing assembly 940. In examples, the restricted passage 947 is about 0.6 to about 0.8 of the cross-dimension of the mixing assembly 940.

The mixing assembly 940 has an upstream end 941 and a downstream end 942 and has a central longitudinal axis extending between the upstream end 941 and the downstream end 942. The mixing assembly 940 may include an annular wall 943 extending between the upstream and downstream ends 941, 942. The mixing arrangement 944 and restricting member 945 are disposed within the annular wall 943. The annular wall 943 can be formed from one or more conduits.

The mixing arrangement 944 includes a deflection body 948, a mesh holder 960, and a mesh 951 (e.g., a wire mesh). The deflection body 948 extends across a full cross-dimension of the mixing assembly 940 (e.g., across a transverse cross-section of the annular wall 943) to divide the mixing assembly 940 into a first region 940a upstream of the deflection body 948 and a second region 940b downstream of the deflection body 948.

The mesh holder 960 defines a passage 949 through the deflection body 948 between the first and second regions 940a, 940b. The passage 949 is not parallel with the central longitudinal axis of the mixing assembly 940. The mesh 951 is disposed in the passage 949 to divide the passage 949 into an upstream passage 949a and a downstream passage 949b. The mesh holder 960 has a first set of perforations 962 leading to the upstream passage 949a and a second set of perforations 967 leading to the downstream passage 949b.

Exhaust entering the upstream passage 949a through the first set of perforations 962 passes through the mesh 951. Exhaust entering the downstream passage 949b through the second set of perforations 967 bypasses the mesh 951 and mixes with the exhaust that passed through the mesh 951. In some implementations, the perforations of the first set 962 are circular. In other implementations, the perforations of the first set 962 are elongated.

In certain implementations, a doser mount 930 is located at a first axial end of the mesh holder 960 so that a doser mounted at the doser mount 930 would spray into the upstream passage towards the mesh. In certain examples, the doser mounts to the doser mount 930 so that the doser injects reactant towards the mesh 951.

In some implementations, the mesh holder 960 includes a cylindrical tube 961. In certain examples, the mesh holder 960 also includes a frustro-conical portion coupled to the cylindrical tube 961. In other implementations, the mesh holder 960 includes a frustro-conical tube. In still other implementations, the mesh holder 960 includes a tube that extends along a curved longitudinal axis.

In certain implementations, the first set of perforations 962 extend fully around a circumference of the tube 961. In some examples, the perforations 962 of the first set that face downstream are sized and shaped to allow a greater volume of exhaust to pass therethrough compared to the perforations 962 of the first set facing upstream. In an example, a greater number of perforations face downstream than upstream. In another example, the perforations facing downstream are larger than the perforations facing upstream. In other examples, the size and density of the first set of perforations 962 are consistent around the circumference of the mesh holder 960.

In certain implementations, the mesh 951 is sized (e.g., the wire diameter and mesh density are sized) to inhibit unhydrolized/unvaporized reductant from passing through the mesh 951. For example, the unhydrolized/unvaporized reductant may impinge on the mesh 951 and break into smaller droplets prior to entering the restricted passage 947 downstream of the mixing arrangement 944. Breaking the droplets both decreases the size of and increases the number (and hence total surface area) of the droplets. The smaller size and increased surface area promotes evaporation of the droplets.

In certain implementations, the mesh 951 absorbs heat from the exhaust passing therethrough. The mesh 951 may pass some of the absorbed heat to the impinging droplets, which enhances evaporation of the droplets and/or inhibits deposition of the droplets on the restricting member 945. The mesh 951 is thermally isolated from the outer wall 943 of the mixing assembly 940 to inhibit cooling of the mesh and droplets. Droplets that impinge on the mesh 951 reside within the swirling exhaust flow while disposed on the mesh 951, which enhances evaporation of the droplets. In certain implementations, the mesh 951 heats up faster than a solid surface would, especially during transient exhaust conditions.

In some implementations, the mesh 951 has a circular shape. In other implementations, the mesh 951 has an oval shape. The mesh 951 has a first major surface that faces the upstream passage 949a and a second major surface that faces downstream passage 949b. In some implementations, the first and second major surfaces extend generally parallel with the central longitudinal axis C of the mixing assembly 940. In other implementations, the first and second major surfaces are angled relative to the central longitudinal axis C. In certain implementations, the upstream face of the mesh 951 faces the doser mounting location 930. In certain examples, the upstream face of the mesh 951 is perpendicular to a doser injecting direction.

In certain implementations, the passage 949 extends perpendicular to the central longitudinal axis of the mixing assembly 940. For example, the mesh holder 960 can include a tube 961 or other conduit that extends radially inwardly from the annular wall 943 of the mixing assembly 940. One axial end of the tube 961 aligns with a doser mounting location 930 of the mixing assembly 940. The opposite axial end of the tube 961 intersects a portion of the deflection body 948. In certain implementations, the deflection body 948 is shaped so that exhaust can flow fully around a circumference of the mesh holder 960.

In certain implementations, the passage 949 defined by the mesh holder 960 is offset from the central longitudinal axis of the mixing assembly 940 so that a central longitudinal axis of the mesh holder 960 does not intersect the central longitudinal axis of the mixing assembly 940. In certain examples, the passage 949 is sufficiently offset that exhaust leaving the passage 949 enters the second region 940b of the mixing assembly 940 tangentially. Accordingly, the offset position of the passage 949 directs the exhaust passing through the passage 949 to swirl upon entering the second region 940b. In some examples, the passage 949 is sized and sufficiently offset so that the central longitudinal axis of the mixing assembly 940 does not intersect the mesh holder 960. In other examples, the passage 949 is sized and offset so that the central longitudinal axis of the mixing assembly 940 intersects a portion of the passage 949.

In certain implementations, the second set of perforations 967 defined by the mesh holder 960 are located at a common side of the mesh holder 960 to enhance swirling of the exhaust leaving the downstream passage 949b of the mesh holder 960. In certain examples, the second set of perforations 967 are defined at the side closest to the annular wall 943 of the mixing assembly 940.

In certain implementations, the deflector body 948 extends downstream of the mesh holder 960 to define a deflector arrangement 954. The deflector arrangement 954 is disposed between the downstream passage 949b of the mesh holder 960 and the annular wall 943. The deflector arrangement 954 is aligned with the downstream passage 949b to inhibit reactant carried by exhaust flowing through the passage 949 from contacting the annular wall 943. In an example, the deflector arrangement 954 is monolithically formed with the deflection body 948.

The deflector arrangement 954 is thermally buffered from the annular wall 943. For example, the deflector arrangement 954 may be spaced radially inwardly from the annular wall 943 sufficient to enable heated exhaust to pass between the annular wall 943 and the deflector arrangement 954.

The deflector arrangement 954 aligns with the downstream passage 949b. Accordingly, any reactant passing through the mesh 951 without being caught in the exhaust flow impinges on the deflector arrangement 954 instead of on the circumferential wall 943. The deflector arrangement 954 maintains the reactant within the heated exhaust flow and away from the cooler circumferential wall 943, thereby reducing deposits of the reactant within the mixing assembly 940. In certain implementations, the deflector arrangement 954 is shaped and positioned to guide the exhaust flow in a swirling pattern around the inner circumference of the annular wall 943.

In some implementations, the deflector arrangement 954 includes a single deflector plate. In certain such implementations, the deflector plate has a concavely curved deflector surface facing the passage 949. In other implementations, the deflector arrangement 954 includes a plurality of deflector surfaces aligned with the passage 949.

In certain implementations, one or more flow deflectors 959 can be positioned along an inner circumference of the annular wall 943 to direct exhaust flow away from the cooler circumferential surface of the deflection body 948. For example, one or more flow deflectors 959 can extend inwardly from the circumferential surface of the deflection body 948 to direct the flow radially inwardly within the second mixing region $M_2$. In the example shown, the flow deflector 959 has an elbow shape with both distal ends connecting to the deflection body 948. In other implementations, however, the flow deflector 959 can have a convex curvature with only one end connecting to the deflection body 948. In still other implementations, the flow deflector 959 can have a concave curvature with only one end connecting to the deflection body 958. In still other implementations, the flow deflector 959 can be planar and extend inwardly from the deflection body 948. In still other implementations, the mixing assembly 940 can be devoid of flow deflectors 959 extending inwardly from the circumferential surface of the deflection body 948.

In certain implementations, the deflection body 948 defines a second bypass 968 downstream of the mesh holder 960 and upstream of the restricting member 945. The second bypass 968 includes at least one aperture 969 defined in the deflection body 948 to enable exhaust to enter the second region 940b of the mixing assembly 940 tangentially without passing through the mesh holder 960. In certain examples, the second bypass 968 is defined through a circumferential wall of the deflection body 948.

When exhaust passes through the mesh 951, the exhaust may cool (e.g., due to heat transfer to the mesh 951). Allowing the exhaust to enter the second region 940b of the mixing assembly 940 without passing through the mesh holder 960 allows hotter exhaust to pass over the deflector arrangement 954 of the deflection body 948. The hotter exhaust maintains the deflector arrangement 954 at a hotter temperature than the exhaust passing through the mesh holder 960 would. Heating the deflector arrangement 954 reduces the likelihood of the reactant from the doser depositing on the deflector arrangement 954.

Figure 44:
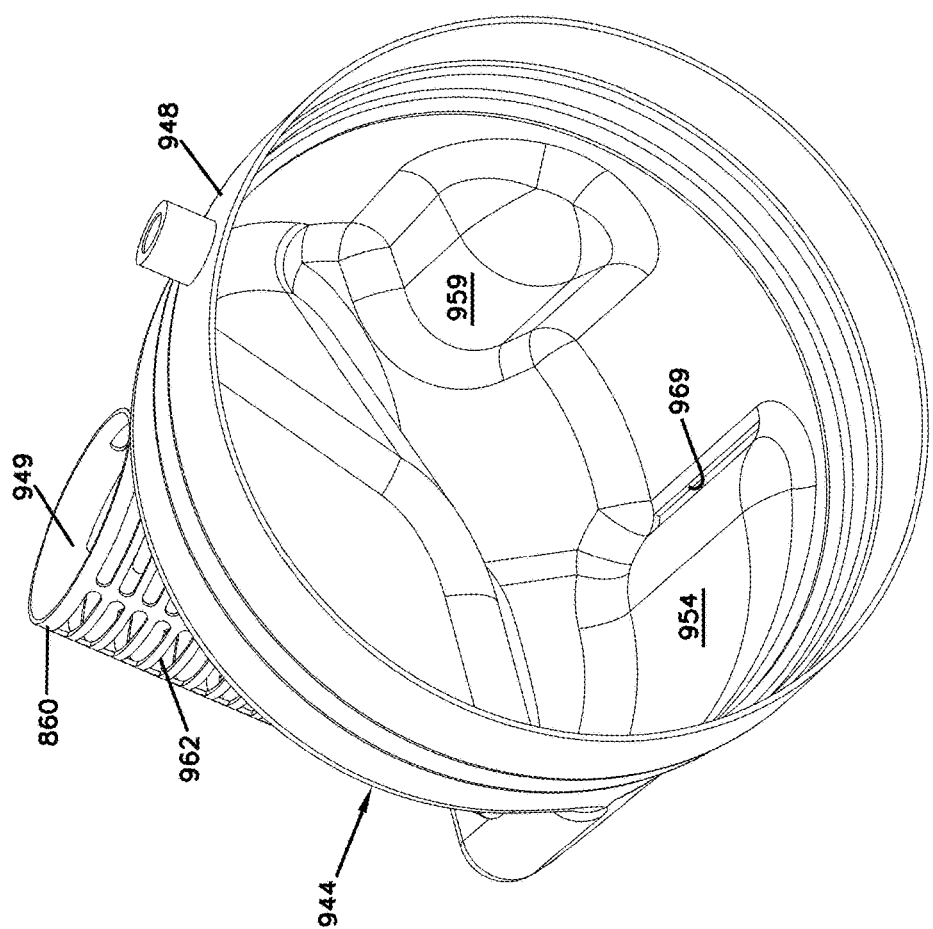
FIG. 44 is a downstream perspective view of the mixing assembly of FIG. 39 with the restricting member removed for ease in viewing.
Figure 45:
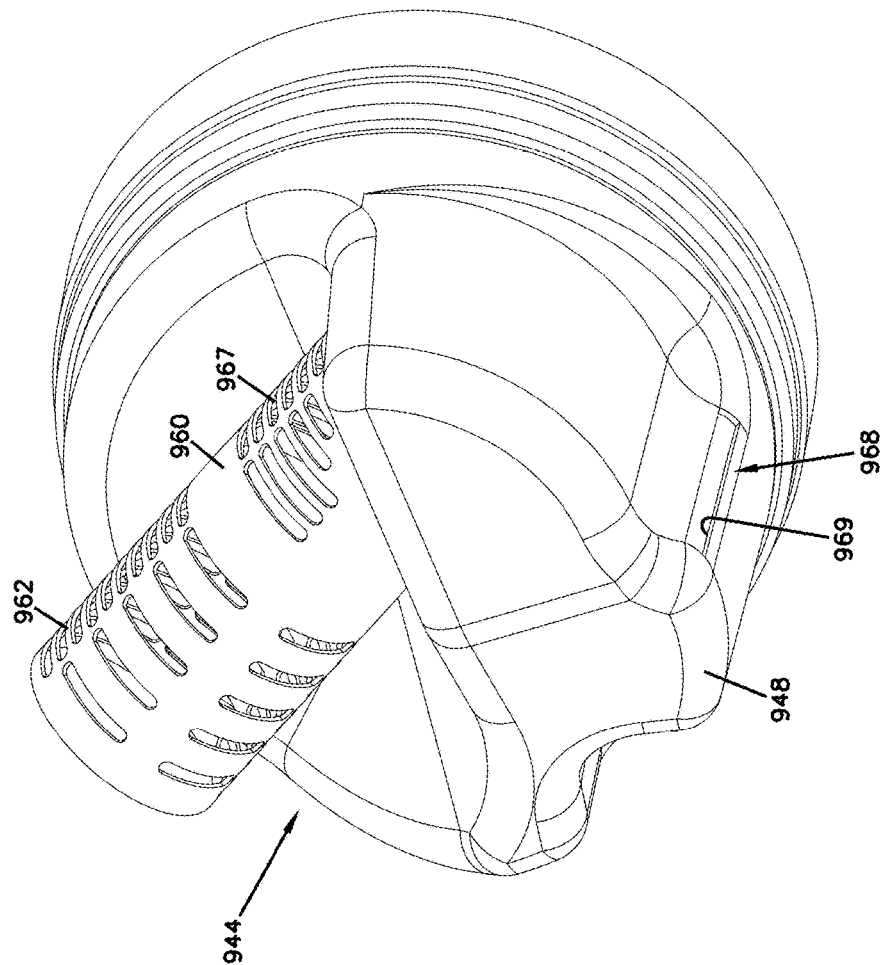
FIG. 45 is another perspective view of the mixing assembly of FIG. 39 oriented so that the second bypass is visible.

In certain examples, the circumferential wall of the deflection body 948 curves inwardly so that the aperture faces tangentially inwardly instead of radially inwardly (e.g., see FIG. 44). Accordingly, exhaust passing through the second bypass 968 flows tangentially into the second mixing region $M_2$. Directing the exhaust to enter the second mixing region $M_2$ tangentially facilitates swirling of the exhaust within the second mixing region $M_2$.

In certain examples, the second bypass 969 is circumferentially spaced from the central longitudinal axis of the passage 949. In certain examples, the aperture 969 of the second bypass 968 is elongated in a direction extending between the first and second axial ends 941, 942 of the mixing assembly 940. In certain examples, the second bypass 968 includes multiple apertures defined in the deflection body 948.

Figure 46:
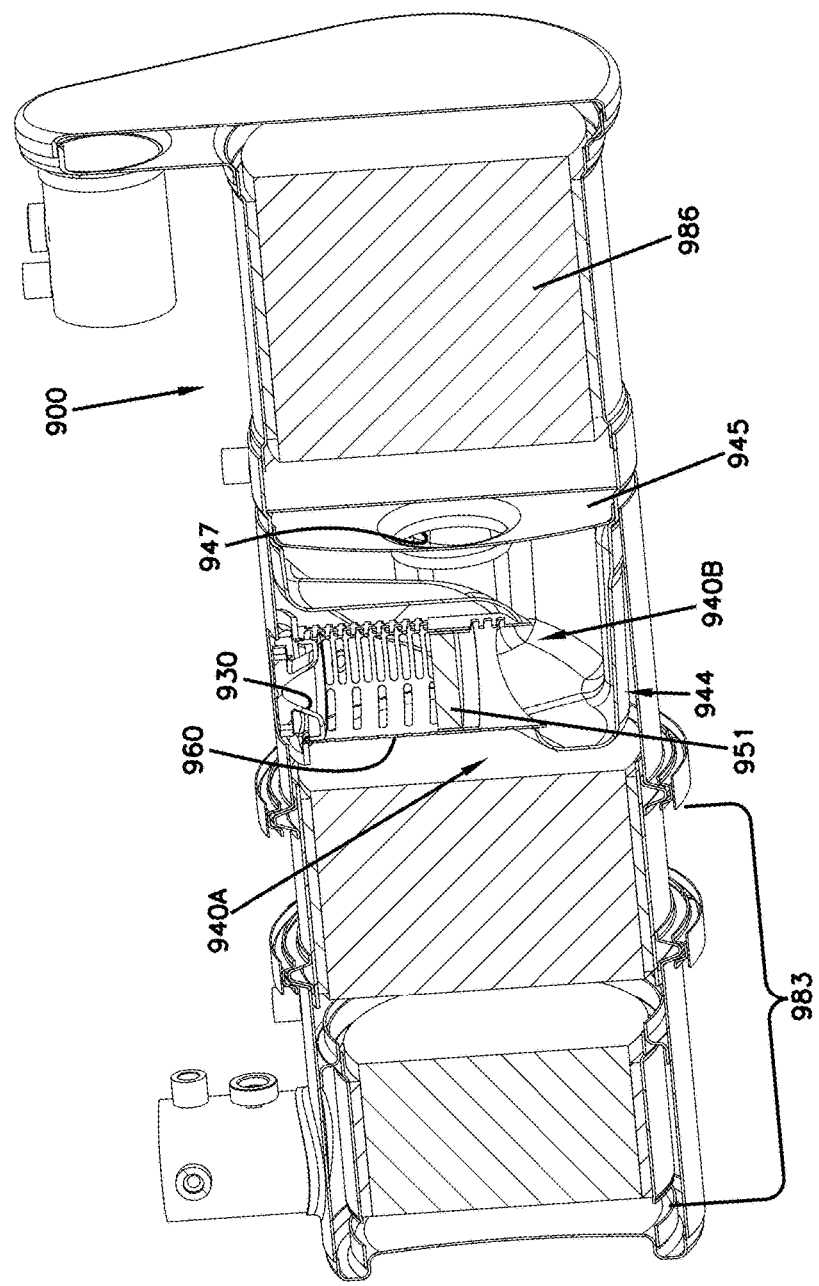
FIG. 46 is a perspective view of the axial cross-section of FIG. 38.

As illustrated in FIGS. 38 and 46, an exhaust treatment arrangement 900 using the mixing assembly 940 includes a downstream exhaust treatment substrate 986 disposed downstream of the mixing assembly 940. In certain implementations, the downstream exhaust treatment substrate 986 is an SCR or SCRf substrate. In certain implementations, the mixing assembly 940 and the downstream exhaust treatment substrate 986 are coaxially aligned.

In certain implementations, an upstream exhaust treatment substrate 983 is disposed upstream of the mixing assembly 940. In certain examples, the upstream exhaust treatment substrate 983 is particulate filter (e.g., DPF) or DOC. In certain examples, the upstream exhaust treatment substrate 983 is coaxially aligned with the mixing assembly 940. In certain implementations, the upstream treatment substrate 983 has substantially the same cross-dimension as the downstream treatment substrate arrangement 986.

In some implementations, the upstream substrate 983, the mixing assembly 940, and the downstream substrate 986 are disposed in a common housing. In certain examples, a cross-dimension (e.g., a diameter) of the common housing is generally consistent along a length of the common housing. In other implementations, one or more of these components is disposed in a separate housing.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A mixing assembly having an upstream end and a downstream end, the mixing assembly having a central longitudinal axis extending between the upstream end and the downstream end, the mixing assembly comprising:
   a mixing arrangement including a deflection body, a mesh holder, and a mesh, the deflection body extending across a full cross-dimension of the mixing assembly to divide the mixing assembly into a first region upstream of the deflection body and a second region downstream of the deflection body, the mesh holder defining a passage through the deflection body between the first and second regions, the passage not being parallel with the central longitudinal axis of the mixing assembly, the mesh being disposed in the passage, the mesh holder having a first set of perforations leading to the passage at a location upstream of the mesh; and
   a restricting member disposed downstream of the mixing arrangement, the restricting member including a baffle extending across the cross-dimension of the mixing assembly, the baffle defining a restricted passage.

2. The mixing assembly of claim 1, wherein the passage defined by the mesh holder extends perpendicular to the central longitudinal axis of the mixing assembly.

3. The mixing assembly of claim 2, wherein the passage defined by the mesh holder is offset from the central longitudinal axis of the mixing assembly so that exhaust leaving the mesh holder enters the second region of the mixing assembly tangentially.

4. The mixing assembly of claim 1, wherein the mesh has an upstream face that is parallel to the central longitudinal axis of the mixing assembly.

5. The mixing assembly of claim 1, wherein an upstream face of the mesh is angled relative to the central longitudinal axis of the mixing assembly by about 25° to about 30°.

6. The mixing assembly of claim 1, further comprising a doser mount located at a first axial end of the mesh holder so that a doser mounted at the doser mount would spray into the passage towards the mesh.

7. The mixing assembly of claim 1, wherein the deflection body defines a plate extending across the mixing assembly at a non-zero, non-orthogonal angle relative to the central longitudinal axis.

8. The mixing assembly of claim 1, further comprising:
   an annular wall extending between upstream and downstream ends of the mixing assembly, the annular wall defining the cross-dimension of the mixing assembly; and
   a deflector arrangement disposed between the passage of the mesh holder and the annular wall, the deflector arrangement being aligned with the passage to inhibit reactant carried by exhaust flowing through the mesh holder from contacting the annular wall, the deflector arrangement being thermally buffered from the annular wall.

9. The mixing assembly of claim 8, wherein the deflector arrangement is monolithically formed with the deflection body.

10. The mixing assembly of claim 1, wherein the deflection body is shaped so that exhaust can flow fully around a circumference of the mesh holder.

11. The mixing assembly of claim 1, wherein the first set of perforations extend fully around a circumference of the mesh holder so that the first set of perforations includes perforations facing downstream and perforations facing upstream, wherein the perforations facing downstream are sized and shaped to allow a greater volume of exhaust to pass therethrough compared to the perforations facing upstream.

12. The mixing assembly of claim 1, wherein the mesh divides the passage of the mesh holder into an upstream passage and a downstream passage, the first set of perforations leading to the upstream passage, the mesh holder also defining a second set of perforations leading to the downstream passage, thereby providing a bypass around the mesh.

13. The mixing assembly of claim 12, wherein the bypass is a first bypass, and wherein the deflection body defines a second bypass downstream of the mesh holder and upstream of the restricting member, the second bypass including at least one aperture defined in the deflection body to enable exhaust to enter the second region of the mixing assembly tangentially without passing through the mesh holder.

14. The mixing assembly of claim 12, wherein the second set of perforations defined by the mesh holder are located at a common side of the mesh holder to enhance swirling of the exhaust leaving the downstream passage of the mesh holder.

15. An exhaust treatment arrangement disposed along a conduit, the exhaust treatment arrangement comprising:
    a mixing arrangement including a deflection body, a mesh holder, and a mesh, the deflection body extending across a full cross-dimension of the conduit to divide the conduit into a first region upstream of the deflection body and a second region downstream of the deflection body, the mesh holder defining a passage through the deflection body between the first and second regions, the passage not being parallel with a central longitudinal axis of the mixing arrangement, the mesh being disposed in the passage, the mesh holder having a first set of perforations leading to the passage at a location upstream of the mesh, the mesh having an upstream face that is either parallel to the central longitudinal axis of the mixing arrangement or angled relative to the central longitudinal axis of the mixing arrangement by about 25° to about 30°; and
    a downstream exhaust treatment substrate disposed downstream of the mixing arrangement.

16. The exhaust treatment arrangement of claim 15, further comprising an upstream exhaust treatment substrate disposed upstream of the mixing arrangement.

17. The exhaust treatment arrangement of claim 16, wherein the upstream exhaust treatment substrate and the downstream exhaust treatment substrate are coaxially aligned with the mixing arrangement.

18. The exhaust treatment arrangement of claim 15, further comprising a restricting member disposed downstream of the mixing arrangement and upstream of the downstream exhaust treatment substrate.

19. The exhaust treatment arrangement of claim 18, further comprising a dispersing member disposed downstream of the restricting member.

20. The exhaust treatment arrangement of claim 15, further comprising:
 at least one deflector disposed in the second region of the conduit, the deflector not being aligned with the passage of the mesh holder, the deflector extending radially inwardly from an outer circumference of the second region.

21. The mixing assembly of claim 1, wherein the mesh holder has a cylindrical shape.

* * * * *